(12) United States Patent
Cleghorn et al.

(10) Patent No.: US 11,497,975 B2
(45) Date of Patent: *Nov. 15, 2022

(54) GOLF CLUB HAVING REMOVEABLE WEIGHT

(71) Applicant: Acushnet Company, Fairhaven, MA (US)

(72) Inventors: Richard L. Cleghorn, Oceanside, CA (US); Richard Sanchez, Temecula, CA (US); Stephen S. Murphy, Carlsbad, CA (US); Ryuichi Sugimae, San Diego, CA (US); Stephanie Luttrell, Carlsbad, CA (US); Thomas Orrin Bennett, Carlsbad, CA (US)

(73) Assignee: Acushnet Company, Fairhaven, MA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/203,597

(22) Filed: Mar. 16, 2021

(65) Prior Publication Data

US 2021/0205677 A1 Jul. 8, 2021

Related U.S. Application Data

(60) Continuation-in-part of application No. 16/780,040, filed on Feb. 3, 2020, now Pat. No. 11,213,730, which
(Continued)

(51) Int. Cl.
*A63B 53/08* (2015.01)
*A63B 53/06* (2015.01)
*A63B 53/04* (2015.01)

(52) U.S. Cl.
CPC .............. *A63B 53/08* (2013.01); *A63B 53/06* (2013.01); *A63B 53/0437* (2020.08);
(Continued)

(58) Field of Classification Search
CPC ..... A63B 53/08; A63B 53/06; A63B 53/0466; A63B 53/0437; A63B 2053/0491; F16B 21/02; F16B 33/004
(Continued)

(56) References Cited

U.S. PATENT DOCUMENTS 80,435 A 7/1868 Way
996,937 A 7/1911 Mulock
(Continued)

FOREIGN PATENT DOCUMENTS

CN 101060892 10/2007
CN 102886130 1/2013
(Continued)

*Primary Examiner* — Sebastiano Passaniti
(74) *Attorney, Agent, or Firm* — Randy K. Chang

(57) ABSTRACT

A golf club head including a weight mount disposed on the sole, a weight member configured to reside in the weight mount, a compressible member residing between the weight member and the weight mount, wherein the weight member comprises a longitudinal axis about which the weight member is configured to rotate, the weight member comprising projections extending radially outwards from the longitudinal axis, wherein the weight mount comprises circumferential ramps, wherein rotation of the weight member about the longitudinal axis forces the projections along the circumferential ramps, wherein the weight member goes from an unlocked position to a locked position in less than one full turn of the weight member relative to the weight mount, wherein rotation of the weight member compresses the compressible member, wherein the circumferential ramps comprise detents, wherein the projections are configured to reside in the detents when the weight member is in the locked position.

20 Claims, 50 Drawing Sheets

Related U.S. Application Data is a continuation-in-part of application No. 16/539,622, filed on Aug. 13, 2019, now Pat. No. 11,027,178, which is a continuation-in-part of application No. 16/219,651, filed on Dec. 13, 2018, now abandoned, and a continuation-in-part of application No. 16/509,420, filed on Jul. 11, 2019, now abandoned, which is a continuation of application No. 16/132,053, filed on Sep. 14, 2018, now Pat. No. 10,391,371, which is a division of application No. 15/629,263, filed on Jun. 21, 2017, now Pat. No. 10,092,803, which is a continuation of application No. 14/788,243, filed on Jun. 30, 2015, now Pat. No. 9,700,770, which is a continuation-in-part of application No. 14/143,330, filed on Dec. 30, 2013, now Pat. No. 9,095,753, which is a continuation-in-part of application No. 13/337,910, filed on Dec. 27, 2011, now Pat. No. 8,684,863.

(52) U.S. Cl.
CPC ... *A63B 53/0466* (2013.01); *A63B 2053/0491* (2013.01); *A63B 2209/00* (2013.01)

(58) Field of Classification Search
USPC .................. 473/334–339; 411/349, 549, 553
See application file for complete search history.

(56) References Cited

U.S. PATENT DOCUMENTS

| | | |
|---|---|---|
| 1,133,129 A | 3/1915 | Govan |
| 1,167,106 A | 1/1916 | Palmer |
| 1,322,182 A | 11/1919 | Duncan |
| 1,534,600 A | 4/1925 | Mattern |
| 2,214,356 A | 9/1940 | Wettlaufer |
| 2,517,245 A | 8/1950 | Scott |
| 2,545,045 A | 3/1951 | Rosan |
| 3,064,980 A | 11/1962 | Steiner |
| 3,212,783 A | 10/1965 | Bradley et al. |
| 3,220,733 A | 11/1965 | Saleeby |
| 3,259,404 A | 7/1966 | Papenguth |
| 3,466,047 A | 9/1969 | Rodia et al. |
| 3,556,533 A | 1/1971 | Hollis |
| 3,604,755 A | 9/1971 | Krekeler |
| 3,652,094 A | 3/1972 | Glover |
| 3,692,306 A | 9/1972 | Glover |
| 4,026,183 A | 5/1977 | Bart |
| 4,043,563 A | 8/1977 | Churchward |
| 4,052,075 A | 10/1977 | Daly |
| 4,085,934 A | 4/1978 | Churchward |
| 4,194,547 A | 3/1980 | Sidor et al. |
| 4,340,230 A | 7/1982 | Churchward |
| 4,423,874 A | 1/1984 | Stuff, Jr. |
| 4,443,145 A | 4/1984 | Peschges |
| 4,450,904 A | 5/1984 | Volz |
| 4,538,790 A | 9/1985 | Williams et al. |
| 4,602,787 A | 7/1986 | Sugioka et al. |
| 4,795,159 A | 1/1989 | Nagamoto |
| 4,867,458 A | 9/1989 | Sumikawa et al. |
| 4,869,507 A | 9/1989 | Sahm |
| 4,875,818 A * | 10/1989 | Reinwall ............... F16B 33/004 411/371.1 |
| 4,958,970 A | 9/1990 | Rose et al. |
| 5,050,879 A | 9/1991 | Sun et al. |
| 5,154,424 A | 10/1992 | Lo |
| 5,168,767 A | 12/1992 | Morita |
| 5,230,509 A | 7/1993 | Chavez |
| 5,236,164 A | 8/1993 | Lorizzo |
| 5,297,794 A | 3/1994 | Lu |
| 5,316,305 A | 5/1994 | McCabe |
| 5,320,005 A | 6/1994 | Hsiao |
| 5,344,151 A | 9/1994 | Anderson |
| 5,518,243 A | 5/1996 | Redman |
| 5,547,326 A | 8/1996 | Overhues |
| 5,571,053 A | 11/1996 | Lane |
| 5,720,674 A | 2/1998 | Galy |
| 5,795,245 A | 8/1998 | Chang et al. |
| 5,860,779 A | 1/1999 | Toosky et al. |
| 5,904,460 A | 5/1999 | Kawabata |
| 5,916,042 A | 6/1999 | Reimers |
| 5,935,019 A | 8/1999 | Yamamoto |
| 5,947,840 A | 9/1999 | Ryan |
| 5,967,905 A | 10/1999 | Nakahara et al. |
| 6,017,177 A | 1/2000 | Lanham |
| 6,056,649 A | 5/2000 | Imai |
| 6,089,994 A | 7/2000 | Sun |
| 6,123,627 A | 9/2000 | Antonious |
| 6,162,132 A | 12/2000 | Yoneyama |
| 6,217,461 B1 | 4/2001 | Galy |
| 6,296,574 B1 | 10/2001 | Kaldis |
| 6,306,048 B1 | 10/2001 | McCabe et al. |
| 6,348,014 B1 | 2/2002 | Chiu |
| 6,379,265 B1 | 4/2002 | Hirakawa et al. |
| 6,409,612 B1 | 6/2002 | Evans et al. |
| 6,436,142 B1 | 8/2002 | Paes et al. |
| 6,458,044 B1 | 10/2002 | Vincent et al. |
| 6,592,468 B2 | 7/2003 | Vincent |
| 6,648,772 B2 | 11/2003 | Vincent et al. |
| 6,719,510 B2 | 4/2004 | Cobzaru |
| 6,773,360 B2 | 8/2004 | Willett et al. |
| 6,811,496 B2 | 11/2004 | Wahl et al. |
| 6,860,818 B2 | 3/2005 | Mahaffey et al. |
| 6,881,158 B2 | 4/2005 | Yang et al. |
| 6,988,960 B2 | 1/2006 | Mahaffey et al. |
| 7,086,961 B2 | 8/2006 | Wright |
| 7,121,956 B2 | 10/2006 | Lo |
| 7,153,220 B2 | 12/2006 | Lo |
| 7,166,038 B2 | 1/2007 | Williams |
| 7,166,040 B2 | 1/2007 | Hoffman et al. |
| 7,166,041 B2 | 1/2007 | Evans |
| 7,179,034 B2 | 2/2007 | Ladouceur |
| 7,186,190 B1 | 3/2007 | Beach et al. |
| 7,189,169 B2 | 3/2007 | Billings |
| 7,223,180 B2 | 5/2007 | Willett et al. |
| 7,294,065 B2 | 11/2007 | Liang et al. |
| 7,309,297 B1 | 12/2007 | Solari |
| 7,326,472 B2 | 2/2008 | Shimazaki et al. |
| 7,351,161 B2 | 4/2008 | Beach |
| 7,407,447 B2 | 8/2008 | Beach |
| 7,410,425 B2 | 8/2008 | Willett et al. |
| 7,410,426 B2 | 8/2008 | Willett et al. |
| 7,419,441 B2 | 9/2008 | Hoffman et al. |
| 7,448,963 B2 | 11/2008 | Beach et al. |
| 7,452,285 B2 | 11/2008 | Chao et al. |
| 7,497,789 B2 | 3/2009 | Burnett |
| 7,530,901 B2 | 5/2009 | Imamoto |
| 7,530,904 B2 | 5/2009 | Beach et al. |
| 7,540,811 B2 | 6/2009 | Beach et al. |
| 7,568,985 B2 | 8/2009 | Beach et al. |
| 7,578,753 B2 | 8/2009 | Beach et al. |
| 7,604,548 B2 | 10/2009 | Cole |
| 7,628,711 B2 | 12/2009 | Akinori et al. |
| 7,632,194 B2 | 12/2009 | Beach et al. |
| 7,670,235 B2 | 3/2010 | Lo |
| 7,713,142 B2 | 5/2010 | Hoffman et al. |
| 7,717,804 B2 | 5/2010 | Beach et al. |
| 7,717,805 B2 | 5/2010 | Beach et al. |
| 7,744,484 B1 * | 6/2010 | Chao ..................... A63B 60/02 473/409 |
| 7,758,452 B2 | 7/2010 | Soracco |
| 7,771,290 B2 | 8/2010 | Bezilla et al. |
| 7,775,905 B2 | 8/2010 | Beach et al. |
| 7,806,781 B2 | 10/2010 | Imamoto |
| 7,850,542 B2 | 12/2010 | Cackett |
| 8,025,591 B2 | 9/2011 | de la Cruz |
| 8,043,167 B2 | 10/2011 | Boyd et al. |
| 8,092,316 B2 | 1/2012 | Breier et al. |
| 8,100,781 B2 | 1/2012 | Burnett |
| 8,105,175 B2 | 1/2012 | Breier et al. |
| 8,182,363 B2 | 5/2012 | Bezilla et al. |
| 8,192,302 B2 | 6/2012 | Knutson et al. |
| 8,197,357 B1 | 6/2012 | Rice |
| 8,292,757 B2 | 10/2012 | Soracco |

(56) References Cited

U.S. PATENT DOCUMENTS

| | | | |
|---|---|---|---|
| 8,388,465 B2 | 3/2013 | De La Cruz et al. | |
| 8,435,135 B2 | 5/2013 | Stites et al. | |
| 8,444,506 B2 | 5/2013 | Watson | |
| 8,540,588 B2 | 9/2013 | Rice | |
| 8,540,589 B2 | 9/2013 | Bezilla et al. | |
| 8,636,608 B2 | 1/2014 | de la Cruz | |
| 8,636,610 B2 | 1/2014 | Golden | |
| 8,684,863 B2 | 4/2014 | Bezilla et al. | |
| 8,690,706 B2 | 4/2014 | Stites | |
| 8,696,283 B1* | 4/2014 | Dawson | A63B 53/04 411/383 |
| 8,753,226 B2 | 6/2014 | Rice | |
| 8,753,227 B1* | 6/2014 | Cackett | A63B 53/06 411/397 |
| 8,857,647 B2* | 10/2014 | Nakamura | B65D 41/0492 220/301 |
| 8,858,362 B1 | 10/2014 | Leposky et al. | |
| 8,944,934 B2* | 2/2015 | Yamamoto | A63B 53/0466 473/335 |
| 8,979,671 B1 | 3/2015 | DeMille et al. | |
| 9,095,753 B2 | 8/2015 | Bezilla et al. | |
| 9,205,312 B2 | 12/2015 | Zimmerman | |
| 9,216,333 B2 | 12/2015 | Bezilla et al. | |
| 9,358,431 B2* | 6/2016 | Yamamoto | A63B 53/04 |
| 9,387,373 B1 | 7/2016 | DeMille et al. | |
| 9,504,884 B2 | 11/2016 | Bennett | |
| 9,550,097 B1* | 1/2017 | Myers | A63B 53/047 |
| 9,700,767 B2 | 7/2017 | Zimmerman | |
| 9,700,770 B2 | 7/2017 | Cleghorn | |
| 9,707,458 B2 | 7/2017 | Luttrell | |
| 9,744,415 B2* | 8/2017 | Frame | A63B 53/06 |
| 9,814,954 B2 | 11/2017 | Westrum | |
| 10,022,602 B2* | 7/2018 | Kingston | A63B 60/52 |
| 10,092,803 B2 | 10/2018 | Cleghorn | |
| 10,092,804 B2 | 10/2018 | Luttrell | |
| 10,391,371 B2 | 8/2019 | Luttrell | |
| 10,518,145 B2* | 12/2019 | Cleghorn | A63B 53/06 |
| 10,786,713 B2* | 9/2020 | Sanchez | A63B 53/0466 |
| 11,013,966 B2* | 5/2021 | Cleghorn | A63B 53/06 |
| 2003/0148818 A1 | 8/2003 | Myrhum et al. | |
| 2006/0058112 A1 | 3/2006 | Haralason et al. | |
| 2006/0100029 A1 | 5/2006 | Lo | |
| 2006/0122004 A1 | 6/2006 | Chen et al. | |
| 2006/0217216 A1 | 9/2006 | Iizuka | |
| 2007/0155534 A1 | 7/2007 | Tsai et al. | |
| 2008/0009366 A1* | 1/2008 | Lo | A63B 60/02 473/335 |
| 2008/0039229 A1 | 2/2008 | Lo | |
| 2008/0132353 A1 | 6/2008 | Hsiao | |
| 2010/0284760 A1 | 11/2010 | Rotolo | |
| 2012/0202615 A1* | 8/2012 | Beach | A63B 53/06 473/345 |
| 2013/0150180 A1* | 6/2013 | Yamamoto | A63B 60/42 473/339 |
| 2013/0316842 A1* | 11/2013 | Demkowski | A63B 53/047 473/291 |
| 2014/0038737 A1 | 2/2014 | Roach et al. | |
| 2014/0113741 A1 | 4/2014 | Bezilla | |
| 2014/0187347 A1* | 7/2014 | Yamamoto | A63B 53/047 473/335 |
| 2015/0111661 A1* | 4/2015 | Bennett | A63B 60/02 473/334 |
| 2015/0360094 A1 | 12/2015 | Deshmukh | |
| 2016/0016055 A1* | 1/2016 | DiMarco | F16B 23/00 473/335 |
| 2017/0259128 A1 | 9/2017 | Greensmith | |
| 2018/0318676 A1* | 11/2018 | Kingston | A63B 60/04 |
| 2020/0188746 A1* | 6/2020 | Sugimae | A63B 53/0408 |
| 2020/0268108 A1* | 8/2020 | Fiedler | F16B 21/02 |

FOREIGN PATENT DOCUMENTS

| | | |
|---|---|---|
| GB | 2133295 | 7/1984 |
| JP | 10137374 | 5/1998 |
| JP | 10234902 | 9/1998 |
| JP | 10248964 | 9/1998 |
| JP | 11319167 | 11/1999 |
| JP | 2000005350 | 1/2000 |
| JP | 2000176059 | 6/2000 |
| JP | 2001000606 | 1/2001 |
| JP | 2001149514 | 6/2001 |
| JP | 2002011124 | 1/2002 |
| JP | 2005160947 | 6/2005 |
| JP | 2006000435 | 1/2006 |
| JP | 2006081862 | 3/2006 |
| JP | 2006122334 | 5/2006 |
| JP | 2006187489 | 7/2006 |
| JP | 2006198251 | 8/2006 |
| JP | 2006239154 | 9/2006 |
| JP | 2007313304 | 12/2007 |

* cited by examiner

GOLF CLUB HAVING REMOVEABLE WEIGHT

RELATED APPLICATIONS

The current application is a continuation-in-part of U.S. application Ser. No. 16/780,040, filed on Feb. 3, 2020, currently, which is a continuation-in-part of U.S. application Ser. No. 16/539,622, filed on Aug. 13, 2019, currently, which is a continuation-in-part of U.S. application Ser. No. 16/219,651, filed on Dec. 13, 2018, now abandoned and the current application is a continuation-in-part of U.S. patent application Ser. No. 16/509,420, filed on Jul. 11, 2019, currently, which is a continuation of U.S. patent application Ser. No. 16/132,053, filed Sep. 14, 2018, now U.S. Pat. No. 10,391,371, which is a divisional of U.S. patent application Ser. No. 15/629,263, filed Jun. 21, 2017, now U.S. Pat. No. 10,092,803, which is a continuation of U.S. patent application Ser. No. 14/788,243, filed on Jun. 30, 2015, now U.S. Pat. No. 9,700,770, which is a continuation-in-part of U.S. patent application Ser. No. 14/143,330 filed on Dec. 30, 2013, now U.S. Pat. No. 9,095,753, which is a continuation-in-part of U.S. patent application Ser. No. 13/337,910, filed on Dec. 27, 2011, now U.S. Pat. No. 8,684,863, the disclosure of which are incorporated by reference in their entirety.

FIELD OF THE INVENTION

The invention relates to golf clubs, and more particularly, to golf club heads having a removable weight.

BACKGROUND OF THE INVENTION

The trend of lengthening golf courses to increase their difficulty has resulted in a high percentage of amateur golfers constantly searching for ways to achieve more distance from their golf shots. The golf industry has responded by providing golf clubs specifically designed with distance and accuracy in mind. The size of wood-type golf club heads has generally been increased while multi-material construction and reduced wall thicknesses have been included to provide more mass available for selective placement through the head. The discretionary mass placement has allowed the club to possess a higher moment of inertia (MOI), which translates to a greater ability to resist twisting during off-center ball impacts and less of a distance penalty for those off-center ball impacts.

Various methods are used to selectively locate mass throughout golf club heads, including thickening portions of the body casting itself or strategically adding separate weight elements during the manufacture of the club head. An example, shown in U.S. Pat. No. 7,186,190, discloses a golf club head comprising a number of moveable weights attached to the body of the club head. The club head includes a number of threaded ports into which the moveable weights are screwed. Though the mass characteristics of the golf club may be manipulated by rearranging the moveable weights, the cylindrical shape of the weights and the receiving features within the golf club body necessarily moves a significant portion of the mass toward the center of the club head, which may not maximize the peripheral weight of the club head or the MOI.

Alternative approaches for selectively locating mass in a club head utilize composite multi-material structures. These composite structures utilize two, three, or more materials that have different physical properties including different densities. An example of this type of composite club head is shown in U.S. Pat. No. 5,720,674. The club head comprises an arcuate portion of high-density material bonded to a recess in the back-skirt. Because composite materials like those found in the club head must be bonded together, for example by welding, swaging, or using bonding agents such as epoxy, they may be subject to delamination or corrosion over time. This component delamination or corrosion results in decreased performance in the golf club head and can lead to club head failure.

Though many methods of optimizing the mass properties of golf club heads exist, there remains a need in the art for a golf club head comprising at least a removable weight having secure attachment and a low-profile so that the weight does not protrude into the center of the club head and negatively affect the location of the center of gravity.

SUMMARY OF THE INVENTION

The systems, methods, and devices described herein have innovative aspects, no single one of which is indispensable or solely responsible for their desirable attributes. Without limiting the scope of the claims, some of the advantageous features will now be summarized.

One non-limiting embodiment of the present technology includes a golf club head, including a hosel; a ball striking face; a sole extending aftward from a lower edge of the ball striking face; a crown extending aftward from an upper edge of the ball striking face; a skirt extending between the sole and the crown; a weight mount disposed on at least one of the sole, the crown, and the skirt; a weight member configured to reside in the weight mount; a compressible member residing between the weight member and the weight mount; wherein the weight member comprises a longitudinal axis about which the weight member is configured to rotate, the weight member including projections extending radially outwards from the longitudinal axis; wherein the weight mount comprises circumferential ramps; wherein rotation of the weight member about the longitudinal axis forces the projections along the circumferential ramps; wherein the weight member goes from an unlocked position to a locked position in less than one full turn of the weight member relative to the weight mount; wherein rotation of the weight member compresses the compressible member; wherein the circumferential ramps comprise detents, wherein the projections are configured to reside in the detents when the weight member is in the locked position.

In another non-limiting embodiment the weight member goes from an unlocked position to a locked position in less than half of one full turn of the weight member relative to the weight mount.

In another non-limiting embodiment the compressible member comprises an elastomeric material.

In another non-limiting embodiment the weight member is formed of a first portion configured to engage the circumferential ramps and a second portion configured to engage the compressible member, wherein the first portion is made of a first material having a first density and the second portion is made of a second material having a second density.

In another non-limiting embodiment the first density is greater than the second density.

In another non-limiting embodiment the first portion is affixed to the second portion.

In another non-limiting embodiment the weight mount is made of a third material having a third density wherein the third density is less than the first density.

Another non-limiting embodiment includes a golf club head, including a hosel; a ball striking face; a sole extending aftward from a lower edge of the ball striking face; a crown extending aftward from an upper edge of the ball striking face; a skirt extending between the sole and the crown; a weight mount disposed on at least one of the sole, the crown, and the skirt; a weight member configured to reside in the weight mount; a compressible member residing between the weight member and the weight mount; wherein the weight mount comprises circumferential ramps; wherein the weight member goes from an unlocked position to a locked position in less than one full turn of the weight member relative to the weight mount; wherein rotation of the weight member compresses the compressible member; wherein the weight member is formed of a first portion configured to engage the circumferential ramps and a second portion configured to engage the compressible member, wherein the first portion is made of a first material having a first density and the second portion is made of a second material having a second density, wherein the first density is different than the second density.

In another non-limiting embodiment the weight member goes from an unlocked position to a locked position in less than half of one full turn of the weight member relative to the weight mount.

In another non-limiting embodiment the compressible member comprises an elastomeric material.

In another non-limiting embodiment the weight member comprises a longitudinal axis about which the weight member is configured to rotate, the weight member including projections extending radially outwards from the longitudinal axis.

In another non-limiting embodiment rotation of the weight member about the longitudinal axis forces the projections along the circumferential ramps.

In another non-limiting embodiment the circumferential ramps comprise detents, wherein the projections are configured to reside in the detents when the weight member is in the locked position.

In another non-limiting embodiment the first portion is affixed to the second portion.

In another non-limiting embodiment the weight mount is made of a third material having a third density wherein the third density is less than the first density.

Another non-limiting embodiment includes a golf club head, including a hosel; a ball striking face; a sole extending aftward from a lower edge of the ball striking face; a crown extending aftward from an upper edge of the ball striking face; a skirt extending between the sole and the crown; a weight mount disposed on at least one of the sole, the crown, and the skirt; a weight member configured to reside in the weight mount; a compressible member residing between the weight member and the weight mount; wherein the weight member comprises a longitudinal axis about which the weight member is configured to rotate, the weight member including projections extending radially outwards from the longitudinal axis; wherein the weight mount comprises circumferential ramps; wherein rotation of the weight member about the longitudinal axis forces the projections along the circumferential ramps; wherein the weight member goes from an unlocked position to a locked position in less than one full turn of the weight member relative to the weight mount; wherein rotation of the weight member compresses the compressible member; wherein the circumferential ramps comprise detents, wherein the projections are configured to reside in the detents when the weight member is in the locked position wherein the weight mount comprises an outer member abutting an external surface of the golf club head and an inner member abutting an internal surface of the golf club head, wherein the outer member is affixed to the inner member.

In another non-limiting embodiment the inner member is affixed to the outer member via a threaded interface.

In another non-limiting embodiment the weight mount is affixed to the sole, where a density of the weight mount is less than a density of the sole which is less than a density of the weight member.

In another non-limiting embodiment the weight member goes from an unlocked position to a locked position in less than half of one full turn of the weight member relative to the weight mount.

In another non-limiting embodiment the compressible member comprises an elastomeric material.

BRIEF DESCRIPTION OF THE DRAWINGS

FIG. 74 is a perspective view of the weight member of FIG. 73 including one embodiment of a fastener.

DETAILED DESCRIPTION

Figure 1:
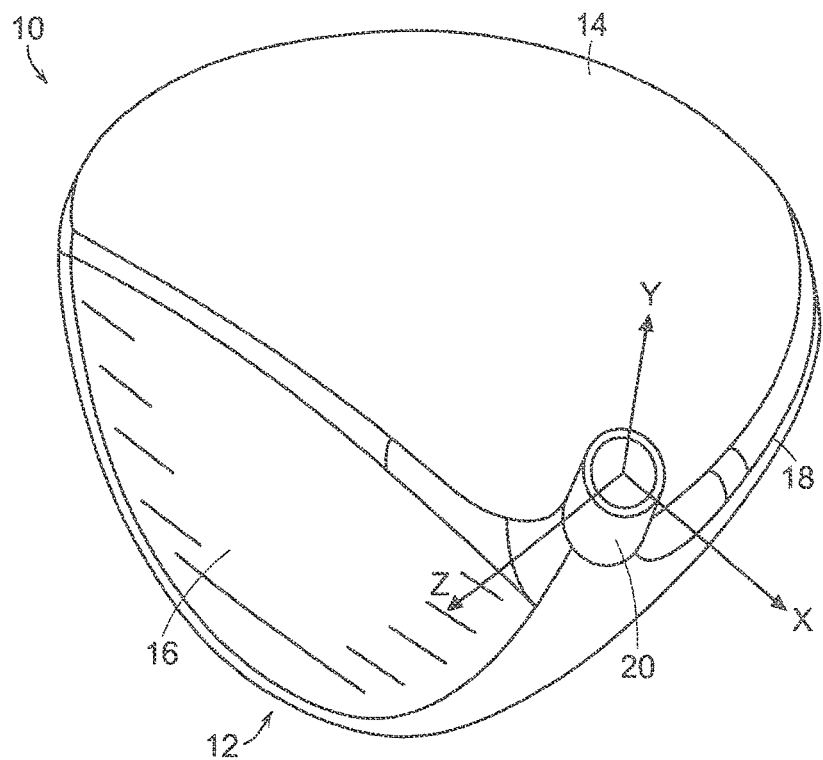
FIG. 1 is a perspective view of a golf club head.
Figure 2:
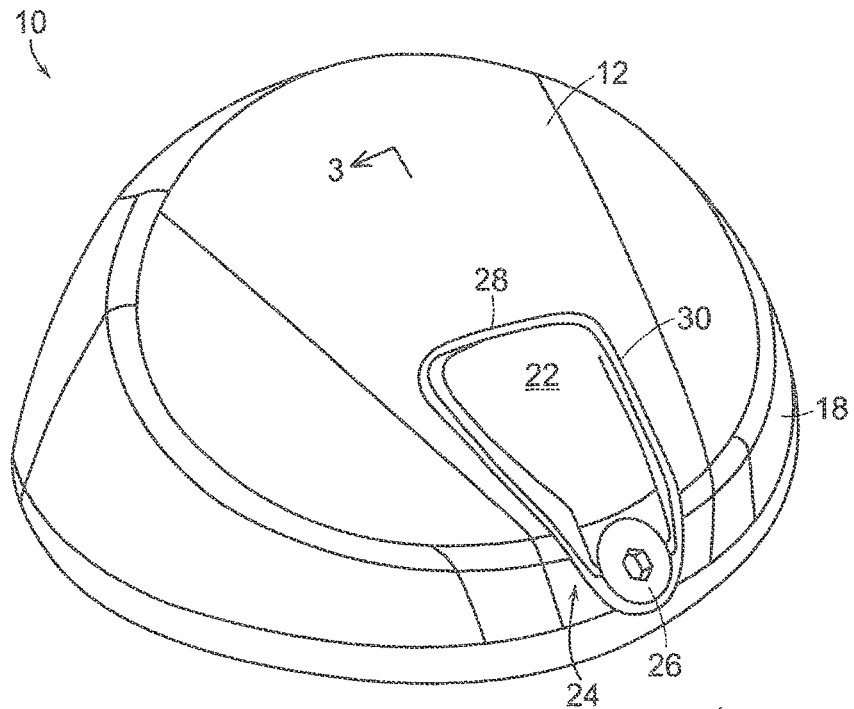
FIG. 2 is a perspective view of an aft portion of a golf club head of the present invention including a removable weight member.
Figure 3:
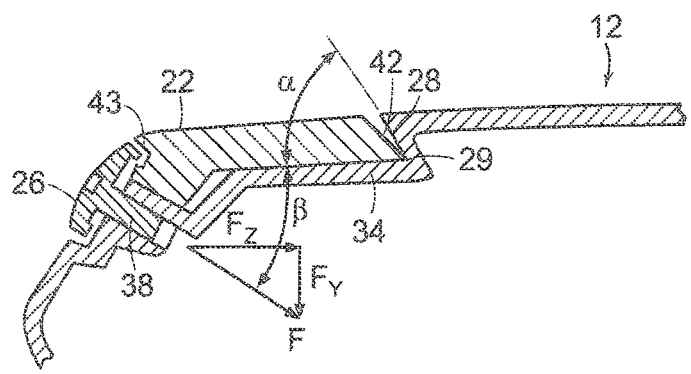
FIG. 3 is a cross-sectional view of a portion of the golf club head and removable weight member of FIG. 2.
Figure 4:
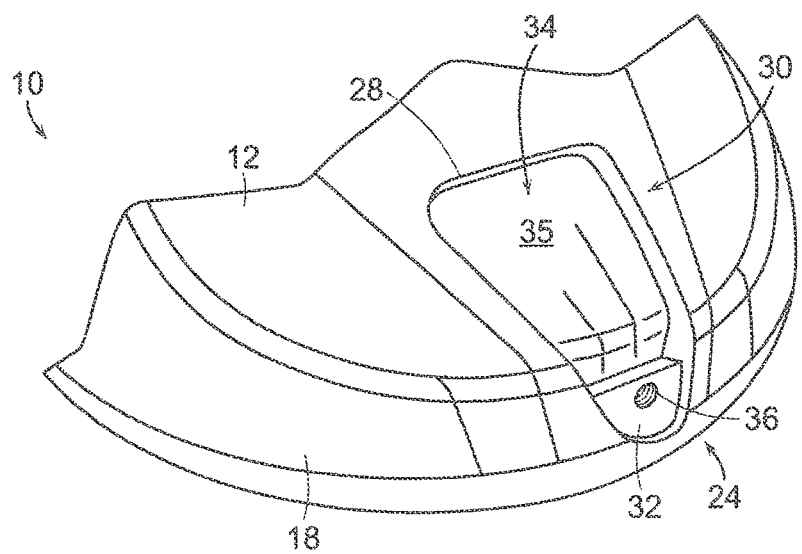
FIG. 4 is a perspective view of an aft portion of the golf club head of FIG. 2 without the removable weight member.

Other than in the operating examples, or unless otherwise expressly specified, all of the numerical ranges, amounts, values and percentages such as those for amounts of materials, moments of inertias, center of gravity locations, loft and draft angles, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The golf club head of the present invention is preferably hollow, such as a metal wood type golf club head, but may include any club head type, such as iron-type club heads. The golf club head generally includes a hosel, a hitting face, a crown, a sole, and a skirt that combine to define a hollow interior cavity.

The inventive golf club head also has a low profiled weight member disposed on a portion of the club head, and preferably on the crown, sole and/or skirt of the golf club head.

The embodiments described below are generally illustrated so that the weight member is attached at least partially to the sole for convenience. However, as will be appreciated by a person having ordinary skill, weight mounts and weight members having the same structures as those described may be located on any portion of the golf club head, such as the crown and/or skirt.

An equivalent plan area ($Area_{EP}$) of the weight member is preferably greater than approximately 200 mm² where equivalent plan area is:

$$Area_{EP} = V/T_{ave}$$

where V is the volume of the weight member and T is an average thickness taken generally normal to an outer surface of the weight member and toward the interior of the golf club head. In weight members including an elongate fastener that extends toward an interior of the club head, the average thickness is calculated disregarding the elongate fastener. In each of the embodiments described below, it is preferred that the mass of the weight member range between 2 grams and 30 grams and that the equivalent plan area be greater than approximately 200 mm² and even more preferably greater than 250 mm². Also, weight member preferably has an average thickness that is less than about 8 mm, and more preferably less than about 6 mm.

An exemplary club head is shown FIGS. 1-4. Club head 10 includes a sole 12, a crown 14, a hitting face 16, a skirt 18, a hosel 20, and a weight member 22. Sole 12 generally provides the lower surface of golf club head 10 when the club head is placed in an address position. Sole 12 includes a weight mount 24, which is configured to couple weight member 22 to sole 12. In the present embodiment, mount 24 is a recessed portion of sole 12 that is shaped to complement the shape of weight member 22. For example, weight member 22 is generally trapezoidal in plan shape and weight mount 24 includes a generally trapezoidally-shaped recess.

Mount 24 includes a fastener 26, a bevel 28 and a receiver 30. Mount 24 is constructed to clamp weight member 22 between bevel 28 and fastener 26. In particular, mount 24 is constructed so that when weight member 22 is located on mount 24, and fastener 26 is tightened, fastener 26 forces weight member 22 at least partially laterally against bevel 28. As a result, a portion of weight member 22 is drawn tighter against sole 12 by the interaction between the weight member and the bevel.

In the present embodiment, receiver 30 is a recessed portion of sole 12 and skirt 18 and aligns weight member 22 relative to the remainder of the golf club head when weight member 22 is disposed in mount 24. Receiver 30 includes a fastener portion 32 and a support portion 34. Fastener portion 32 includes a threaded bore 36 that receives a threaded shank 38 of fastener 26. Support portion 34 includes a generally planar support surface 35 that extends between fastener portion 32 and bevel 28 and provides support for weight member 22 when weight member 22 is disposed in receiver 30. The recessed configuration of receiver 30 also limits the movement of weight member 22 laterally relative to bevel 28.

Bevel 28 forms an undercut portion of mount 24 that receives a portion of weight member 22. Bevel 28 extends from support surface 35 at a location that is spaced from fastener 26 and is angled relative to support surface 35 by a bevel angle α that is an acute angle. Bevel angle α is acute so that as weight member 22 is forced into bevel 28, weight member 22 is forced against support surface 35. Bevel angle α is preferably between about 25° and about 65°, and more preferably between about 35° and about 55° relative to support surface 35, and in particular relative to a planar portion of support surface 35 that is adjacent a base 29 of bevel 28.

Weight member 22 includes an angled abutment surface 42 and a fastener engagement feature 43. Angled abutment surface 42 is a surface that complements the shape of bevel 28 of mount 24 and that abuts bevel 28 when weight member 22 is installed on mount 24. Bevel 28 and abutment surface 42 are angled so that as weight member 22 is forced into abutment with bevel 28 a force component along the abutting surfaces causes weight member 22 to slide against bevel 28 and to be forced against sole 12.

Fastener 26 is oriented so that as it is tightened in club head 10 it forces weight member 22 toward bevel 28. Threaded bore 36 is angled relative to support surface 35 so that interaction between fastener 26 and weight member 22 causes weight member 22 to move laterally, generally parallel to support surface 35, when fastener 26 is tightened. Fastener 26 engages club head 10 at a coupling angle β, relative to support surface 35, which has a magnitude that is less than 90° so that at least a component of the force applied by tightening fastener 26 is directed toward bevel 28, as shown by force component Fz. Preferably, coupling angle is less than 45° so that the Fz forms a larger force component than Fy, which is generally normal to support surface 35.

Mount 24 is preferably located in an aft portion of club head 10 so that weight member 22 is positioned behind and below the center of gravity of club head 10 without weight member 22. The inclusion of weight member 22 in this location aids in moving the center of gravity of the club head rearward and lower than the club head without the weight member.

Figure 5:
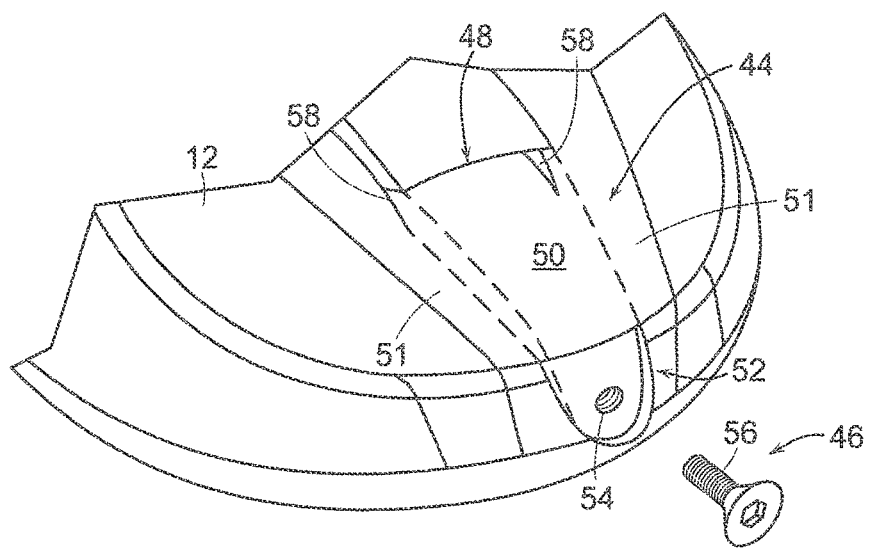
FIG. 5 is a perspective view of an alternative construction of the aft portion of the golf club of FIG. 4 without a removable weight member.

Referring to FIG. 5, another embodiment of a mount 44 will be described. Mount 44 is similar to mount 24 of the previous embodiment, but does not include a recess for receiving the weight member so that a support surface 50 is flush with the laterally adjacent portions 51 of the sole. Mount 44 is configured to clamp weight member 22 (illustrated by dashed lines) between a bevel 48 and a fastener 46. In particular, when weight member 22 is located on mount 44, and fastener 46 is tightened, the interaction between fastener 46 and weight member 22 forces weight member 22 at least partially laterally and against bevel 48. Forcing weight member 22 against bevel 48 causes weight member 22 to slide along bevel 48 and into the undercut formed by bevel 48 so that weight member 22 is forced against support surface 50. As a result, weight member 22 is forced tightly against sole 12 by the angled interface interaction between the weight member and the bevel.

Mount 44 includes fastener 46, bevel 48, support surface 50 and a fastener portion 52. A portion of the club head body defines bevel 48, support surface 50 and fastener portion 52. Support surface 50 extends between bevel 48 and fastener portion 52 and is a surface that abuts the underside of weight member 22 when it is installed in mount 44. Support surface 50 may be a generally planar surface, as shown, so that it complements a generally planar abutment surface of the weight member. Fastener portion 52 includes a threaded bore 54 that receives a threaded shank 56 of fastener 46.

Similar to the previous embodiment, bevel forms an undercut portion that receives a portion of the weight member. Bevel 48 extends outward from sole 12 and support surface 50 at a location that is spaced from fastener 46. Bevel 48 is angled relative to support surface 50 by a bevel angle α that is acute relative to support surface 50.

Mount 44 also includes lateral walls 58 that are located adjacent bevel 48. Lateral walls 58 extend toward fastener portion 52 and form alignment features for weight member 22 when it is disposed on mount 44. In particular, lateral walls limit relative lateral motion between weight member 22 and bevel 48 so that the portion of weight member 22 that engages bevel 48 remains in contact with bevel 48 when it is installed. Lateral walls 58 extend outward and away from support surface 50 so that they are raised relative to the support surface 50. The height of lateral walls 58 is preferably less than, or equal to, the height of bevel 48 from support surface 50. For example, lateral walls 58 have a height relative to support surface 50 that is about 25%-100% of the height of bevel 48. Preferably, the height of lateral walls 58 is about 50% of the height of bevel 48.

Referring now to FIGS. 6-9, another embodiment of a golf club head including a weight will be described. Golf club head 60 includes a sole 62, a crown 64, a hitting face, a skirt 68, a hosel, and a weight member 72. Sole 62 includes a weight mount 74, which is configured to couple weight member 72 to the club head. In the present embodiment, mount 74 is constructed flush with adjacent portions of sole 62 (i.e., not recessed), so that an abutment surface 76 of weight member 72 is approximately flush with the adjacent portions of sole 62.

Mount 74 generally includes fastener 78, bevel 80, a support surface 82 and a fastener portion 84. A portion of the club head body defines bevel 80, support surface 82 and fastener portion 84. A portion of sole 62 that extends between bevel 80 and fastener portion 84 forms support surface 82. Support surface 82 is generally illustrated by the dashed line, but is contiguous with the adjacent portions of sole 62. Support surface 82 is shaped to complement abutment surface 76 of weight member 72 so that it abuts the underside of weight member 72 when the weight member is installed in mount 74. Fastener portion 84 includes a threaded bore 86 that receives a threaded shank 88 of fastener 78. Fastener 78 extends into skirt 68 so that as it is tightened in threaded bore 86 it translates generally toward bevel 80. As a result, when weight member 72 is installed and fastener 78 is tightened, the weight member is translated toward bevel 80 and into the undercut formed by bevel 80.

In the present embodiment, mount 74 includes an alignment feature in the form of tab 90 that interacts with weight member 72. Tab 90 is constructed as a tapered rib that extends aft-ward from bevel 80 toward fastener portion 84 and outward from support surface 82. Tab 90 tapers so that it narrows in the direction from bevel 80 toward fastener portion 84 and outward from support surface 82.

Weight member 72 includes an angled abutment surface 92 and a fastener engagement feature 94. Additionally, weight member 72 includes an alignment feature in the form of slot 96 that receives tab 90 when weight member 72 is installed on mount 74. Slot 96 is dimensioned so that as it receives tab 90 the tapered surfaces abut and limit relative movement between weight member 72 and the remainder of club head 60 while still allowing angled abutment surface 92 to slide along bevel 80. In particular as weight member 72 slides against bevel 80 it abuts tab 90. The interaction between the tapered tab 90 and the tapered slot 96 limits the amount that weight member 72 is able to slide against bevel 80 toward sole 62 and also limits relative lateral motion, i.e., relative motion generally in the heel-to-toe direction, between weight member 72 and bevel 80.

Angled abutment surface 92 is a surface that complements the shape of bevel 80 of mount 74 and that abuts bevel 80 when weight member 72 is installed on mount 74. Bevel 80 and abutment surface 92 are oriented so that as weight member 72 is forced into abutment with bevel 80 by the tightening of fastener 78, the abutment forces weight member 72 against sole 62.

Figure 6:
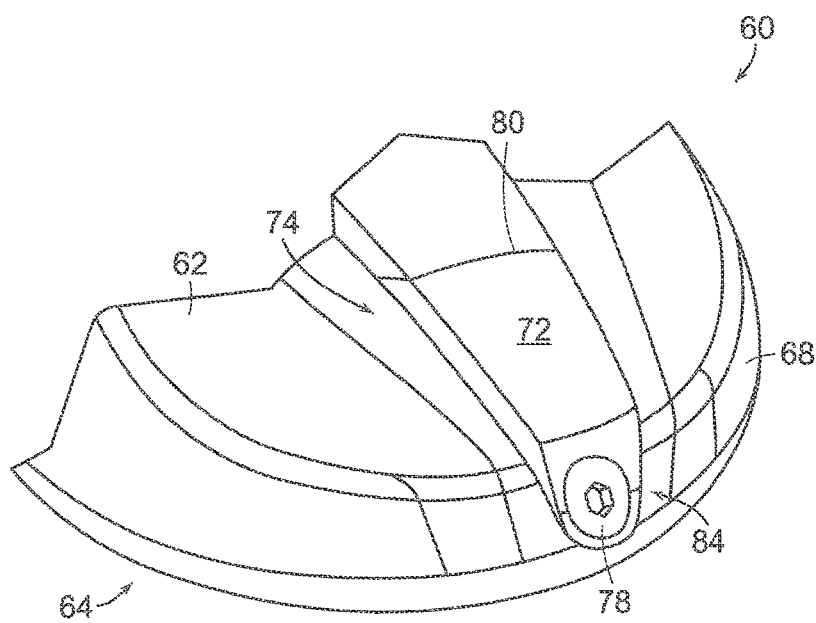
FIG. 6 is a perspective view of an aft portion of another embodiment of a golf club head including a removable weight member of the present invention.
Figure 7:
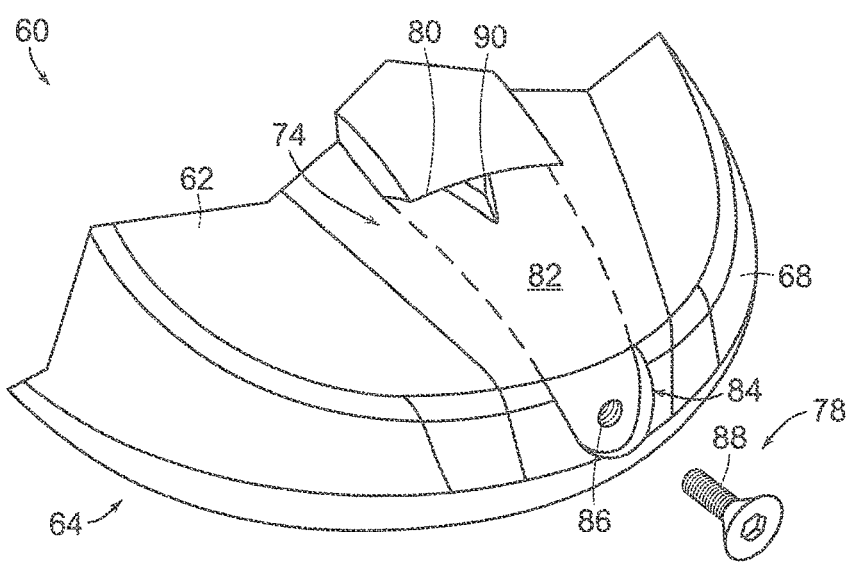
FIG. 7 is a perspective view of a portion of the golf club head of FIG. 6 without the removable weight member.
Figure 8:
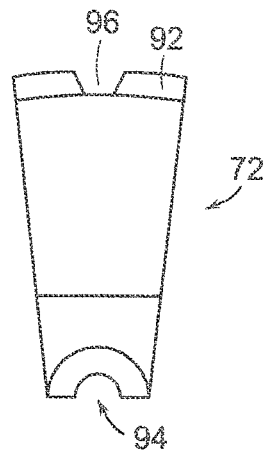
FIG. 8 is a plan view of an outer side of the removable weight member of FIG. 6.
Figure 9:
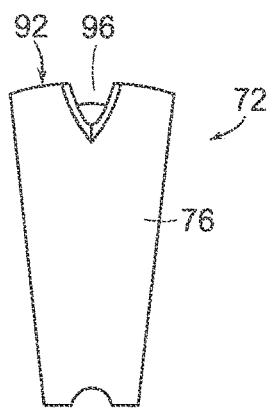
FIG. 9 is a plan view of an inner side of the removable weight member of FIG. 8.

Slot 96 is defined by weight member 72 and extends through a portion of angled abutment surface 76. In the present embodiment, the height of slot 96 is less than the thickness of weight member 72 so that it does not extend through the outer surface of weight member 72. As a result, and as shown in FIG. 6, neither slot 96 nor tab 90 are visible when weight member 72 is installed in club head 60.

Figure 10:
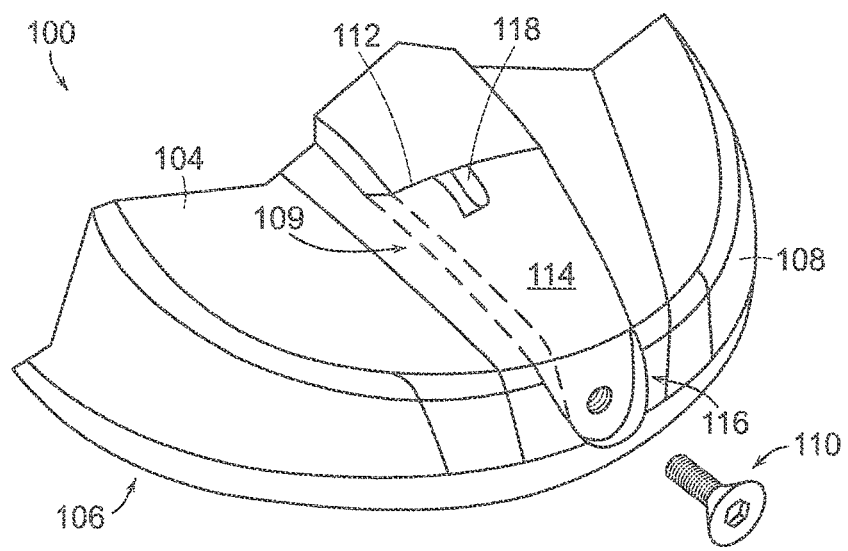
FIG. 10 is a perspective view of an alternative aft portion of a golf club head without the removable weight member.
Figure 11:
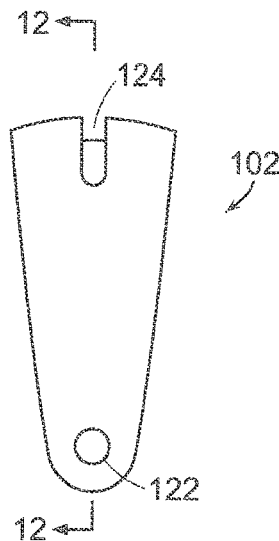
FIG. 11 is a plan view of an inner side of a removable weight member constructed to be installed on the golf club head of FIG. 10.
Figure 12:
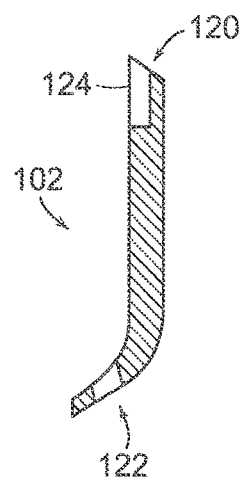
FIG. 12 is a cross-sectional view of the removable weight member of FIG. 11.

Another embodiment is illustrated in FIGS. 10-12, and includes a golf club head 100 that includes a weight member 102. The appearance of the mounted weight member 102 is nearly identical to the appearance of the golf club of FIG. 6, so the mounted weight member 102 is only illustrated in phantom in FIG. 10. In this embodiment, golf club head 100 has a structure similar to that of the previous embodiment with the exception of the alignment feature. In particular, weight member 102 has a structure similar to that of the previous embodiment, but the associated alignment feature is shaped and sized to complement the alignment feature of the weight mount included on golf club head 100.

Golf club head 100 includes a sole 104, a crown 106, a hitting face, a skirt 108, a hosel, and weight member 102. Sole 104 includes a weight mount 109, which is configured to couple weight member 102 and sole 104. In the present embodiment, mount 109 has a structure similar to that of the previous embodiment. However, the alignment feature has been modified. In particular, mount 109 generally includes fastener 110, bevel 112, a support surface 114 and a fastener portion 116.

The alignment feature has been modified to reduce the constraints placed on weight member 102 relative to mount 109 by the interaction between the alignment feature and weight member 102. Namely, the alignment feature is configured to control only lateral movement of weight member 102 relative to mount 109 and so that the construction of the alignment features is simplified. Mount 109 includes an alignment feature in the form of tab 118. Tab 118 is constructed as a straight rib that extends aft-ward from bevel 112 toward fastener portion 116, and outward from support surface 114. Tab 118 includes generally parallel sidewalls so that the width of tab 118 remains approximately constant over the length of tab 118.

Weight member 102 includes an angled abutment surface 120, a fastener engagement feature 122, and an alignment feature in the form of slot 124. Slot 124 engages tab 118 when weight member 102 is installed on mount 109 and is dimensioned so that its width closely matches the width of tab 118. As a result, the engagement of slot 124 and tab 118 limits lateral movement of weight member 102 relative to the remainder of club head 100. Angled abutment surface 120 is a surface that complements the shape of bevel 112 (i.e., the angled abutment surface of bevel 112) of mount 109 and that abuts bevel 112 when weight member 102 is installed on mount 109. Similar to previous embodiments, bevel 112 and abutment surface 120 are oriented so that as weight member 102 is forced into abutment with bevel 112, by the tightening of fastener 110, weight member 102 is forced against sole 104 in mount 109.

Figure 47:
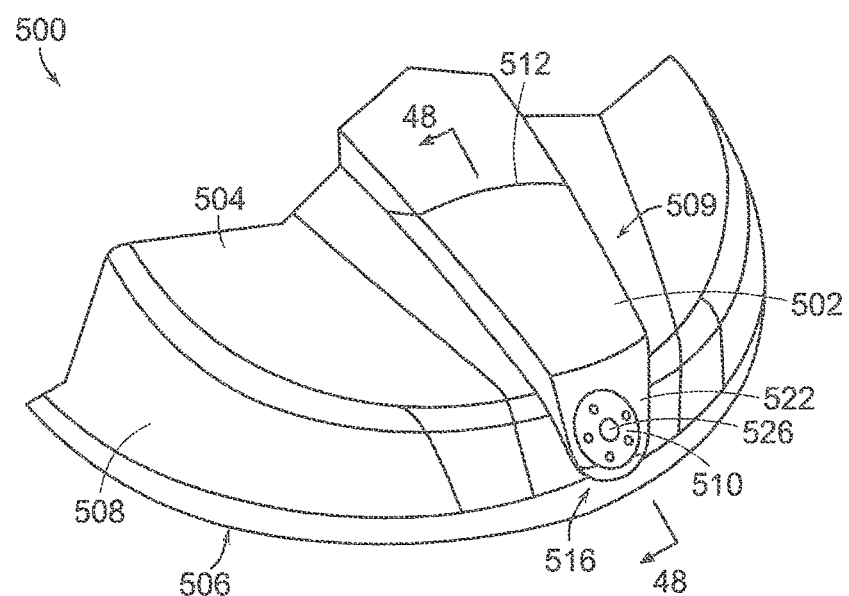
FIG. 47 is a perspective view of an aft portion of another embodiment of a golf club head including a removable weight member of the present invention.
Figure 48:
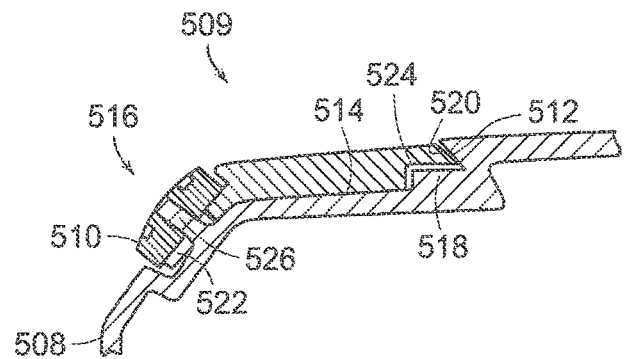
FIG. 48 is a cross-sectional view of a portion of the golf club head and removable weight member of FIG. 47.
Figure 49:
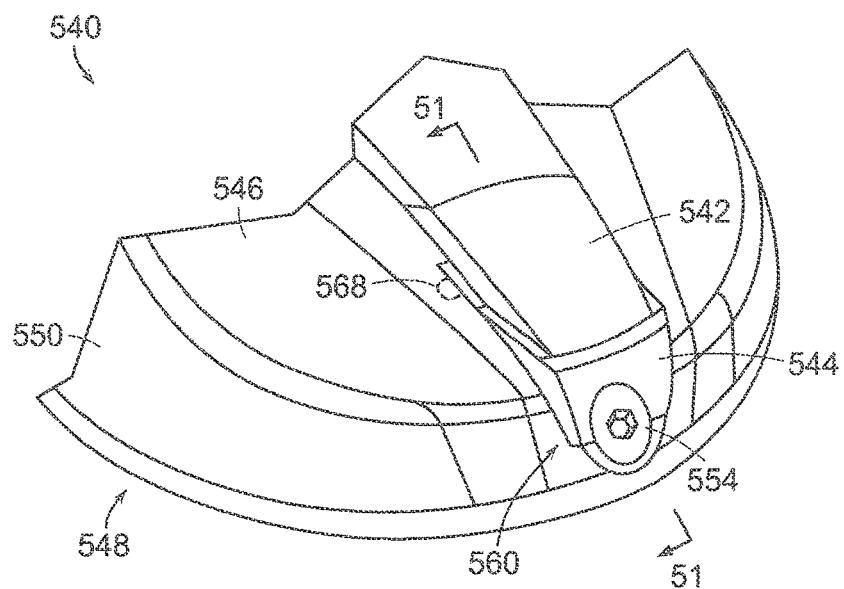
FIG. 49 is a perspective view of an aft portion of another embodiment of a golf club head including a removable weight member.
Figure 50:
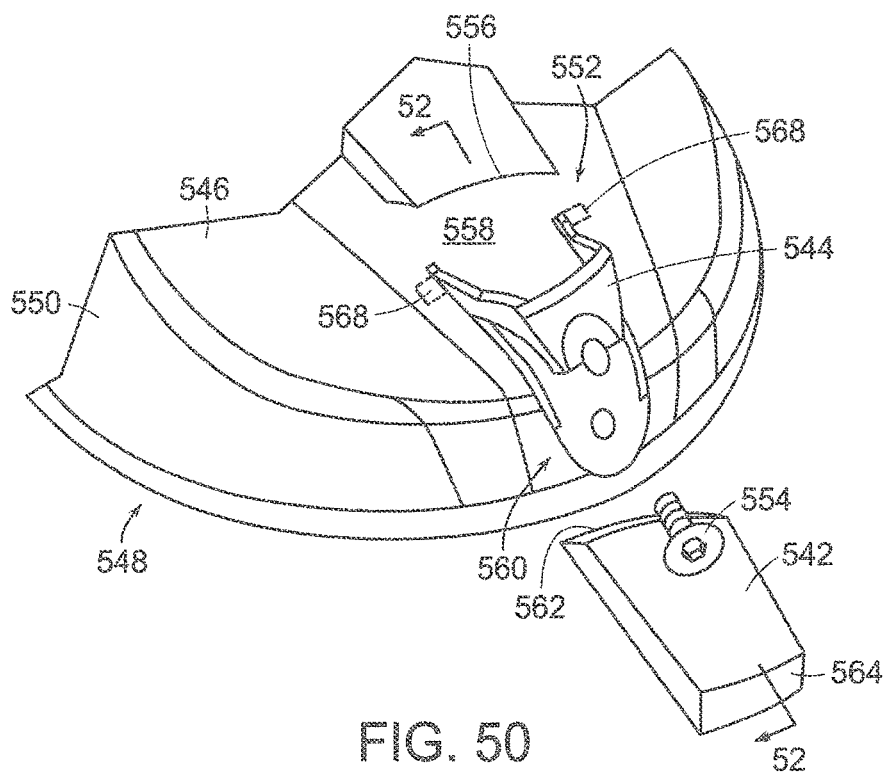
FIG. 50 is another perspective view of the aft portion of the golf club head of FIG. 49 without the removable weight member.
Figure 51:
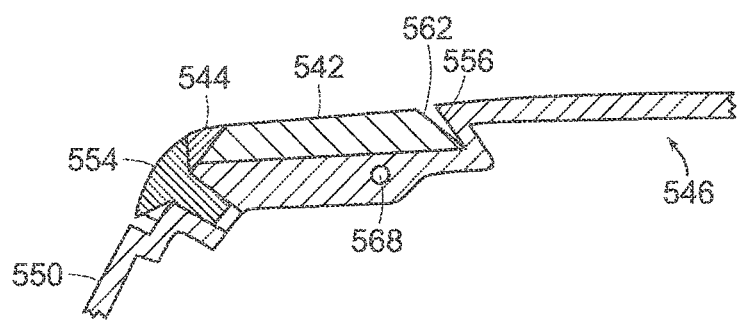
FIG. 51 is a cross-sectional view of a portion of the golf club head and removable weight member of FIG. 49.
Figure 52:
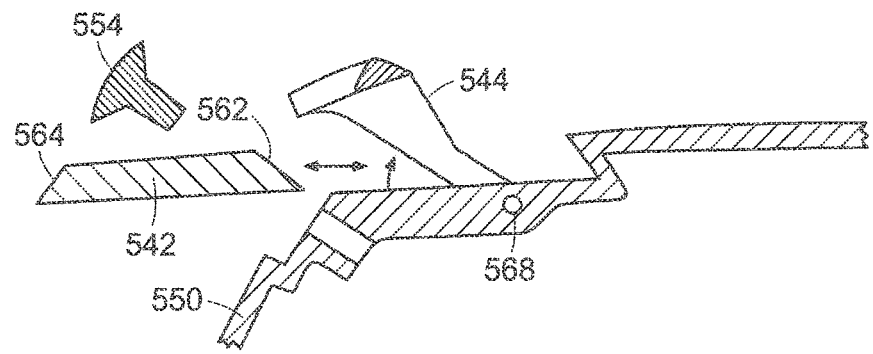
FIG. 52 is a cross-sectional view of a portion of the golf club head and removable weight member of FIG. 50.
Figure 53:
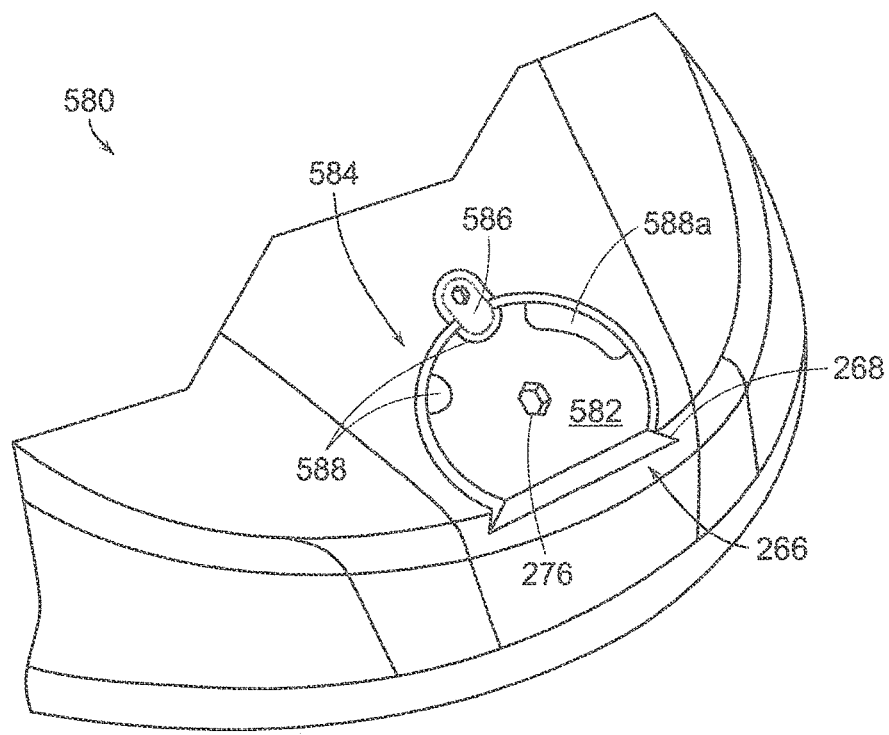
FIG. 53 is a perspective view of an aft portion of another embodiment of a golf club head including a removable weight member.

In a similar embodiment, illustrated in FIGS. 47 and 48, a golf club head 500 includes a sole 504, a crown 506, a hitting face, a skirt 508, a hosel, and a weight member 502. Sole 504 includes a weight mount 509, which is configured to couple weight member 502 and sole 504. Mount 509 generally includes a fastener 510, a bevel 512, a support surface 514 and a fastener portion 516.

Mount 509 includes an alignment feature in the form of tab 518 that interacts with weight member 502. Tab 518 is constructed as a rib with generally parallel lateral sides that extends aft-ward from bevel 512 toward fastener portion 516 and outward from support surface 514.

Weight member 502 includes an angled abutment surface 520 and a fastener engagement feature 522. Weight member 502 includes an alignment feature in the form of slot 524 that receives tab 518 when weight member 502 is installed on mount 509. Slot 524 is dimensioned so that as it receives tab 518 the side surfaces of the tab and slot are in close proximity to each other and preferably slide against each other to limit relative lateral movement between weight member 502 and the remainder of club head 500 while still allowing angled abutment surface 520 to slide along bevel 512. The height from support surface of tab 518 and slot 524 are selected so that clearance is provided between the tab and the weight member and the length from bevel 512 of tab 518 and slot 524 are selected so that clearance is provided between the aftward end of tab 518 and slot 524. As a result of those clearances, the interaction of tab 518 and slot do not limit the interaction between angled abutment surface 520 and bevel 512.

Angled abutment surface 520 is a surface that complements the shape of bevel 512 of mount 509 and that abuts bevel 512 when weight member 502 is installed on mount 509. Bevel 512 and abutment surface 520 are oriented so that as weight member 502 is forced into abutment with bevel 512 by the tightening of fastener 510, the abutment forces weight member 502 against sole 504.

Slot 524 is defined by weight member 502 and extends through a portion of angled abutment surface 520. In the present embodiment, the height of slot 524 is less than the thickness of weight member 502 so that it does not extend through the outer surface of weight member 502. As a result, and as shown in FIG. 47, neither slot 524 nor tab 518 are visible when weight member 502 is installed in club head 500.

A portion of sole 504 that extends between bevel 512 and fastener portion 516 forms support surface 514. Support surface 514 is shaped to abut the underside of weight member 502 when the weight member is installed in mount 509. Fastener portion 516 includes a fastener post 526 that is received by fastener 510. In the present embodiment, fastener 510 is a threaded nut that receives a threaded portion of fastener post 526, rather than a threaded bolt like previous embodiments, to illustrate an alternative fastener that may also be substituted in other embodiments. As fastener 510 is tightened on fastener post 526 and against weight member 502, weight member 502 is forced to translate toward bevel 512 and into the undercut formed by bevel 512.

Figure 13:
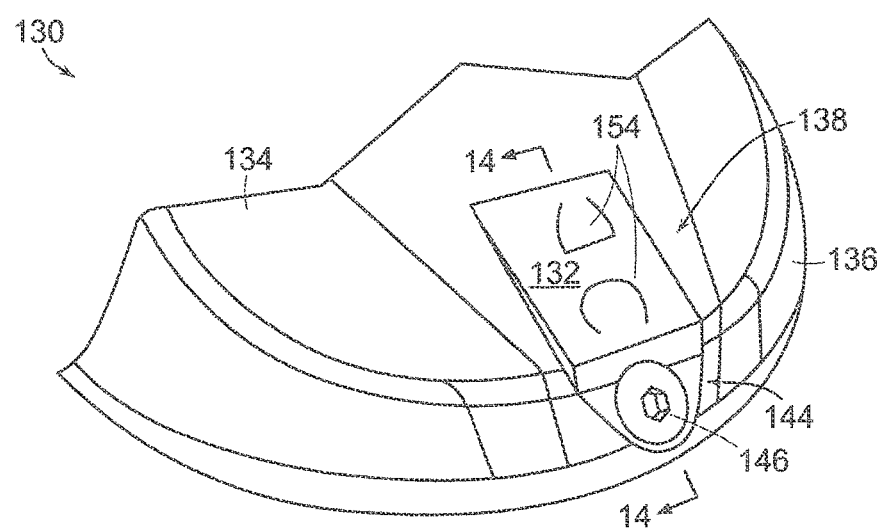
FIG. 13 is a perspective view of an aft portion of another embodiment of a golf club head including a removable weight member.
Figure 14:
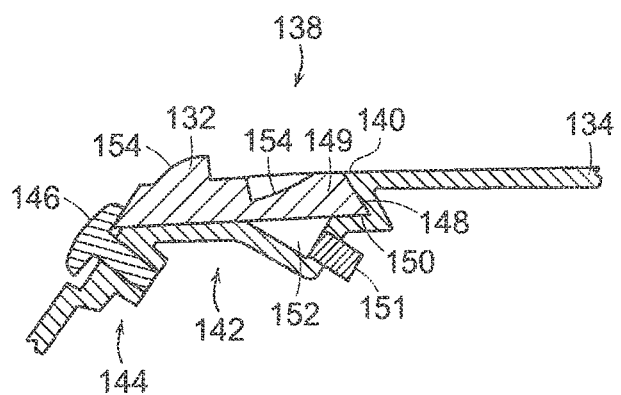
FIG. 14 is a cross-sectional view of the golf club head and removable weight member of FIG. 13.
Figure 15:
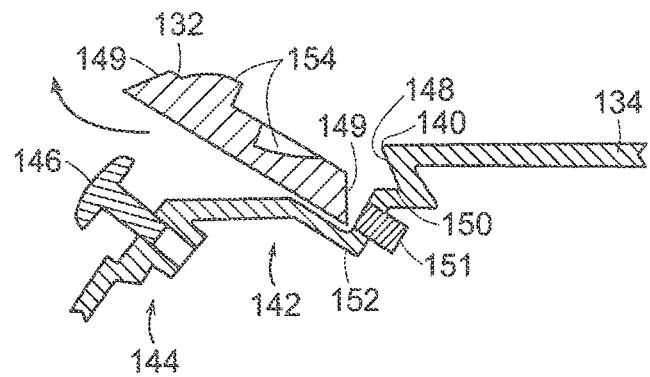
FIG. 15 is another cross-sectional view of the golf club head and removable weight member of FIG. 13.

Referring now to FIGS. 13-15, another embodiment of a golf club head 130 with a weight member 132 is illustrated. The portion of golf club head 130 that is shown includes a sole 134 and a skirt 136. Weight member 132 is installed in a weight mount 138 that extends across a portion of sole 134 and a portion of skirt 136.

Mount 138 includes a bevel 140, a support surface 142, a fastener portion 144 and a fastener 146. Bevel 140 is disposed at an end of mount 138 and includes an angled surface 148 that forcibly abuts an angled engagement surface 149, which is may be a planar surface, of weight member 132 when the weight member is fully installed on mount 138. In the illustrated embodiment, weight member 132 includes angled engagement surfaces 149 at opposite ends so that weight member 132 may be installed in one of two orientations rotated 180° relative to each other.

In the present embodiment, mount 138 includes a contoured support surface 142 to simplify the removal of weight member 132 from mount 138. The contoured support surface 142 generally includes an abutment portion 150 that is located adjacent bevel 140, and a recessed portion 152. Abutment portion 150 provides a surface that limits the translation of weight member 132 toward the remainder of the golf club head when one of the angled abutment surfaces 149 is forced against bevel 148.

Recessed portion 152 permits weight member 132 to be tilted relative to mount 138 during its insertion and removal, as shown in FIG. 15. In particular, the ability to tilt weight member 132 assists in its removal from mount 138 and so that fastener 146 need not be fully removed during insertion and removal of weight member 132. Recessed portion 152 is disposed between abutment portion 150 and fastener portion 144 and extends toward the interior of club head 130 relative to abutment portion 150. Recessed portion 152 is sized and located in mount 138 so that weight member 132 covers recessed portion 152 when it is installed in mount 138. Recessed portion 152 may be stepped, curved or tapered to provide any desired amount of movement of weight member 138 and the desired amount of clearance relative to fastener. Recessed portion may also be configured to receive an optional secondary weight member 151. It should be appreciated, however, that an optional secondary weight member may be included in any of the embodiments described and shown herein. For example, any of the other embodiments may include a secondary weight member mounted in the support surface of the mount.

All of the weight members of the present invention are preferably removable from the golf club head without requiring the full disengagement of the fastener from the fastener portion of the mount. For example, in the present embodiment, fastener 146 is partially backed out from fastener portion 144, which provides clearance for weight member 132 to be slid toward fastener 146 within mount 138, tilted, and then removed from mount 138. The shape and dimensions of recessed portion 152 are selected so that weight member 132 may be removed after backing fastener 146 out by a predetermined amount. In an embodiment, recessed portion 152 is dimensioned and shaped so that weight member 132 may be removed after backing the fastener out by less than 0.250 inch, more preferably by less than 0.125 inch.

One or more grip features 154 are also included on weight member 132. Grip feature 154 provides a recessed, or raised, portion on weight member 132 that allows a user to grip the weight member, especially during removal. Grip feature 154 is preferably sized and shaped to engage with a user's fingertip, or another blunt tool to drag and tilt the weight member relative to the remainder of club head 130.

Figure 16:
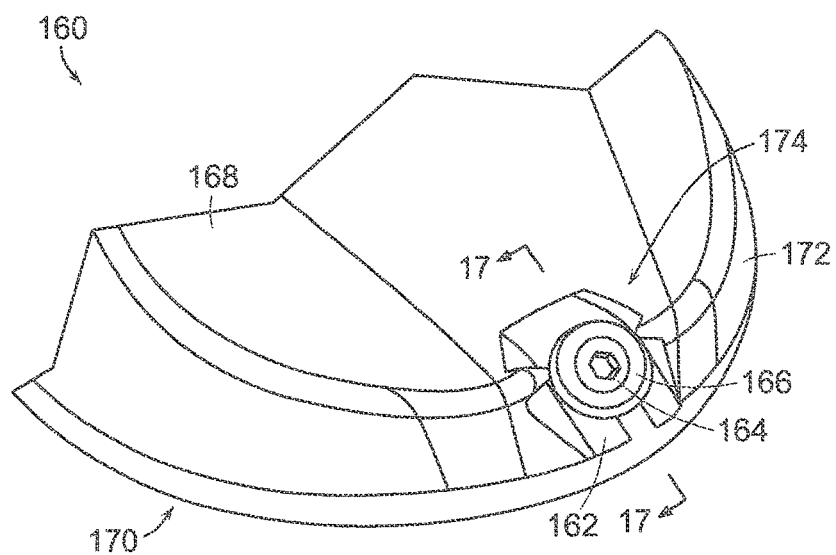
FIG. 16 is a perspective view of an aft portion of another embodiment of a golf club head including a removable weight member.
Figure 17:
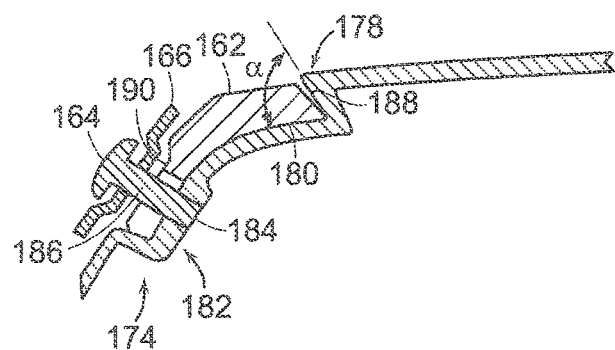
FIG. 17 is a cross-sectional view of the golf club head and removable weight member of FIG. 16.

In another embodiment, shown in FIGS. 16 and 17, a golf club head 160 includes a weight member 162 that is retained on club head 160 using a fastener 164 and a retainer 166. Similar to the previous embodiments, golf club head 160 includes a sole 168, a crown 170, a hitting face, a skirt 172, a hosel, and weight member 162. Sole 168 includes a weight mount 174, which is configured to couple weight member 162 and sole 168.

Mount 174 generally includes fastener 164, a bevel 178, a support surface 180 and a fastener portion 182 and is recessed into a portion of club head 160 that extends from sole 168 to skirt 172. A portion of the club head body defines bevel 178 that extends outward from support surface 180 at a location that is spaced from fastener 164. Bevel 178 is angled relative to a portion support surface 180 immediately adjacent bevel 178 by a bevel angle $\alpha$. Preferably, bevel angle $\alpha$ is acute relative to support surface 180.

Support surface 180 extends between bevel 178 and fastener portion 182 and is a generally curved surface that abuts the underside of weight member 162 when it is installed in mount 164. Fastener portion 182 includes a threaded bore 184 that receives a threaded shank 186 of fastener 164.

Weight member 162 includes an angled abutment surface 188 and a retainer engagement feature 190. The outer perimeter of weight member 162 acts as an alignment feature and complements the size and shape of the recessed mount 174. Angled abutment surface 188 is a surface that complements the shape of bevel 178 of mount 174 and that abuts bevel 178 when weight member 162 is installed on mount 174. Bevel 178 and abutment surface 188 are oriented so that as weight member 162 is forced into abutment with bevel 178 by the tightening of fastener 164 and retainer 166. The abutment of the angled surfaces forces weight member 162 to be drawn against support surface 180 in mount 174.

Figure 18:
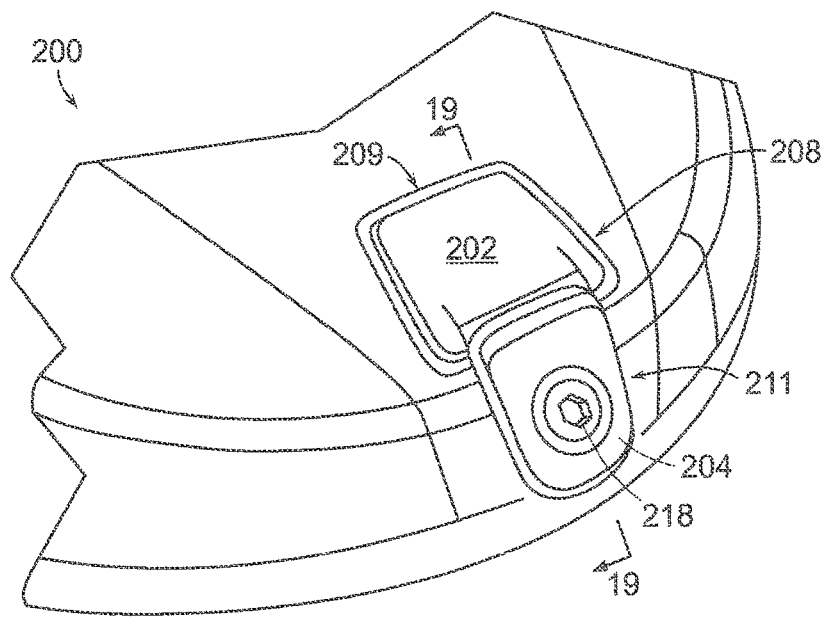
FIG. 18 is a perspective view of an aft portion of another embodiment of a golf club head including a removable weight member.
Figure 19:
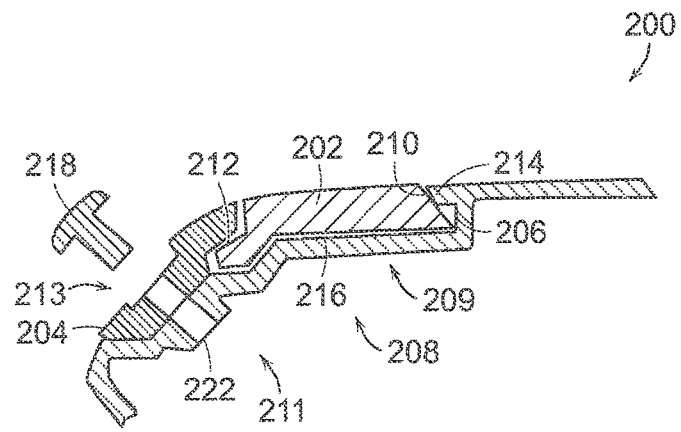
FIG. 19 is a cross-sectional view of the golf club head and removable weight member of FIG. 18.

Another embodiment of a golf club head 200 with a weight member 202 is illustrated in FIGS. 18 and 19. Similar to the previous embodiment, weight member 202 is retained on club head 200 by a retainer 204. Retainer 204 is a component that is separate from weight member 202 and forces weight member 202 to abut an undercut 206 included in a weight mount 208. Undercut 206 is illustrated with an alternative construction, but it should be appreciated that the undercut may alternatively be formed by a bevel. Mount 208 is configured so that as retainer 204 is drawn into mount 208 by a fastener 218 the retainer 204 abutment with weight member 202 forces the weight member toward undercut 206

Mount 208 includes a weight portion 209 and a retainer portion 211. Weight portion 209 receives weight member 202 and includes undercut 206. Retainer portion 211 receives retainer 204 and includes a fastener engagement feature 213 that engages fastener 218 so that retainer 204 is removably coupled to club head 200.

Weight member 202 has a low profile configuration similar to previous embodiments. Weight member 202 includes an angled abutment surface 210 and a retainer engagement feature 212, which may be a flange, as shown. Angled abutment surface 210 engages an abutment edge 214 of mount 208 that is adjacent undercut 206, and undercut 206 is dimensioned so that as angled abutment surface 210 is forced against abutment edge 214, clearance is provided for a portion of weight member 202 to enter undercut 206 while weight member 202 is forced tighter against a support surface 216 of mount 208.

Retainer 204 also has a low profile configuration and is received in a portion of mount 208. Retainer 204 extends toward weight member 202 so that an abutment flange 220 of retainer 204 abuts a portion of weight member 202. Retainer 204 also includes a fastener bore 222 that receives fastener 218 so that fastener 218 extends through a portion of retainer 214 and engages fastener engagement feature 213, which may be a threaded bore, as shown.

In another embodiment, illustrated in FIGS. 49-52, a golf club head 540 includes a weight member 542 that is retained on club head 540 by a retainer 544. Golf club head 540 includes a sole 546, a crown 548, a hitting face, a skirt 550, a hosel, and weight member 542. Sole 546 includes a weight mount 552, which is configured to couple weight member 542 and sole 546. Mount 552 generally includes a fastener 554, a bevel 556, a support surface 558 and a fastener portion 560.

Retainer 544 is a component that is separate from weight member 542 that is pivotally mounted to sole 546 of golf club head 540 at pivots 568. Retainer 544 forces weight member 542 to abut an undercut formed by bevel 556. Mount 552 is configured so that tightening fastener 554 forces retainer 544 toward sole 546 and against an aft portion of weight member 542. The interaction between retainer 544 and weight member 542 forces weight member 542 forward toward and into abutment with bevel 556.

Weight member 542 has a low profile configuration similar to previous embodiments. Weight member 542 includes an angled abutment surface 562 and a retainer engagement feature 564, which may be an angled surface, as shown. Angled abutment surface 562 engages bevel 556 when retainer 544 is forced against weight member 542. Additionally, and as shown, retainer engagement feature 564 may have the same shape and size as angled abutment surface 562 so that weight member 542 may be installed in one of two orientations rotated 180° from each other. Preferably, in such an embodiment more mass is concentrated toward one of angled abutment surface 562 and retainer engagement feature 564 than the other so that the two orientations provide different mass distribution.

Retainer 544 is pivotally connected to sole 546 adjacent to support surface 558 so that it may be pivoted between a first position and a second position. In the first position, shown in FIGS. 49 and 51, retainer 544 is positioned so that weight member 542 is interposed between retainer 544 and bevel 556. In that position, an abutment surface 566 of retainer 544 abuts the angled surface that forms the retainer engagement feature 564 and that abutment forces weight member 542 laterally toward bevel 556. In the second position, shown in FIGS. 50 and 52, retainer 544 is tilted away from support surface 558 and provides clearance for weight member 542 to be translated away from bevel 556 and removed from weight mount 552.

Figure 20:
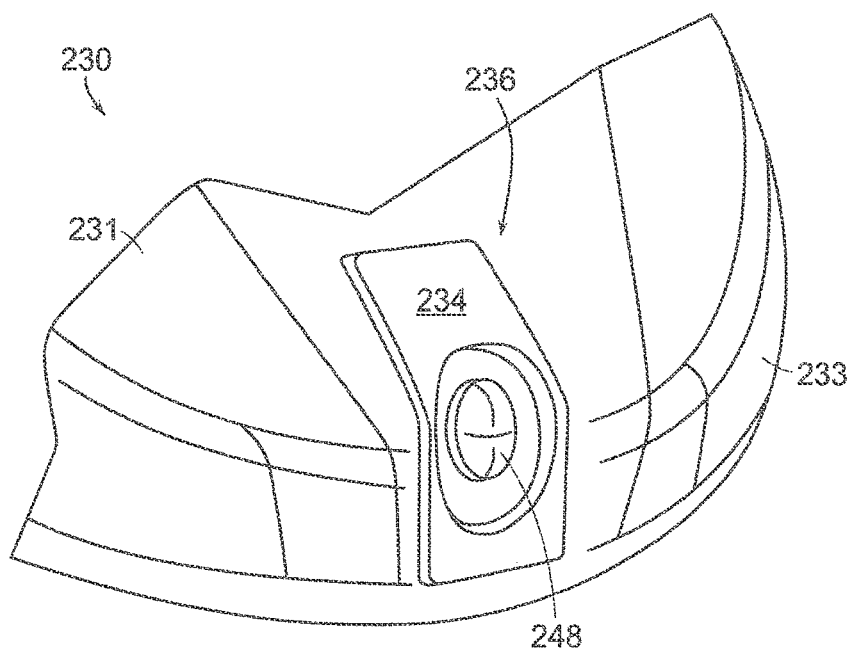
FIG. 20 is a perspective view of an aft portion of another embodiment of a golf club head including a removable weight member.
Figure 21:
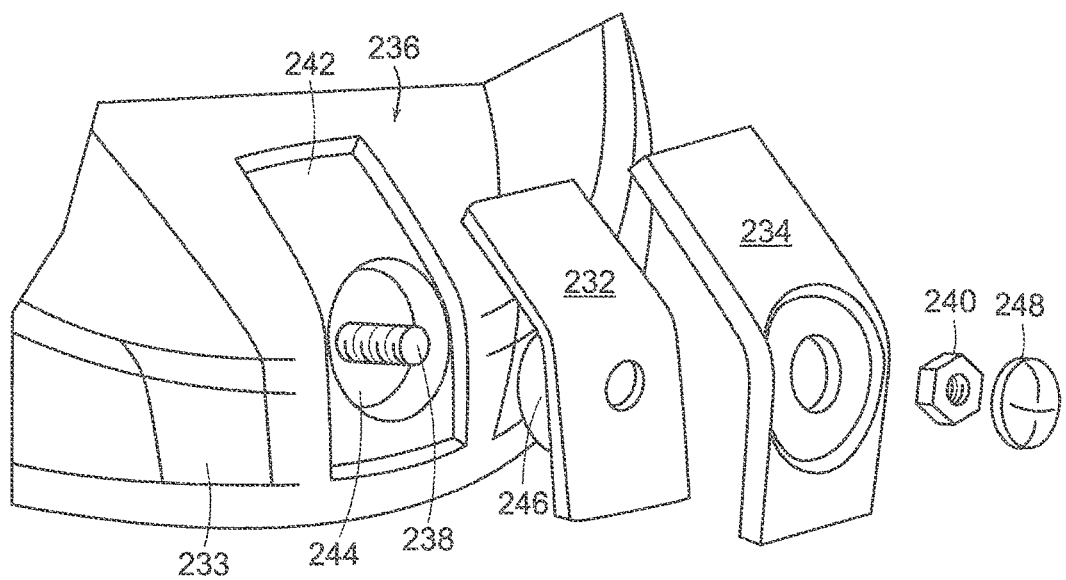
FIG. 21 is an exploded view of the golf club head and removable weight member of FIG. 20.
Figure 22:
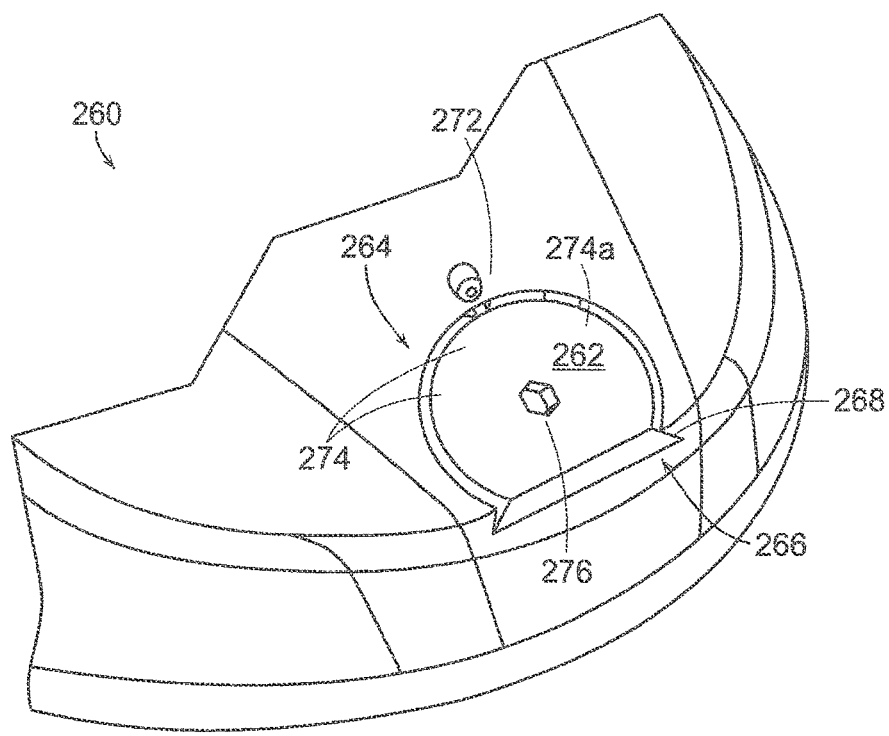
FIG. 22 is a perspective view of an aft portion of another embodiment of a golf club head including a removable weight member.

In another embodiment, shown in FIGS. 20 and 21, golf club head 230 includes a weight member 232 that is coupled to the club head by a retainer 234. Retainer 234 also provides a cover for weight member 232 so that the shape and appearance of the outer surface of golf club head 230 remains the same while one of a plurality of weight members 232 having different masses or configurations may be incorporated.

Additionally, an alternative fastener configuration is included in the present embodiment. In particular, a weight mount 236 includes a stud 238 that extends through weight member 232 and retainer 234, and engages a nut 240. Nut 240 is removably attached to stud 238 so that it forces retainer 234 against weight member 232 and into mount 236.

Mount 236 is shaped to complement the shape of weight member 232 and is generally recessed into a portion of a sole 231 and a skirt 233 of golf club head 230. Mount 236 includes a primary recess 242 and a secondary recess 244. Primary recess 242 is shaped to complement the perimeter shape of weight member 232 and retainer 234 so that both fit inside mount 236. Secondary recess 244 is shaped and sized to receive an optional projection 246 included on weight member 232. The size and shape of projection 246 is selected based on the overall desired mass of weight member 232. The location of weight member 232 is determined by the interaction between weight member 232 and primary recess 242. As a result, projection 246 may either fully or partially extend into secondary recess 244.

An optional cap 248 is also included in the present embodiment. Cap 248 provides a cover for nut 240. By covering nut 240, cap 248 provides a secondary locking feature to nut 240 and/or protection to nut 240.

Referring to FIGS. 22-25, a golf club head 260 includes a low profile weight member 262. In the present embodiment, weight member 262 is shaped so that it must be in a predetermined orientation relative to a mount 264 for it to be inserted into mount 264, then the weight member trapped in the mount by rotating the weight member relative to the mount. In particular, a first width W1 of weight member 262 is less than a second width W2 of weight member 262. Mount 264 includes an opening 266 that has a width W3 that is greater than first width W1 of weight member 262, but less than second width W2. As a result, weight member 262 may be slid into mount 264 only in a predetermined orientation corresponding to the first width W1 extending across opening 266. Then, by rotating weight member 262 within mount 264 the weight member becomes captured in mount 264. A tool engagement feature 276 may be included on weight member 262 so that weight member 262 may be rotated using a tool that is inserted into tool engagement feature 276, such as a hex key or screw driver.

Mount 264 also includes an undercut 268 that extends around at least a portion of the perimeter of mount 264. In the present embodiment, undercut 268 is a bevel that receives an angled engagement surface 270 of weight member 262. The interaction between undercut 268 and engagement surface 270 limits translation of the weight member 262 relative to mount 264 outward and away from club head 260 while allowing weight member 262 to rotate within mount 264 so that weight member 262 may be installed and removed from mount 264. Preferably, undercut 268 and engagement surface 270 are located on weight mount 264 and weight member 262 so that when weight member 262 is installed the undercut and engagement surface engage adjacent opening 266. More preferably, undercut 268 and engagement surface 270 extend around a majority of the circumferences of mount 264 and weight member 262.

An anti-rotation and clamping feature, such as screw 272 is also included in mount 264 that engages a recess 274 so that the rotation of weight member 262 in mount 264 may be selectively prevented, or limited to a predetermined amount. The anti-rotation feature is constructed so that when screw 272 engages recess 274 of weight member 262, it locks weight member 262 into a particular orientation relative to mount 264 that is different than the orientation that allows weight member 262 to be removed from mount 264. Additionally, screw 272 is oriented so that it urges weight member 262 toward a side of mount 264 so that angled engagement surface 270 abuts a portion of undercut 268. The orientation of screw 272 illustrated in FIGS. 22-24 results in screw 272 forcing weight member 262 toward opening 266 so that the portions of undercut 268 adjacent opening 266 abut corresponding portions of engagement surface 270.

Screw 272 may lock weight member 262 into one of a plurality of orientations by selectively engaging one of a plurality of recesses 274, or it may limit the rotation of weight member 262 relative to mount 264 to a predetermined range of angular rotation by selectively an extended recess 274a that extends along a portion of the perimeter of weight member 262.

Figure 23:
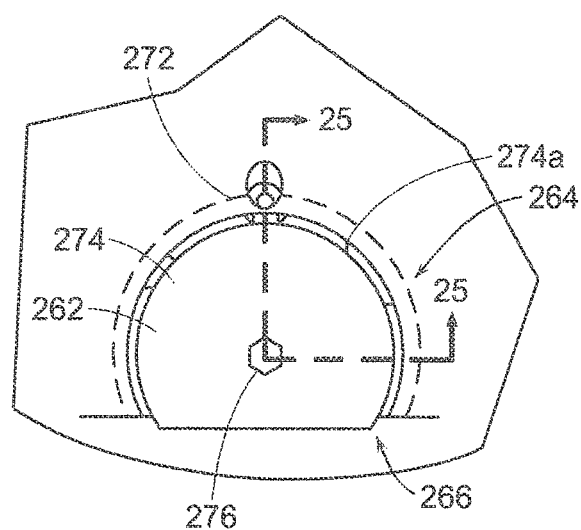
FIG. 23 is a plan view of the portion of the golf club head and outer side of the removable weight member of FIG. 22.
Figure 24:
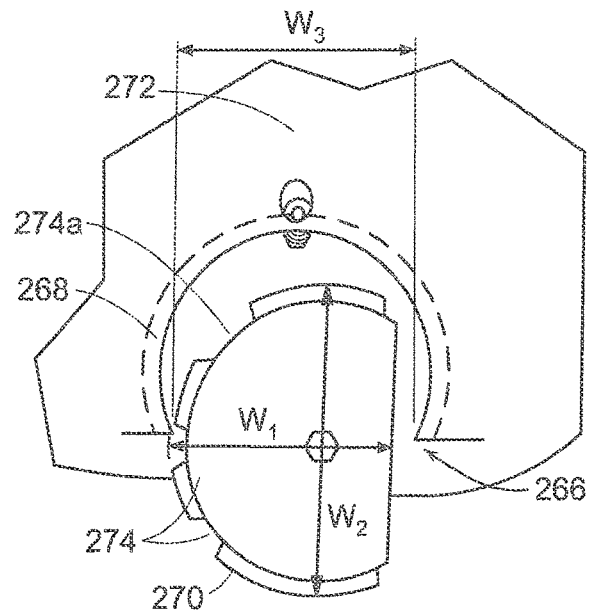
FIG. 24 is another plan view of the portion of the golf club head and outer side of the removable weight member of FIG. 22.
Figure 25:
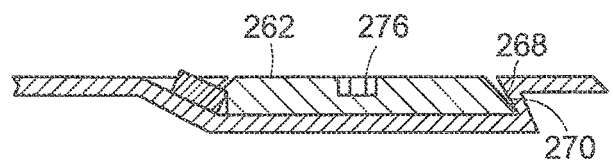
FIG. 25 is a cross-sectional view of the portion of the golf club head and removable weight member of FIG. 22.
Figure 26:
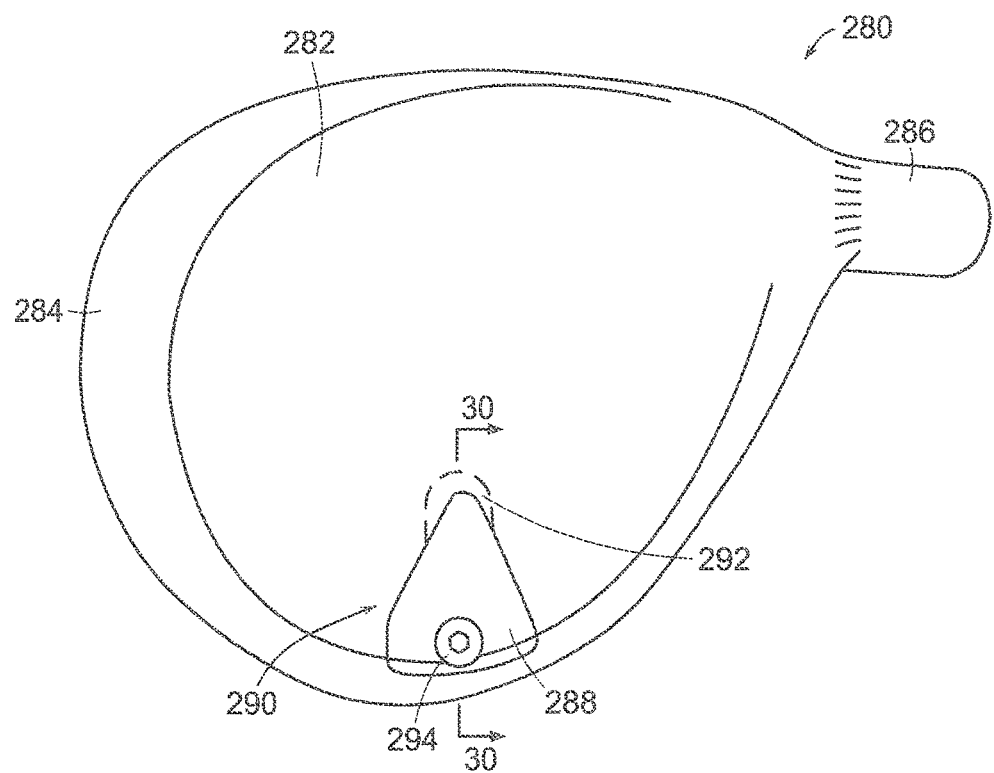
FIG. 26 is a plan view of another golf club head and removable weight member.
Figure 27:
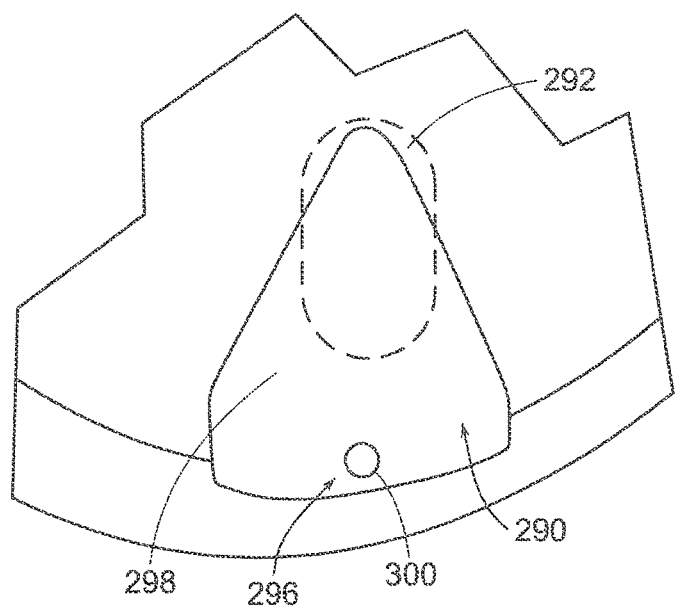
FIG. 27 is a plan view of a sole, aft portion of the golf club head of FIG. 26 without the removable weight member.
Figure 28:
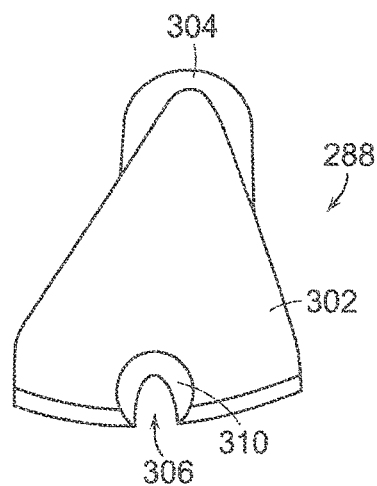
FIG. 28 is a plan view of an outer side of the removable weight member of FIG. 26.
Figure 29:
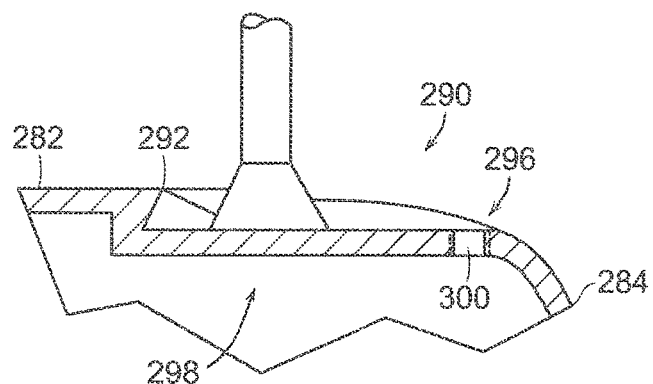
FIG. 29 is a cross-sectional view of a portion of the golf club head of FIG. 26.
Figure 30:
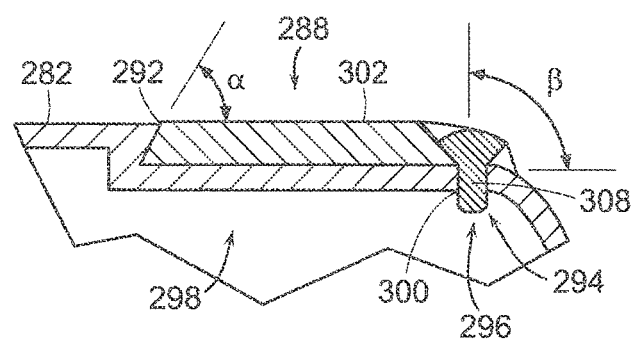
FIG. 30 is a cross-sectional view of a portion of the golf club head, and the removable weight member, of FIG. 26.
Figure 31:
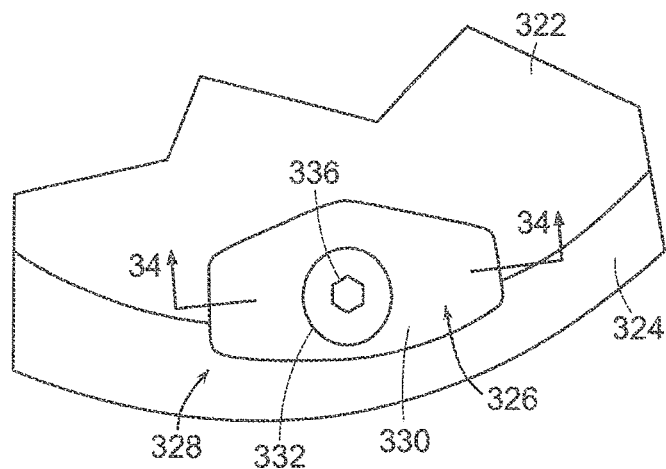
FIG. 31 is a plan view of an aft portion of another golf club head and an outer side of removable weight member.
Figure 32:
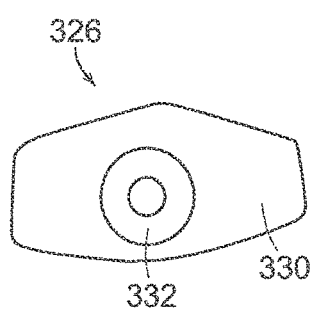
FIG. 32 is a plan view of an outer side of the removable weight member of FIG. 31.

Referring to FIGS. 23 and 24, the orientations of weight member 262 for installation and removal will be described. Weight member 262 is illustrated fully installed in mount 264 in FIG. 23. Weight member 262 is inserted into mount 264 by orienting weight member 262 so that the portion of weight member 262 having width W1 is oriented across opening 266, as shown in FIG. 24. Then, weight member 262 is slid into mount 264, relative to club head 260, until an end of weight member 262 is adjacent screw 272 with screw 272 being at least partially backed out of mount 264. Weight member 262 is rotated to a fully installed orientation in which it is oriented so that screw 272 is aligned with a recess 274. Screw 272 is then tightened so that it is positioned partially within recess 274 and further rotation of weight member 262 within, and relative to, mount 264 is prevented.

The removal of weight member 262 is accomplished by reversing the installation procedure described above. In particular, screw 272 is disengaged from recess 274 so that weight member 262 is free to rotate within mount 264. Next, weight member 262 is rotated so that a portion of weight member 262 that is narrower than opening 266 (e.g., a portion with width W1) is aligned with opening 266. Finally, weight member 262 is slid through opening 266 and removed from mount 264.

In another embodiment, illustrated in FIGS. 53-56, a golf club head 580 includes a weight member 582 that is inserted and removed from a weight mount 584 similar to the weight member of the previous embodiment. As a result, many of the features of the golf club head are identical and will be designated by the same numbers used in the previous embodiment and will not be further described.

Weight member 582 has a low profile and is shaped so that it must be in a predetermined orientation relative to a mount 584 for it to be inserted into mount 584, then the weight member trapped in the mount by rotating the weight member relative to the mount. In particular, a first width W1 of weight member 582 is less than a second width W2 of weight member 582. Mount 584 includes an opening 266 that has a width W3 that is greater than first width W1 of weight member 582, but less than second width W2. As a result, weight member 582 may be slid into mount 584 only in a predetermined orientation corresponding to the first width W1 extending across opening 266. Then, by rotating weight member 582 within mount 584 the weight member becomes captured in mount 584.

Mount 584 includes an undercut 268 and an anti-rotation and clamping feature. Undercut 268 receives an angled engagement surface 270 of weight member 582. An anti-rotation and clamping feature, such as tab 586 is also included in mount 584 that engages a recess 588 so that the rotation of weight member 582 in mount 584 may be selectively prevented, or limited to a predetermined amount. Tab 586 is coupled to the sole of the club head adjacent weight mount 584 by a fastener so that tab can be tightened into an adjacent recess 588 of weight member 582. The anti-rotation feature is constructed so that when tab 586 engages recess 588 of weight member 582, it locks weight member 582 into a particular orientation relative to mount 584 that is different than the orientation that allows weight member 582 to be removed from mount 584. Tab 586 may lock weight member 582 into one of a plurality of orientations by selectively engaging one of a plurality of recesses 588, or it may limit the rotation of weight member 582 relative to mount 584 to a predetermined range of angular rotation by selectively an extended recess 588a that extends along a portion of the perimeter of weight member 582.

Figure 54:
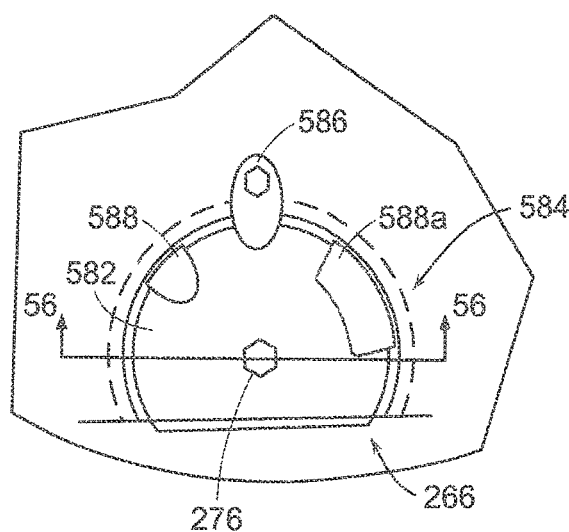
FIG. 54 is a plan view of the portion of the golf club head and outer side of the removable weight member of FIG. 53.
Figure 55:
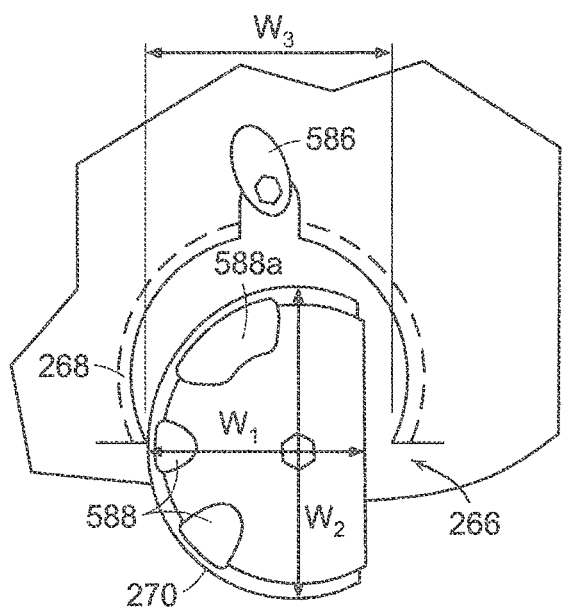
FIG. 55 is another plan view of the portion of the golf club head and outer side of the removable weight member of FIG. 53.
Figure 56:
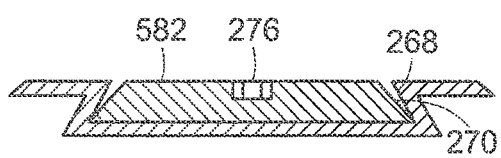
FIG. 56 is a cross-sectional view of the portion of the golf club head and removable weight member of FIG. 53.

FIGS. 54 and 55 illustrate the orientations of weight member 582 for installation and removal. In particular, weight member 582 is illustrated fully installed in mount 584 in FIG. 54. Weight member 582 is inserted into mount 584 by orienting weight member 582 so that the portion of weight member 582 having width W1 is oriented across opening 266, as shown in FIG. 55. Then, weight member 582 is slid into mount 584, relative to club head 580, until an end of weight member 582 is adjacent tab 586 with tab 586 being rotated away from weight member 582. Weight member 582 is rotated to a fully installed orientation in which it is oriented so that tab 586 is aligned with a recess 588. Tab 586 is then tightened so that it is positioned partially within recess 588 and further rotation of weight member 582 within, and relative to, mount 584 is prevented.

The removal of weight member 582 is accomplished by reversing the installation procedure described above. In particular, tab 586 is disengaged from recess 588 so that weight member 582 is free to rotate within mount 584. Next, weight member 582 is rotated so that a portion of weight member 582 that is narrower than opening 266 (e.g., a portion with width W1) is aligned with opening 266 and weight member 582 is slid through opening 266 and removed from mount 584.

Another embodiment will be described with reference to FIGS. 26-30. In particular, a golf club head 280 includes a sole 282, a crown (not shown), a hitting face (not shown), a skirt 284, a hosel 286, and a weight member 288. Sole 282 includes a weight mount 290, which is configured to couple weight member 288 to sole 282. In the present embodiment, mount 290 is a recessed portion of sole 282 that is shaped to complement the shape of weight member 288. For example, weight member 288 is generally trapezoidal in plan shape and weight mount 290 includes a generally trapezoidally-shaped recess.

Mount 290 is configured to clamp weight member 288 between a conical bevel 292 and a fastener 294. The conical bevel 292 provides lateral, heel-toe positioning in addition to fore-aft positioning of weight member 288 relative to mount 290. Mount 290 is configured so that when weight member 288 is located on mount 290, and fastener 294 is tightened, the interaction between fastener 294 and weight member 288 results in forces that translate weight member 288 laterally against bevel 292. The interaction between weight member 288 and bevel 292 causes at least a portion of weight member 288 to be drawn tighter against a support portion 298.

In the present embodiment, mount 290 is partially recessed and extends into a portion of sole 282 and skirt 284. Mount 290 is shaped to complement the shape of weight member 288 so that it provides alignment for weight member 288. Mount 290 includes a fastener portion 296 and support portion 298. Fastener portion 296 includes a threaded bore 300 that receives a threaded shank of fastener 294. Support portion 298 is a generally planar surface that extends between fastener portion 296 and bevel 292 and provides support for weight member 288.

Bevel 292 extends from support portion 298 at a location that is spaced from fastener 294. Bevel 292 is angled relative to support portion 298 by a bevel angle $\alpha$ that is preferably acute relative to support portion 298. The conical bevel 292 also provides an efficient construction for manufacture. For example, bevel 292 may be constructed using a single pass of a dovetail-type cutter, as shown by phantom lines in FIG. 27 and in FIG. 29.

Weight member 288 has a low profile configuration and includes an angled abutment surface 304 and a fastener engagement feature 306. Angled abutment surface 304 is a surface that complements the shape of bevel 292 of mount 290 and that abuts bevel 292 when weight member 288 is installed on mount 290. Bevel 292 and abutment surface 304 are oriented so that as weight member 288 is forced into abutment with bevel 292, that abutment forces weight member 288 to be drawn tighter against sole 282 in mount 290.

Fastener 294 is configured so that it forces weight member 288 toward bevel 292 as it is tightened in club head 280. In the present embodiment, the shape of fastener 294 and the configuration of engagement between fastener 294 and weight member 288 are selected so that weight member 288 is forced into bevel 292. Fastener 294 includes a threaded shank 308 that engages a threaded bore 300 of mount 290. In the present embodiment, instead of utilizing the angle of fastener to drive weight member 288 toward bevel 292, the mating configuration of fastener with weight member 288 is utilized. Threaded bore 300 extends into fastener portion 296 of mount 290 and is oriented so that it is about normal to support portion 298. Fastener 294 includes a tapered engagement portion that abuts a tapered portion 310 of weight member 288. The angled interaction between the fastener and the weight member forces the weight member toward bevel 292 so that weight member 288 becomes captured on sole 282. Fastener 294 engages club head 280 at a coupling angle β, that has a magnitude that is about 90° and the tapered portion of the fastener provides a component of force that is directed toward bevel 28 as fastener 26 is tightened.

Bevel angle α is selected so that as weight member 288 is forced into bevel 292, weight member 288 is forced against support portion 298 and tighter against sole 282. Bevel angle α is preferably 25°-65°, and more preferably 35°-55°.

In a still further embodiment, illustrated in FIGS. 31-34, golf club head 320 includes a sole 322, a crown, a hitting face, a skirt 324, a hosel, and a weight member 326. Weight member 326 is attached to club head 320 at a weight mount 328. Weight member 326 and mount 328 are shaped and sized to complement each other and so that relative rotation is limited. For example, weight member 326 has a generally polygonal shape and mount 328 has a matching shape and is recessed into sole 322 so that when weight member 326 is installed it is prevented from rotation relative to mount 328.

Figure 33:
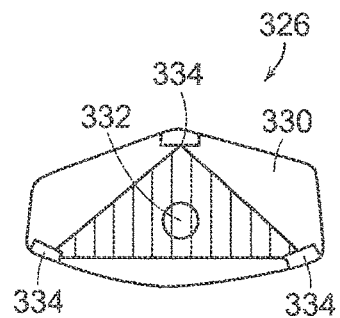
FIG. 33 is a plan view of an inner side of the removable weight member of FIG. 31.
Figure 34:
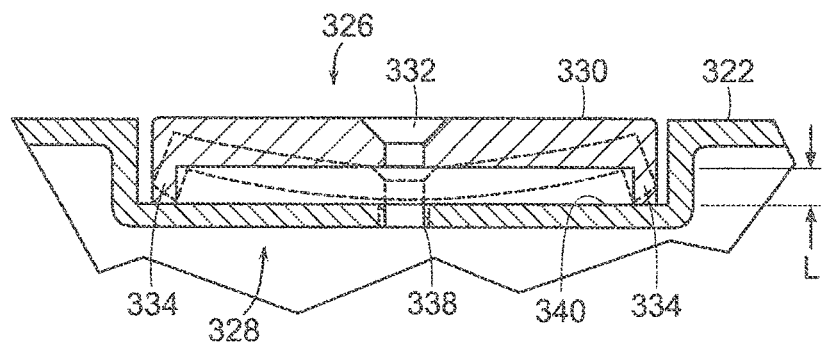
FIG. 34 is a cross-sectional view of the golf club head and removable weight member of FIG. 31.

Weight member 326 includes a weight body 330 that defines a fastener bore 332 and pads 334 that extend from a lower surface of weight body 330. Fastener bore 332 receives a fastener 336 that extends through weight body 330 and into an engagement feature included in mount 328, such as threaded bore 338. A plurality of pads 334 are disposed on weight body 330 and extend from the lower surface of body 330 by a length L. Fastener bore 332 is located within a polygonal area that is defined by a polygon drawn so that each pad 334 forms a vertex of the polygon. For example, and as illustrated in FIG. 33, weight member 326 includes three (3) pads 334 that define a triangle (illustrated by the shaded area) and fastener bore 332 is located within an area circumscribed by that triangle.

Pads 334 are included on weight member 326 so that weight member 326 is able to flex during insertion. In particular, fastener 336 extends through fastener bore 332 and engages threaded bore 338. As fastener 336 is tightened, weight member 326 is drawn into mount 328. Pads 334 contact a support surface 340 of mount 328. As fastener 336 is tightened further, it causes weight member 326 to flex (shown by dashed lines in FIG. 34), which increases the load on fastener 336 and helps to assure that fastener 336 does not loosen during impact. The height and distance between pads 334 is selected to provide the desired flex of weight member 326 and load on fastener 336. In an embodiment, the height of pads is between about 0.030 inch to about 0.125 inch. Preferably, the pads are dimensioned so that a majority of a bottom surface of the weight member is spaced from the support surface by a distance approximately equal to the pad height.

Figure 35:
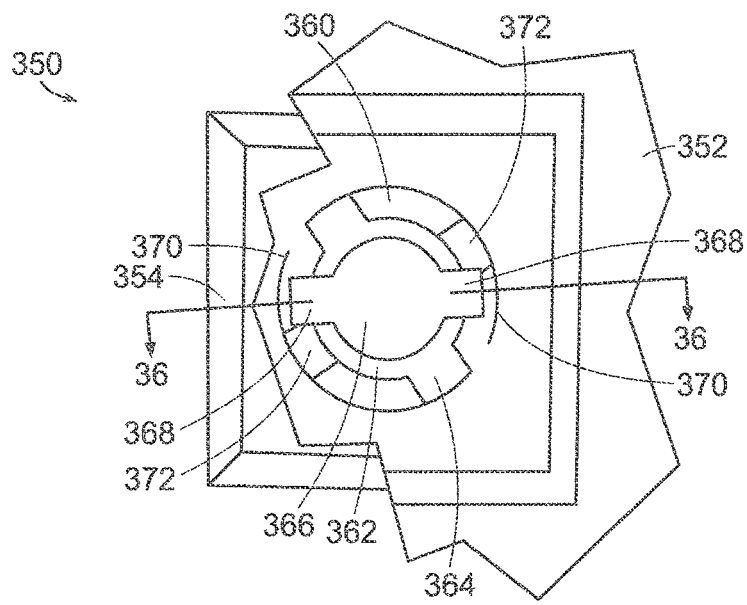
FIG. 35 is a plan view of an inner side of a portion of another golf club head and an inner side of a removable weight member.
Figure 36:
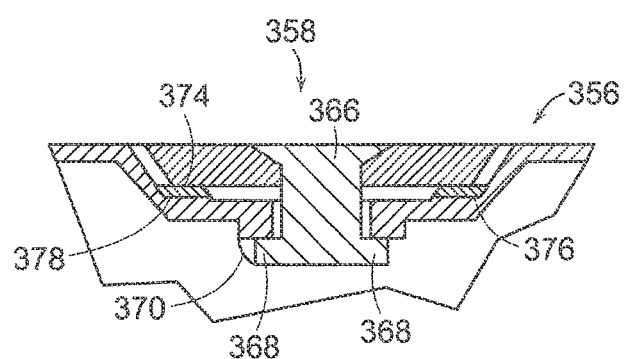
FIG. 36 is a cross-sectional view of the golf club head and removable weight member of FIG. 35.

In another embodiment, shown in FIGS. 35 and 36, a weight member 354 is coupled to a mount 356 that is located on a sole 352 of a golf club head 350. Weight member 354 is coupled to mount 356 by a fastener 358 that extends through weight member 354 and into a fastening feature 360 of mount 356. Fastener 358 and fastening feature 360 are constructed so that fastener 358 is placed in a fully locked position with less then a full turn relative to mount 356.

Fastening feature 360 includes a through-bore 362 and keyways 364 that are sized to receive a shank 366 and projections 368 on fastener 358. Fastener 358 is aligned with keyways 364 and inserted. After it is fully inserted, fastener 358 is turned so that projections 368 slide along circumferential ramps 370 and into détentes 372. In the present embodiment, détentes 372 are portions of ramps 370 that are recessed toward a support surface 374 of mount 356.

Support surface 374 includes step portions 376, which may be discrete pads, and/or elongate shoulders, that support weight member 354 at its edges. Additionally, an optional resilient layer 378, which is preferably constructed of a resilient polymeric material such as polyurethane, or a resilient foam material. Similar to the previous embodiment, as fastener 358 is tightened it causes weight member 354 to be drawn onto step portions 376 and to flex. The flexing of weight member 354 increases the load on fastener 358 and draws projections 368 into détentes 372.

Now referring to FIGS. 37-40, a golf club head 390 includes a sole 392, a crown, a hitting face, a skirt 394, a hosel, and a weight member 396. Weight member 396 is attached to club head 390 at a weight mount 398. Weight member 396 and mount 398 are shaped and sized to complement each other and so that relative rotation is limited. For example, weight member 396 has a generally polygonal shape and mount 398 has a matching shape and is partially recessed into sole 392 so that when weight member 396 is installed it is prevented from rotation relative to mount 398.

Mount 398 is partially recessed and extends into a portion of sole 392 and skirt 394. Mount 398 is shaped to complement the shape of weight member 396 so that is provides alignment for weight member 396. Mount 398 includes a fastener portion 400 and a support portion 402. Fastener portion 400 includes a recess 404 that defines an abutment portion 405, such as an edge or surface. During installation of weight member 396, recess 404 receives a tapered portion of a fastener 406 that abuts abutment portion 405 and forces weight member 396 toward a bevel 408.

Bevel 408 extends from support portion 402 at a location of support portion 402 that is spaced from fastener 406 and fastener portion 400. Bevel 408 is angled relative to support portion 402 by a bevel angle α. Preferably, bevel angle α is acute relative to support portion 402.

Weight member 396 includes an angled abutment surface 412 and a fastener engagement feature 414. Angled abutment surface 412 is a surface that complements the shape of bevel 408 of mount 398 and that abuts bevel 408 when weight member 396 is installed on mount 398. Bevel 408 and abutment surface 412 are oriented so that as weight member 396 is forced into abutment with bevel 408, that abutment forces weight member 396 to be drawn tighter against sole 392 in mount 398.

Fastener engagement feature 414 of weight member 396 is a threaded bore that threadably engages a threaded portion of fastener 406. Fastener 406 is configured so that it forces weight member 396 toward bevel 408, generally along a translation axis A, as it is tightened in weight member 396. In the present embodiment, instead of utilizing the angle of the fastener relative to the golf club head or the interaction between the fastener and the weight member to drive the weight member toward the bevel, the engagement between fastener 406 and mount 398 is utilized. Fastener 406 includes a tapered engagement portion 416 and a threaded portion 418. Fastener 406 threads into a threaded bore 419 of weight member 396, and tapered engagement portion 416 abuts abutment portion 405 of weight mount 398.

The engagement between fastener 406 and mount 398 is constructed so that a component of force is directed toward bevel 408. In the present embodiment, another component of force is directed generally normal to support portion 400 and away from club head 390.

Figure 37:
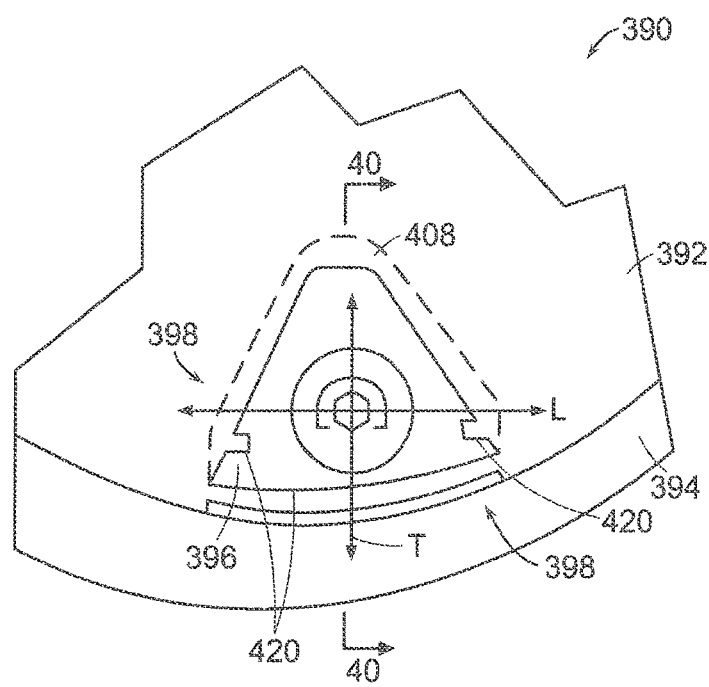
FIG. 37 is a plan view of an aft portion of another golf club head and an outer side of a removable weight member.
Figure 38:
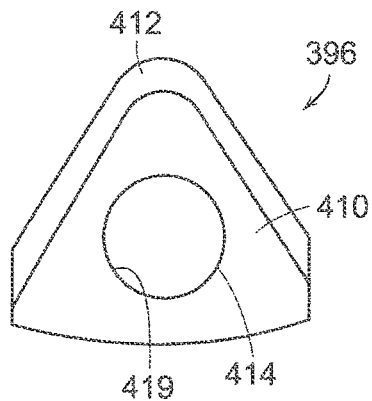
FIG. 38 is a plan view of the outer side of the removable weight member of FIG. 37.
Figure 39:
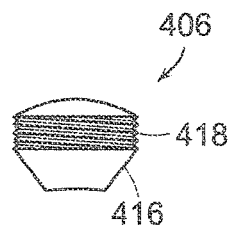
FIG. 39 is a side view of a fastener included in the golf club head of FIG. 37.
Figure 40:
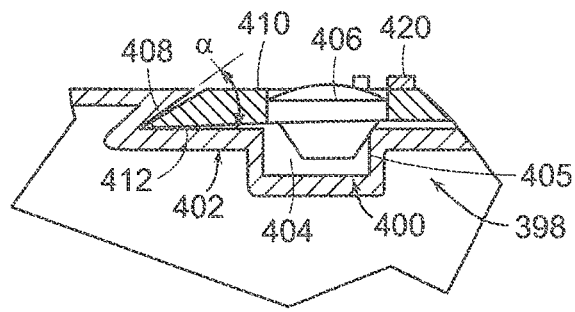
FIG. 40 is a cross-sectional view of the golf club head and removable weight member of FIG. 37.

The interaction between weight member 396 and mount 398 is constructed so that the component of force that is normal to support portion 400 is counteracted. As a result, weight member 396 is not lifted from mount 398 when fastener is tightened. For example, the length and location of bevel 408 may be selected to counteract the force. In particular, bevel 408 and angled abutment surface 412 of weight member 396 extend along a relatively large portion of the perimeter of the weight member 396, as shown in FIG. 37. In that example, bevel 408 extends from a location that is forward of recess 404 to a location that is aftward of recess 404. As shown in FIG. 37, bevel 408 extends from the forward most portion of mount 398 to a location that is spaced laterally from recess 404. As a result, a lateral axis L that is perpendicular to a translation axis T, and that extends through fastener 406 generally horizontal to sole 392, extends through a portion of bevel 408. Preferably, axis L extends through portions of bevel 408 on opposite heel and toe sides of weight member 396 so that an aft portion of weight member 396 is prevented from lifting from mount 398 when fastener 406 is tightened.

In addition, or as an alternative to bevel 408, one or more retainer 420 may be utilized that are spaced from bevel 408 so that fastener 406 is interposed between bevel and retainer 420. For example, retainer 420 is disposed on an opposite side of fastener 406 relative to bevel 408 in the direction corresponding to the orientation of axis T (e.g., in a fore/aft direction as shown). Retainer 420 may be a single member that extends across mount 398, or a plurality of retainers may be provided on opposite ends of mount 398. Retainer 420 is spaced from support portion 402 so that a space is provided that has a height dimension that is approximately equal to the thickness of weight member 396 so that weight member 396 is unable to move away from support portion 402 of mount 398 when fastener 406 is tightened.

Similar to previous embodiments, bevel angle α is selected so that as weight member 396 is forced into bevel 408, weight member 396 is forced against support portion 402 and tighter against sole 392. Bevel angle α is preferably 25°-65°, and more preferably 35°-55°.

Figure 41:
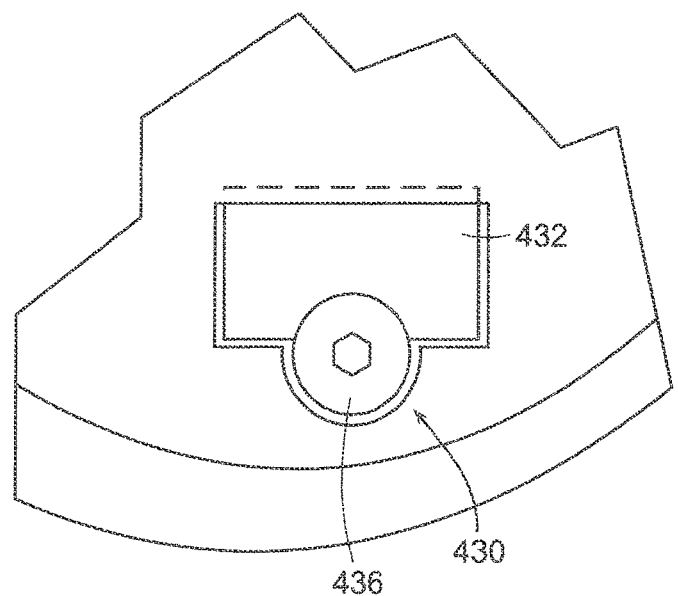
FIG. 41 is a plan view of an aft portion of another golf club head and an outer side of a removable weight member.
Figure 42:
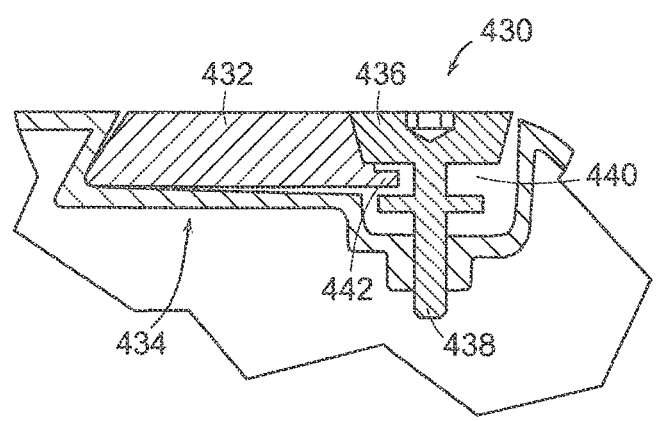
FIG. 42 is a cross-sectional view of the portion of the golf club head, removable weight member and fastener of FIG. 41.

Referring to FIGS. 41 and 42, an embodiment that includes engagement between a fastener and a weight member that assists in the removal of weight member from a recessed mount will be described. In particular, referring to FIGS. 41 and 42, a fastener 430 is employed to retain a weight member 432 on a mount 434. Fastener 430 generally includes a head 436 and a shank 438. Head 436 includes an intermediate neck portion 440 that receives an edge 442 of weight member 432. Neck portion 440 is dimensioned so that it receives a portion of edge 442 when weight member 432 is installed. As a result, when fastener 430 is removed, the lower portion of head 436 abuts edge 442 and lifts weight member 432 from mount 434.

Figure 43:
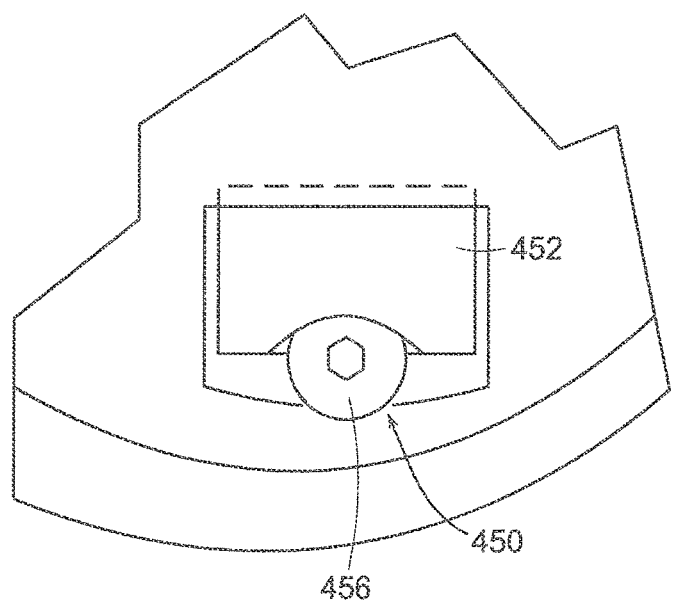
FIG. 43 is a plan view of an aft portion of another golf club head and an outer side of a removable weight member.
Figure 44:
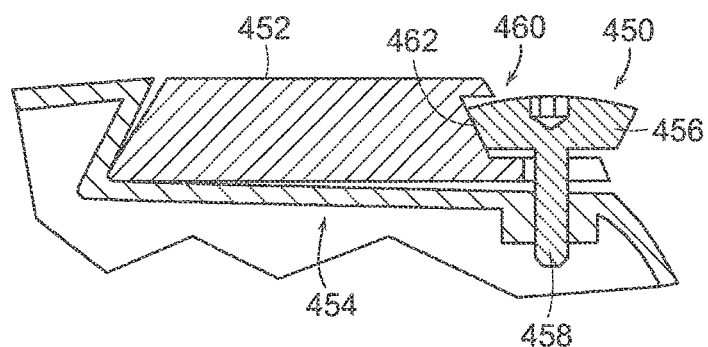
FIG. 44 is a cross-sectional view of the portion of the golf club head, removable weight member and fastener of FIG. 43.

In another embodiment, illustrated in FIGS. 43 and 44, a fastener 450 retains a weight member 452 on a mount 454. Fastener 450 includes a head 456 and a shank 458. Weight member 452 includes an edge 460 that defines a recess 462. When weight member 452 is installed on mount 454, recess 462 receives a portion of head 456 of fastener 450. Recess 462 and head 456 are dimensioned so that as fastener 450 is removed, the upper surface of head 456 abuts an upper edge of recess 462 and lifts weight member 450 from mount 454. Preferably, the upper surface of fastener 450 is curved convexly to provide smooth sliding between weight member 452 and fastener 450.

Figure 45:
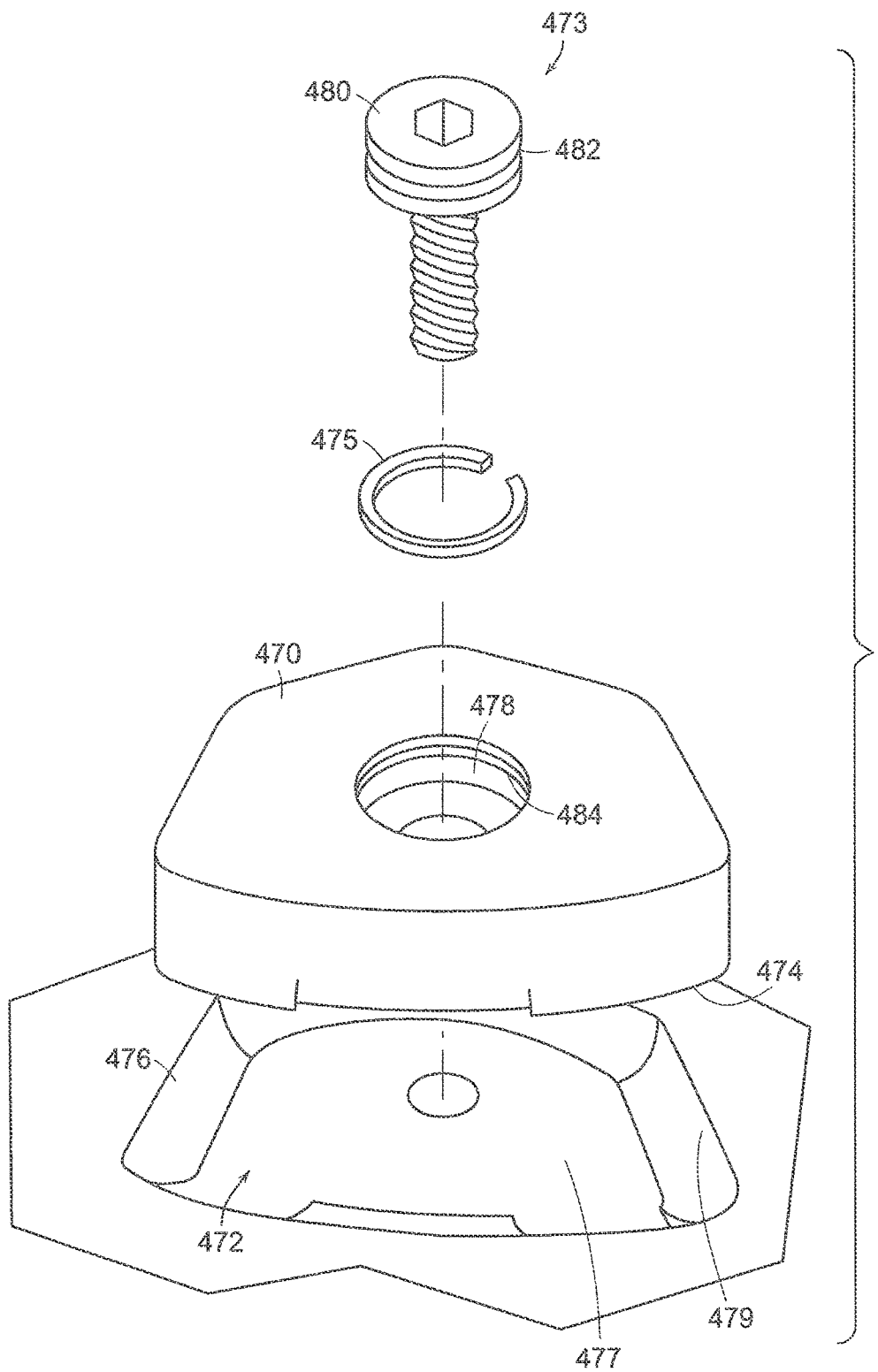
FIG. 45 is an exploded view of a portion of another golf club, removable weight member and fastener.
Figure 46:
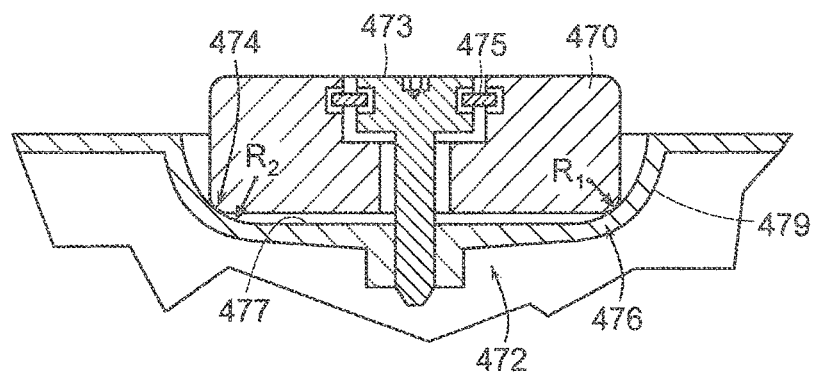
FIG. 46 is a cross-sectional view of the portion of another golf club head, removable weight member and fastener of FIG. 45.

Referring now to FIGS. 45 and 46, a weight member 470 is installed on a mount 472 using an elongate fastener 473. Both weight member 470 and mount 472 are constructed so that weight member 470 self-centers on mount 472. For example, the outer, lower edges 474 of weight member 470 formed by the junction of a lower surface and a side wall of weight member 470 are tapered. Additionally, the side wall 479 of mount 472 is tapered so that as the weight member 470 is drawn into mount 472, weight member 470 becomes centered by the sliding interaction of the tapers.

Mount 472 includes a base surface 477 and side wall 479 that extends between base surface 477 and an adjacent portion of the club head body. In the illustrated embodiment, at least a portion of side wall 479 and the lower corners 476 of mount 474, and the outer and lower edges 474 of weight member 470 are tapered with radiuses, but it should be appreciated that they may alternatively be chamfered and/or radiused. In particular, lower edges 474 of weight member 470 are tapered with radius R1 and side wall 479 of mount 472 are tapered by radius R2, and radius R1 is less than radius R2.

In the present embodiment, weight member 470 is rotatably coupled to fastener 473 by a retainer 475. Weight member 470 includes a bore 478 that receives fastener 473 and at least a portion of a fastener head 480. A portion of fastener 473 includes a circumferential channel 482 that is configured to receive a portion of retainer 475 when fastener 473 is assembled with weight member 470, as shown in FIG. 46. Bore 478 also includes a circumferential channel 484 that receives a portion of retainer 475 in the assembly.

Figure 57:
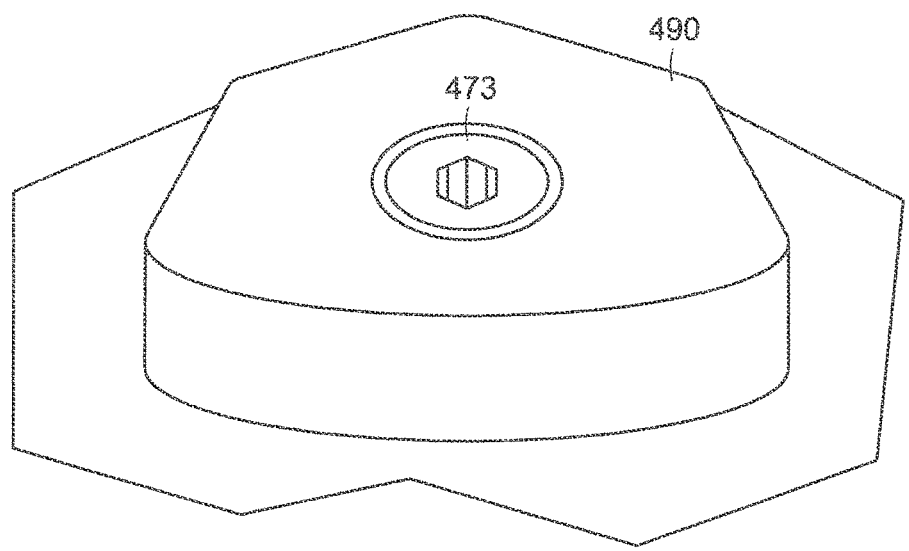
FIG. 57 is a plan view of a portion of another golf club, removable weight member and fastener.
Figure 58:
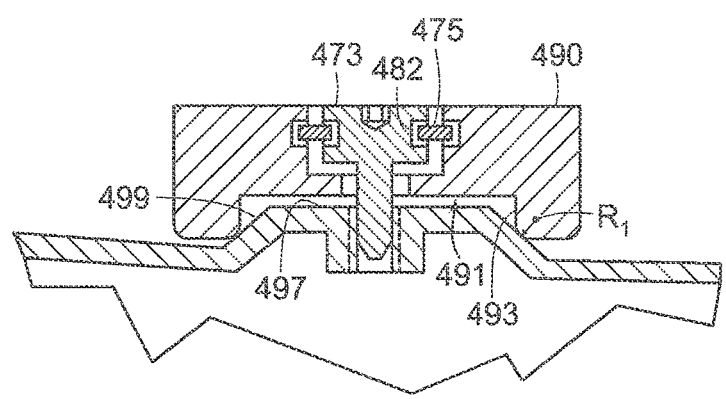
FIG. 58 is a cross-sectional view of the portion of another golf club head, removable weight member and fastener of FIG. 57.

In a similar embodiment, illustrated in FIGS. 57 and 58, a weight member 490 is installed on a mount using an elongate fastener 473 and self-centers on a mount 492. Mount 492 projects from an adjacent portion of the club head and includes a base surface 497 and a side wall 499 that extends between base surface 497 and the adjacent portion of the club head. The junction between side wall 499 and the adjacent portion of the club head body forms lower corners 496. At least a portion of side wall 499, preferably at or adjacent lower corners 496, of mount 492 are tapered. Additionally, weight member 490 includes a recess 491, that receives the projected mount 492, and that is defined by side wall 493. The inner, lower edges of side wall 493 of weight member 490 are tapered so that weight member 490 becomes centered on mount 492 by sliding interaction. In particular, lower edges 494 of weight member 490 are tapered with radius R1 and side wall 499 of mount 492 is tapered with a chamfer. As a result, the radius of weight member 490 slides along side wall 499 as fastener 473 draws weight member 490 toward mount 492 and weight member 490 self-centers on mount 492. Fastener 473 includes a circumferential channel 482 that receives a retainer 475 when fastener 473 is assembled with weight member 490.

Figure 59:
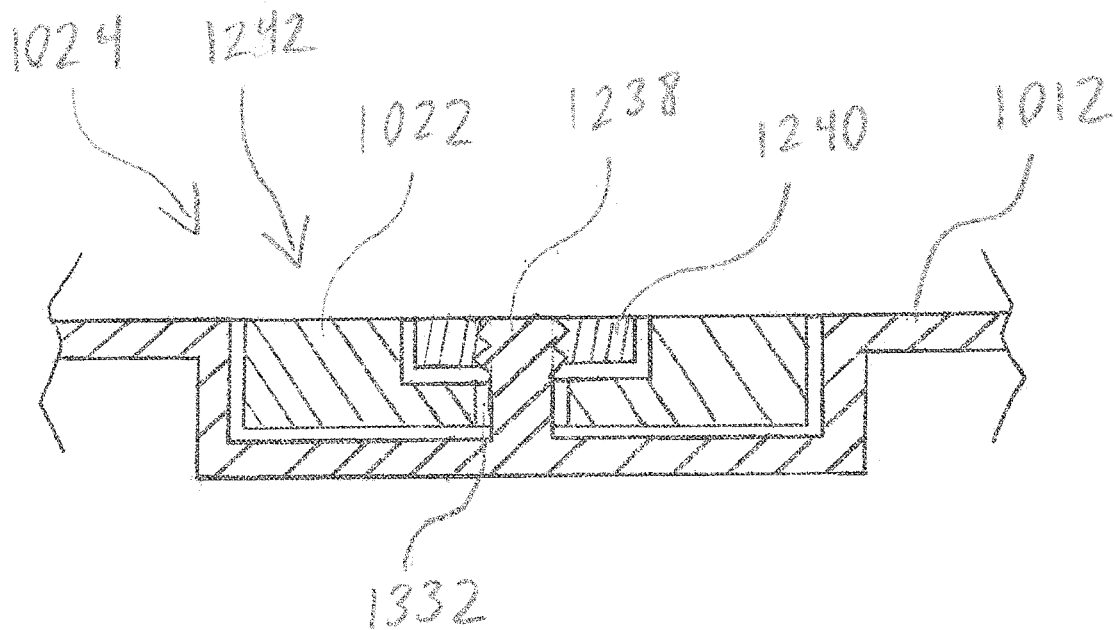
FIG. 59 is a cross-sectional view of a portion of one embodiment of a golf club head and removable weight member.

In another embodiment, as illustrated in FIG. 59, the sole 1012 can include a weight mount 1024, which is configured to couple the weight member 1022 to sole 1012. In the present embodiment, the weight mount 1024 is a recessed portion of the sole 1012, forming a weight recess 1242 that is shaped to complement the shape of weight member 1022. In some embodiments, as illustrated in FIG. 59, the weight mount 1024 can include a stud 1238 that extends through the weight bore 1332 of the weight member 1022 and engages a nut 1240. The stud 1238 can include an external thread and the nut 1240 can include an internal thread. The nut 1240 is removably attached to the stud 1238 so that it forces the weight member 1022 into the weight mount 1024.

Figure 60:
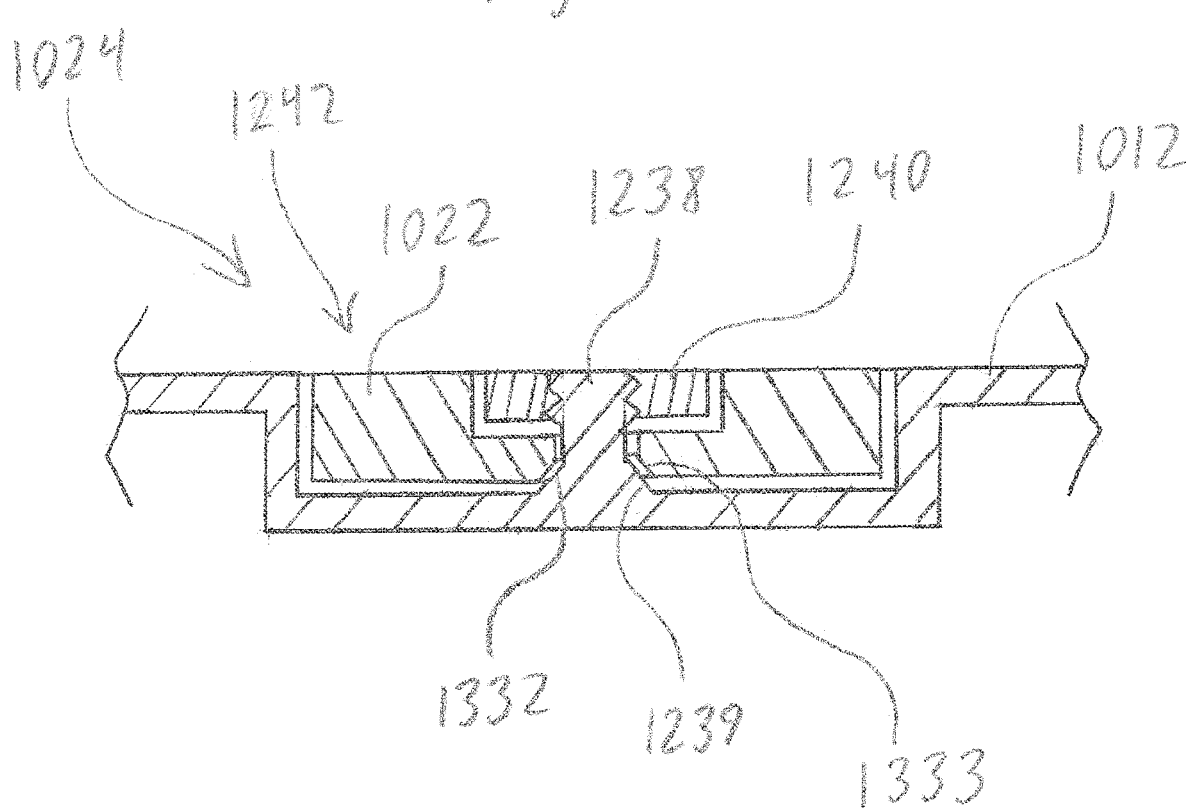
FIG. 60 is a cross-sectional view of a portion of one embodiment of a golf club head and removable weight member.

In another embodiment, as illustrated in FIG. 60, the stud 1238 can include a tapered portion 1239 configured to engage the weight member 1022. The weight bore 1332 of the weight member 1022 can include a complimentary tapered engagement portion 1333 configured to engage the tapered portion 1239 of the stud 1238, the combination allowing the weight member 1022 to be self-locating and limit lateral movement of the weight member 1022. As the nut 1240 is tightened down, the tapered engagement portion 1333 of the weight member 1022 can engage the tapered portion 1239 of the stud 1238 and help to locate the weight member 1240 within the weight recess 1242 and limit movement of the weight member 1022 relative to the weight mount 1024.

Figure 61:
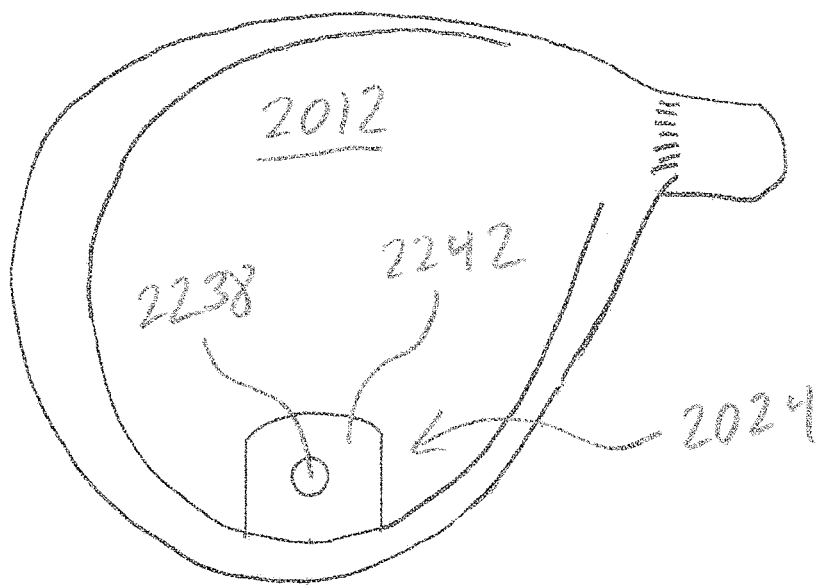
FIG. 61 is a plan view of one embodiment of a golf club head and weight recess.
Figure 62:
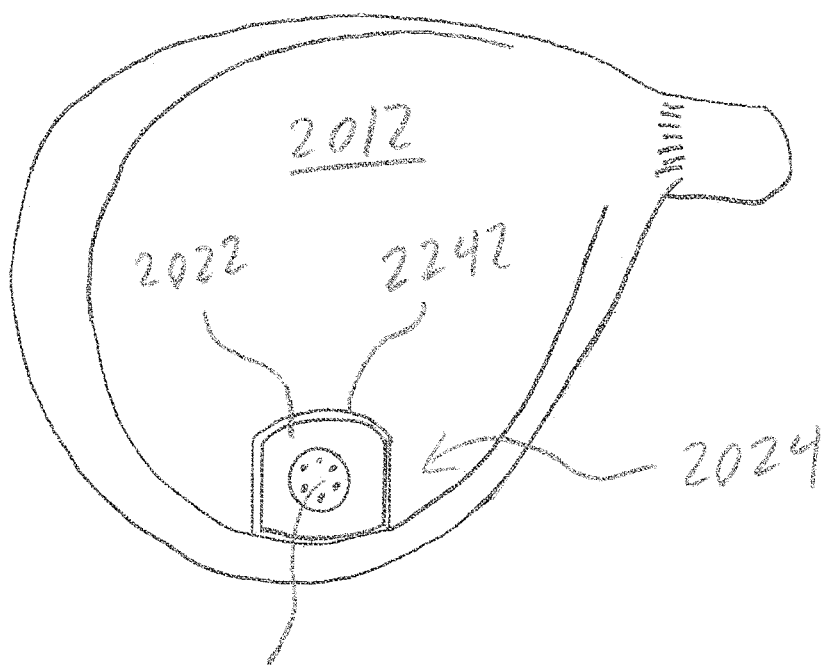
FIG. 62 is a plan view of the golf club head of FIG. 61 including one embodiment of a weight member.
Figure 63:
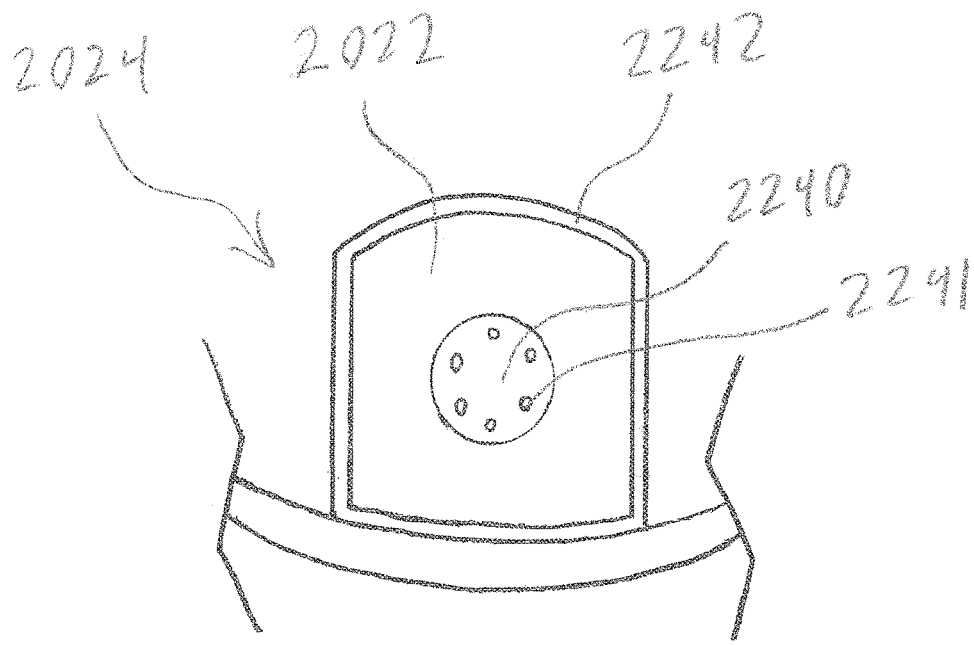
FIG. 63 is a plan view of a sole, aft portion of the golf club head of FIG. 62.
Figure 64:
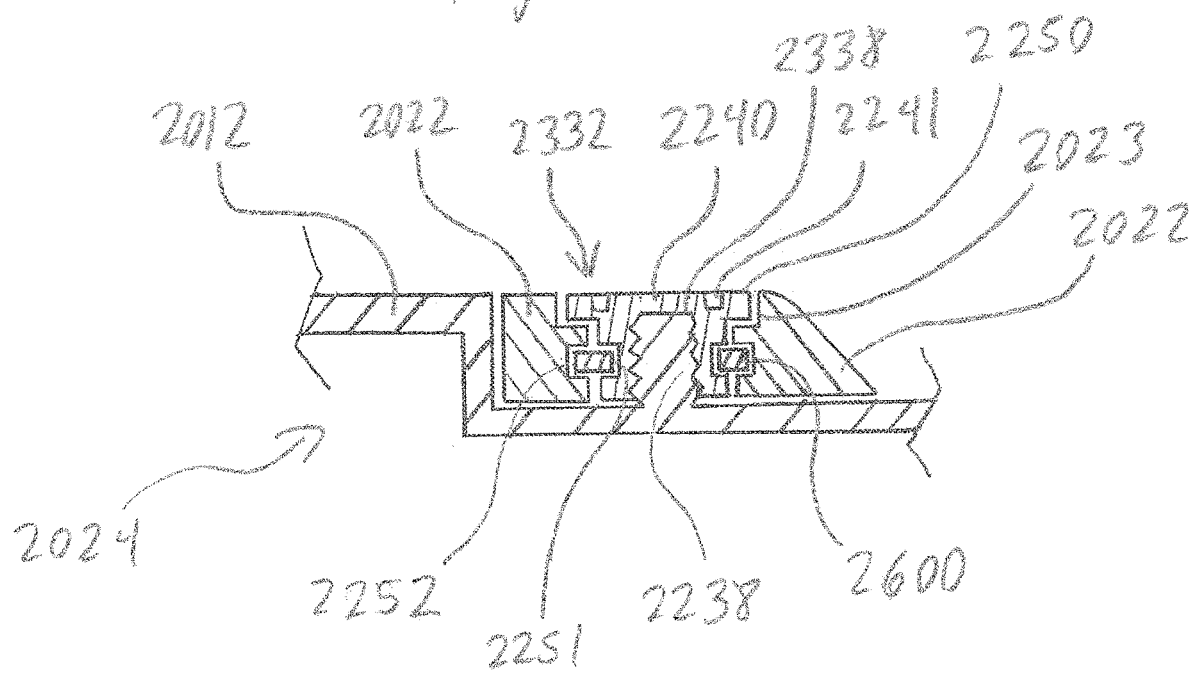
FIG. 64 is a cross-sectional view of a portion of the golf club head and removable weight member of FIG. 62.

In another embodiment, as illustrated in FIG. 61, the sole 2012 can include a weight mount 2024, which is configured to couple the weight member 2022 to the sole 2012. In some embodiments, and as illustrated in FIGS. 62-64, the weight member 2022 can comprise a non-circular shape and the weight recess 2242 of the weight mount 2024 can be shaped to complement the shape of the weight member 2022. The weight member 2022 can comprise, for example, a shape resembling a square, rectangle, polygon, an organic shape, etc. As described above in relation to other embodiments, the weight mount 2024 can include a stud 2238 which includes an external thread. In the present embodiment, the weight member 2022 includes a nut 2240 rotatably coupled to the weight member 2022. The weight member 2022 can be configured such that the nut 2240 can be rotated relative to the weight member 2022. Rotation of the nut 2240 can force the weight member 2022 into the weight mount 2024. In some embodiments, including the embodiment illustrated in 62-64, the nut 2240 can be located in a weight bore 2332 formed through the weight member 2022. The nut 2240 can be circular such that it is able to rotate within the weight bore 2332 of the weight member 2022.

In some embodiments, the nut 2240 can include a threaded bore 2338 configured to engage the stud 2238. In some embodiments, and as illustrated in FIG. 64, the threaded bore 2338 can be blind and not pass all the way through the nut 2240. The weight member 2022 can include a plurality of engagement bores 2241 for a tool to engage. Each engagement bore 2241 can be configured to receive a portion of a tool to transfer torque from the tool to the weight member 2022. A plurality of engagement bores 2241 surrounding the stud 2238 can be advantageous, allowing the thickness of the nut 2240 to be minimized without the engagement bores 2241 interfering with the stud 2240. In other embodiments, the nut 2240 can include a single engagement bore 2241, preferably in a central location of the nut 2240. In other embodiments, the nut 2240 can include a through threaded bore and pass all the way through the nut 2240. The through bore could be plugged with a cap.

In some embodiments, as illustrated in FIG. 64, the nut 2240 can be rotatably coupled to the weight member 2022 via a snap ring 2600. The nut 2240 and the weight member 2022 can include corresponding snap ring grooves 2251, 2252 to receive the snap ring 2600, allowing the nut 2240 to rotate relative to the weight member 2022, but also allowing the nut 2240 to transmit force to the weight member 2022 in a direction substantially in line with a longitudinal axis of the stud 2238. In addition, the snap ring 2600 can cause the weight member 2022 to be forced away from the weight mount 2024 as the nut 2240 is loosened, aiding in removal of the weight member 2022. In some embodiments, the nut 2240 can also include a lip portion 2250 with a diameter larger than the remainder of the nut 2240 and the weight member 2022 can comprise a corresponding shelf 2023 configured to receive the lip portion 2250 of the nut 2240. The lip portion 2250 of the nut 2240 can transmit force to the weight member 2022 towards the weight mount 2024 without transmitting significant force through the snap ring 2600. In some embodiments, not illustrated, the weight member 2022 can include a snap ring groove 2252 above the nut 2240 such that the snap ring 2600 engages the top of the nut 2240, the portion opposite the threaded portion, and the snap ring 2600 only transfers force from the nut 2240 to the weight member 2022 in a single direction, away from the weight mount 2024, and the lip portion 2250 and shelf 2023 described above transfer force from the nut 2240 to the weight member 2022 in the opposite direction, towards the weight mount 2024.

Figure 65:
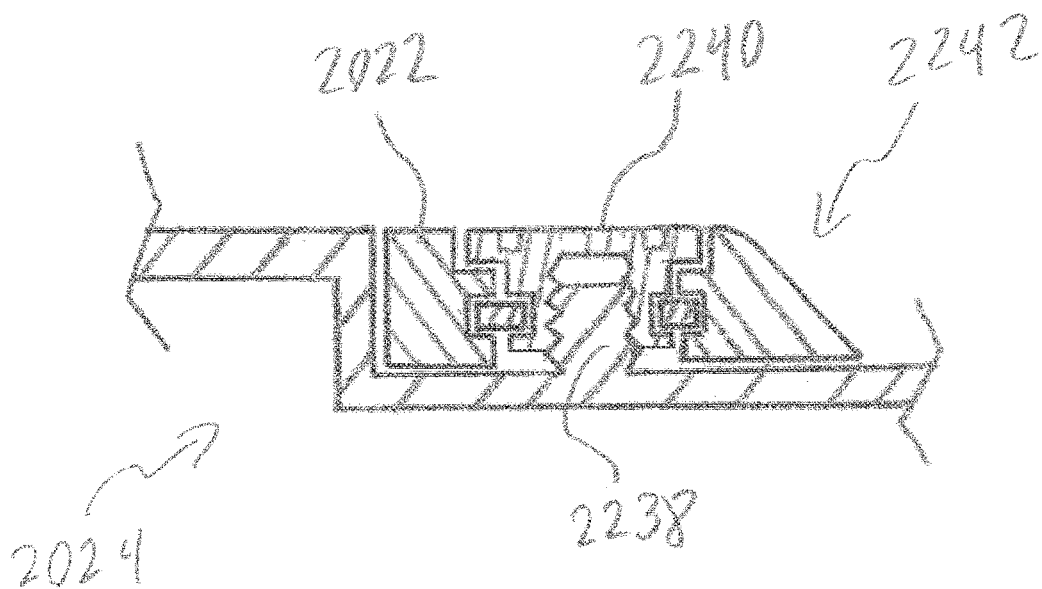
FIG. 65 is a cross-sectional view of an additional embodiment of a portion of a golf club head and removable weight member.

In another embodiment, as illustrated in FIG. 65, the weight member 2022 can be taller than the nut 2240. The weight member 2022 can be configured such that when the nut 2240 is tightened, the weight member 2022 contacts the weight mount 2024 and the nut 2240 does not contact the weight mount 2024. Such a configuration can limit movement of the weight member 2022 relative to the weight mount 2024 as the weight member 2022 is clamped between the nut 2240 and the weight mount 2024.

Figure 66:
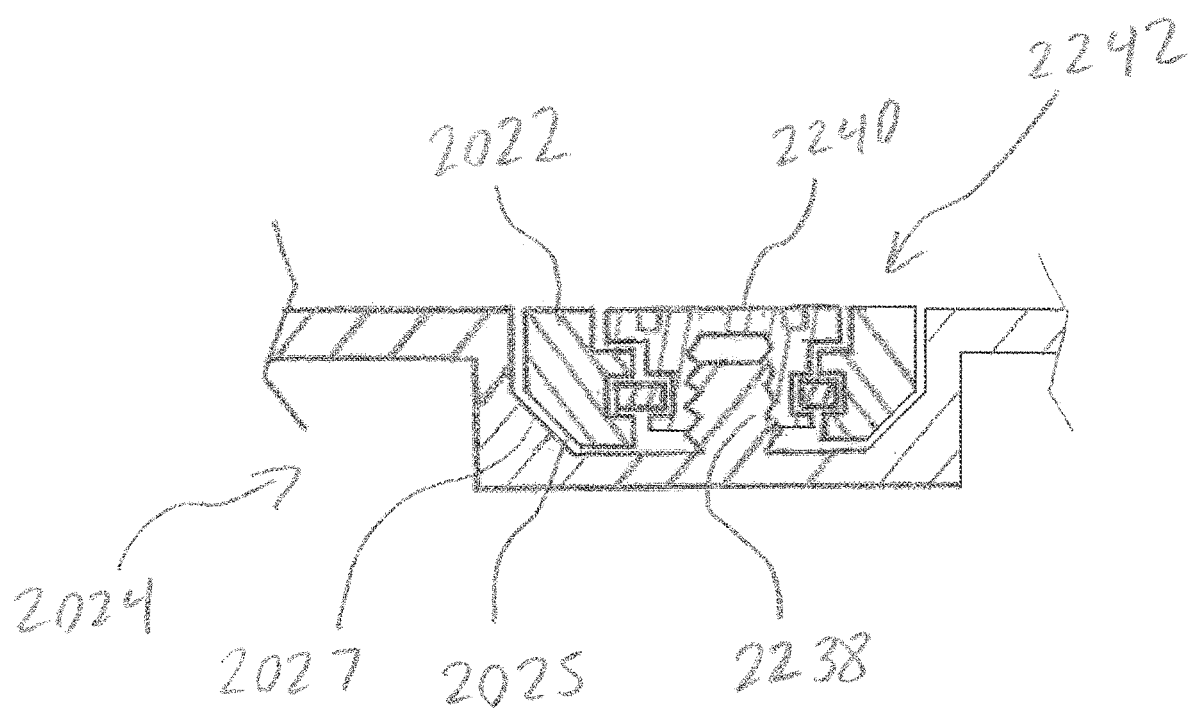
FIG. 66 is a cross-sectional view of an additional embodiment of a portion of a golf club head and removable weight member.

In another embodiment, as illustrated in FIG. 66, the weight member 2022 can include a tapered portion 2025 configured to engage the weight mount 2024. The weight mount 2024 can include a tapered engagement portion 2027 configured to engage the tapered portion 2025 of the weight member 2022. As the nut 2240 is tightened, the tapered portion 2025 will engage the tapered engagement portion 2027, limiting movement of the weight member 2022 relative to the weight mount 2024.

Figure 67:
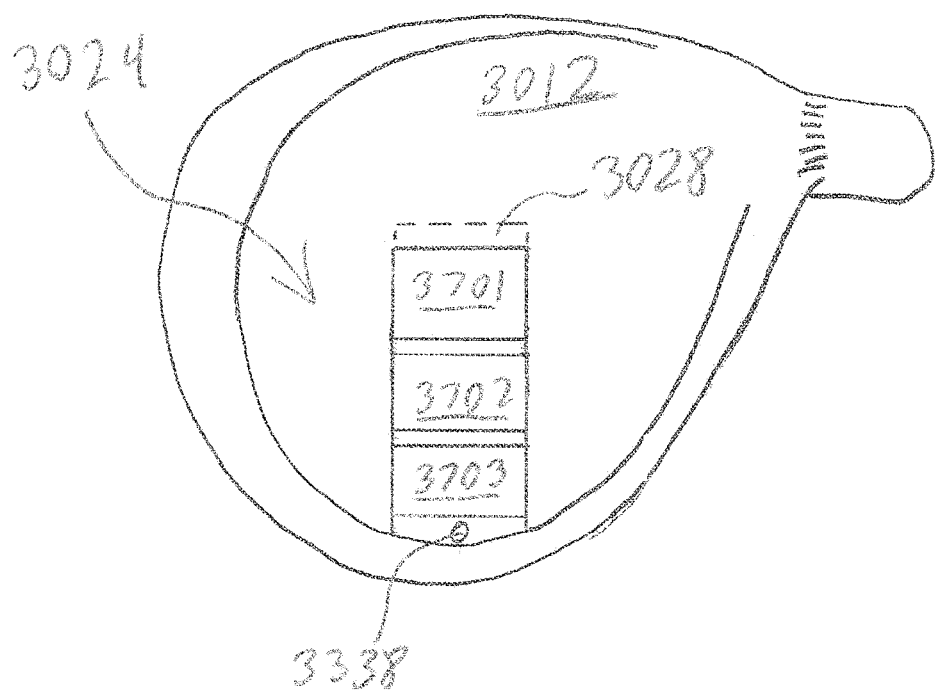
FIG. 67 is a plan view of one embodiment of a golf club head and plurality of weight recesses.
Figure 69:
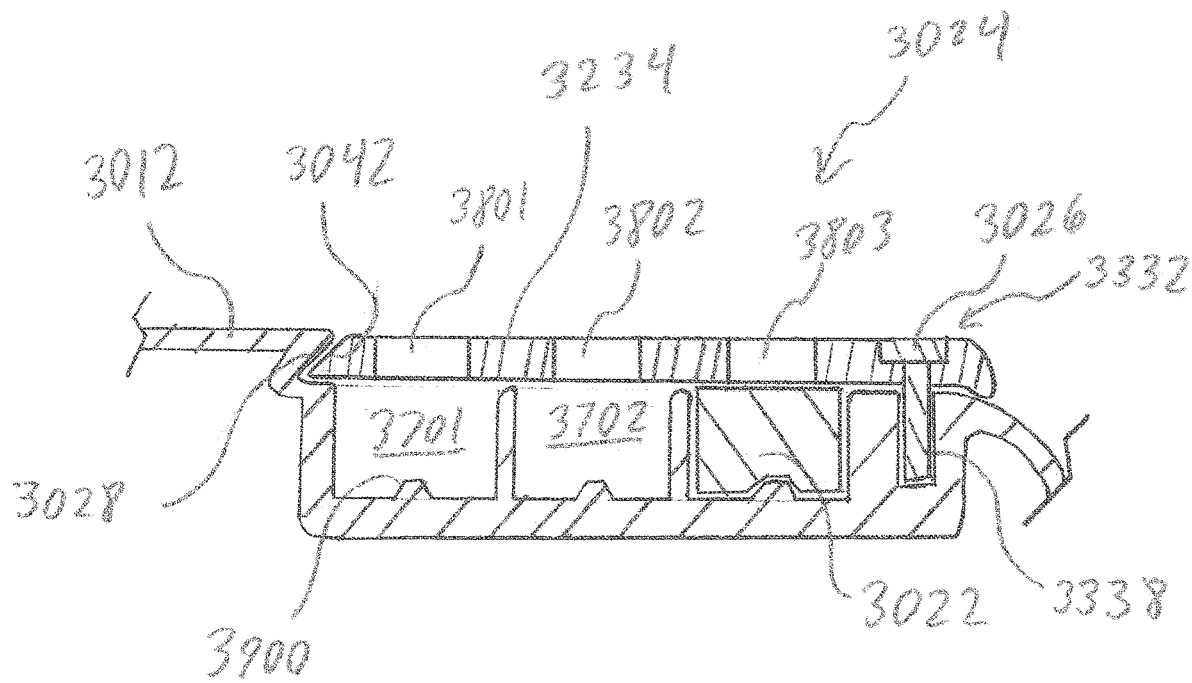
FIG. 69 is a cross section view of a portion of the golf club head and retainer of FIG. 68.

In another embodiment, as illustrated in FIG. 67, the sole 3012 can include a weight mount 3024, which is configured to receive the weight member 3022 (See FIG. 69). In other embodiments, the weight mount 3024 may be located on another portion of the golf club head which may include the crown for example. The weight mount 3024 can include a plurality of recesses 3701, 3702, 3703, each of which is configured to receive the weight member 3022. A weight member 3022 can be inserted into one of the plurality of recesses 3701, 3702, 3703, or in some embodiments, weight members 3022 can be inserted into more than one of the plurality of recesses 3701, 3702, 3703. A weight member 3022 can be removed from one of the recesses 3701, 3702, 3703, and inserted into another recess 3701, 3702, 3703, in order to shift the location of the center of gravity of the golf club head. In some embodiments, the weight mount 3024 can include three recesses as illustrated in FIG. 67. In other embodiments, the weight mount 3024 can a single recess, two recesses, four recesses, or more than four recesses.

Figure 68:
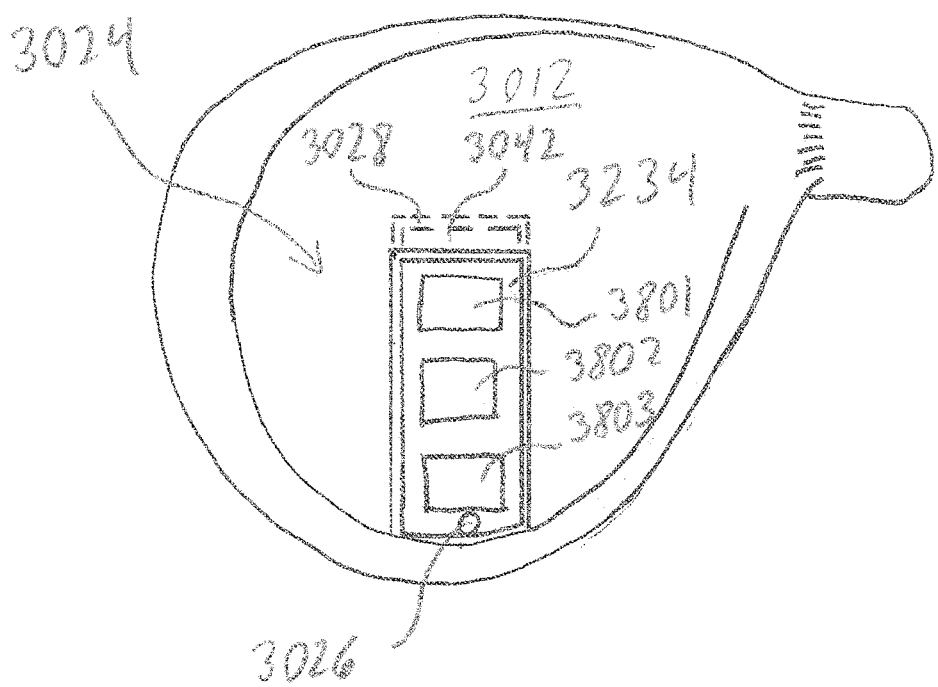
FIG. 68 is a plan view of the golf club head of FIG. 67 including one embodiment of a retainer.
Figure 70:
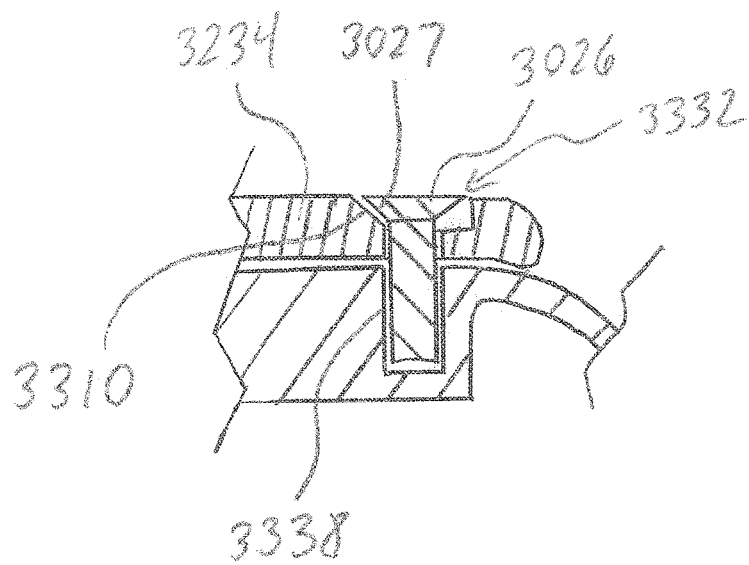
FIG. 70 is a cross-sectional of a sole, aft portion of the golf club head of FIG. 69.

In some embodiments, the weight member 3022 can be held in place with a retainer 3234 as illustrated in FIGS. 68-70. The retainer 3234 is a component separate from the weight member 3022 and forces the weight member 3022 into the recess 3701, 3702, 3703 of choice in the weight mount 3024. The retainer 3234 can include a plurality of windows 3801, 3802, 3803 formed through the retainer 3234 providing a line of sight to each recess 3701, 3702, 3703, allowing a user to determine the location of the weight member 3022 or weight members without the need to remove the retainer 3234. The retainer 3234 can include a window 3801, 3802, 3803 corresponding to each recess 3701, 3702, 3703. In other embodiments, a single window could span a plurality of recesses 3701, 3702, 3703. In some embodiments, as illustrated in FIG. 69, the recesses 3701, 3702, 3703 can include an anchoring protrusion 3900 configured to engage a portion of a weight member 3022, and further limit movement of the weight member 3022 within the recess 3701, 3702, 3703. The weight member 3022 can include a corresponding anchoring recess configured to engage the anchoring protrusion 3900. In some embodiments, the weight mount 3024 can include a coating to ensure a tight fit and limit vibration of the weight member 3022 within the weight mount 3024. The coating can comprise, for example, plastic, Teflon, rubber, etc. In some embodiments, the weight mount 3024 can include an insert to ensure a tight fit and limit vibration of the weight member 3022 within the weight mount 3024. The insert can comprise, for example, plastic, Teflon, rubber, etc.

The weight mount 3024 can include a bevel 3028, as illustrated in FIG. 69, configured to receive a first end of the retainer 3234. In some embodiments, the bevel 3028 can comprise an undercut taper, a chamfer, or a dovetail surface. A first end 3028 of the retainer 3234 can include an angled abutment surface 3042 configured to engage the bevel 3028 of the weight mount. The second end of the retainer 3234, opposite the first end, can include a weight bore 3332 configured to receive a fastener 3026. The weight bore 3332 can comprise a thru hole passing all the way through the retainer 3234. The first end of the retainer 3234 can be inserted into the bevel 3028, a fastener 3026 inserted into the weight bore 3332 of the retainer 3234 and into a threaded bore 3338 formed in the weight mount 3024, and the fastener 3026 rotated, forcing the retainer 3234 into the weight member 3022 and clamping the weight member 3022 into a recess 3701, 3702, 3703 of the weight mount 3024. In other embodiments, the retainer 3234 can utilize other fastening mechanisms which may include for example, clips, pins, mechanical locking mechanisms, etc. In some embodiments, the weight mount 3024 can include a fastener receptacle configured to receive the fastener. In some embodiments, as illustrated in FIG. 70, the weight bore 3332 in the retainer 3234 can include a tapered portion 3310 and the fastener 3026 can include a tapered engagement portion 3027. As the fastener 3026 is tightened, the tapered engagement portion 3027 can engage the tapered portion 3310 of the retainer 3234, not only forcing the retainer 3234 downward towards the weight member 3022 but also towards the bevel 3028 of the weight mount 3024, clamping the retainer 3234 in place and limiting movement of the retainer 3234 relative to the weight mount 3024 as well as limiting movement of the weight member 3022 relative to the weight mount 3024. As the retainer 3234 is forced towards the bevel 3028, the interaction between the bevel 3028 and the angled abutment surface 3042 forces the retainer 3234 down, further compressing the weight member 3022 into a recess 3701, 3702, 3703 of the weight mount 3024 and limiting movement of the weight member 3022.

Figure 71:
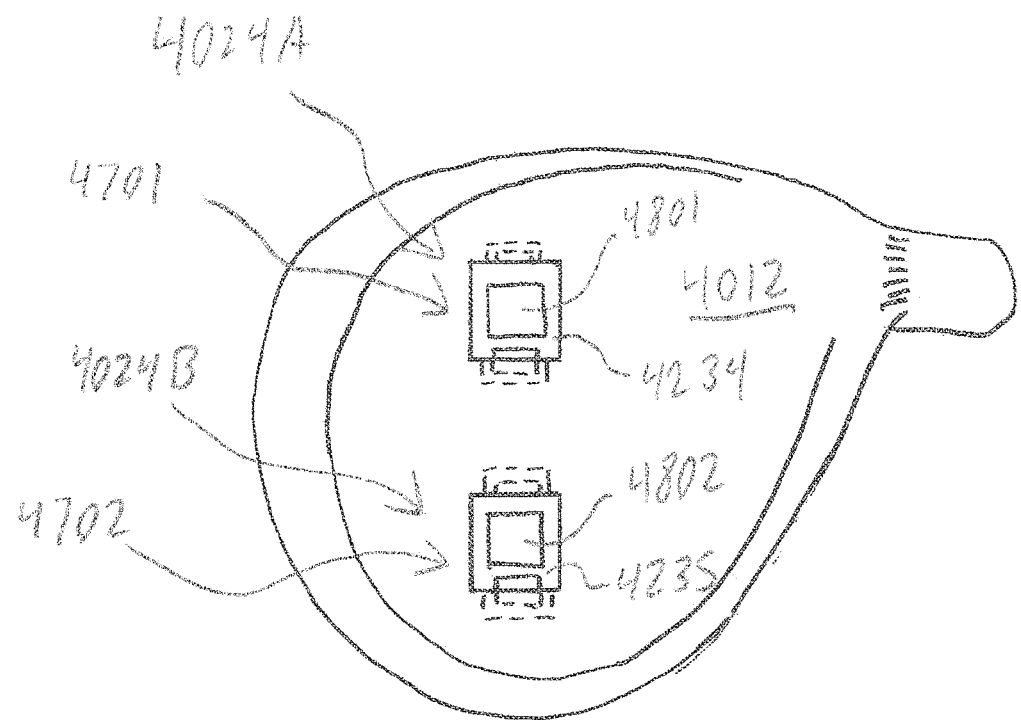
FIG. 71 is a plan view of one embodiment of a golf club head and plurality of weight mounts.
Figure 72:
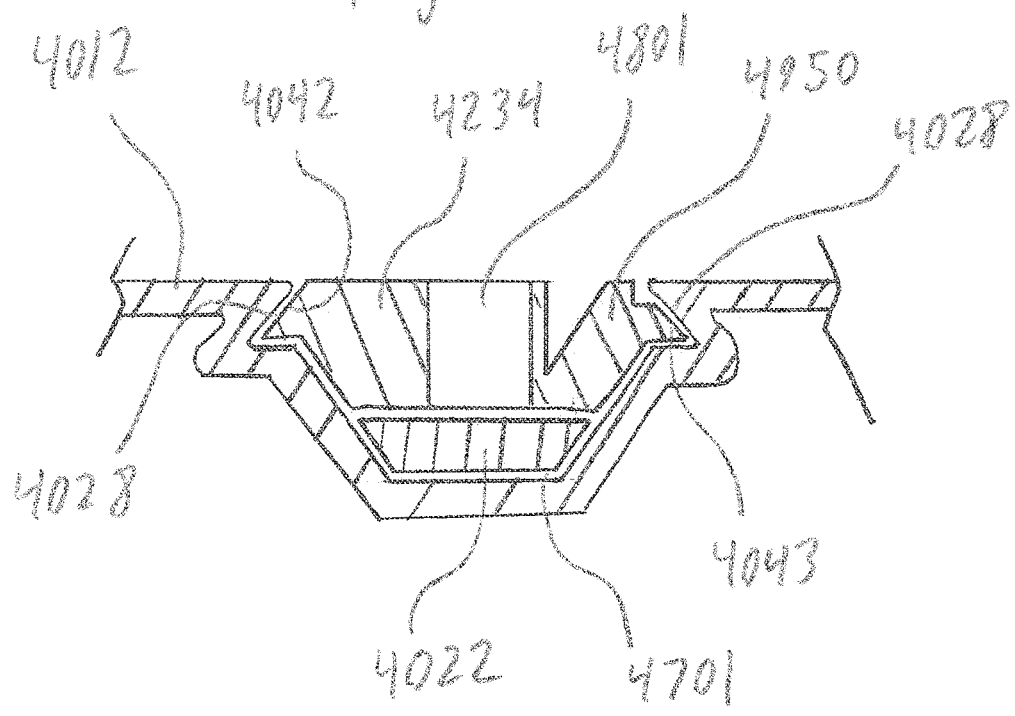
FIG. 72 is a cross-sectional view of a portion of the golf club head and weight mount of FIG. 71.
Figure 73:
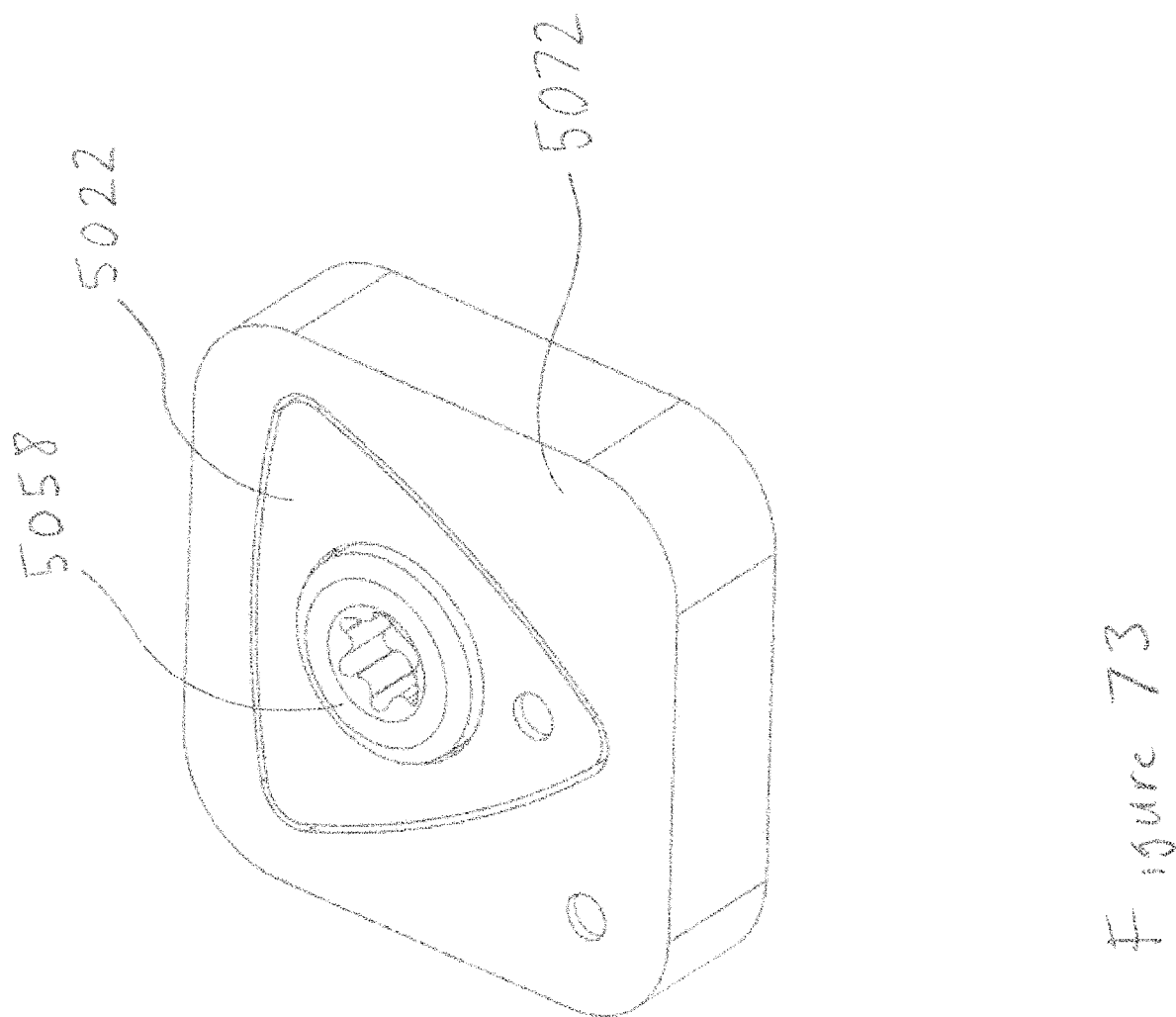
FIG. 73 is a perspective view of one embodiment of a weight member in a weight mount.
Figure 7H:
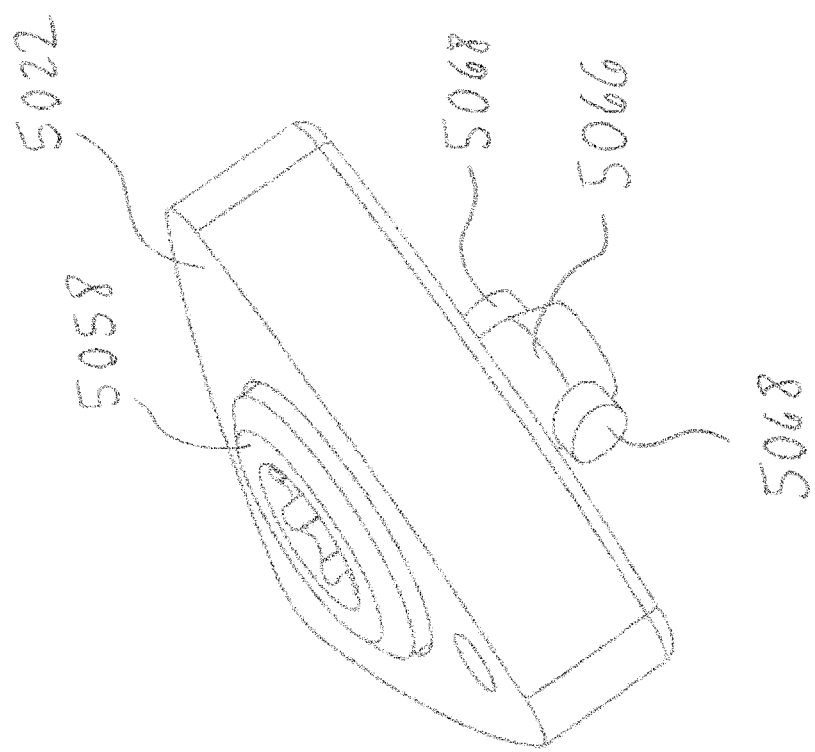

In another embodiment, as illustrated in FIGS. 71 and 72, the sole 4012 can include a plurality of weight mounts 4024A, 4024B. Each weight mount 4024A, 4024B can comprise a recessed portion of the sole 4012 forming a weight recess 4701, 4702 shaped to complement the shape of weight member 4022. In the embodiment illustrated, the weight recesses 4701, 4702 as well as the weight member 4022 are tapered to further limit movement of the weight member 4022 when retained in the weight recess 4701, 4702. Each weight mount 4024A, 4024B can include a retainer 4234, 4235 configured to retain the weight member 4022 in the weight recess 4701, 4702 of the weight mount 4024A, 4024B. The retainer 4234, 4235 can be removed in order to access the weight recess 4701, 4702, and either remove or install a weight member 4022. The weight member 4022 can be moved between the plurality of weight mounts 4024A, 4024B to achieve a desired location of the center of gravity of the club head.

In some embodiments, as illustrated in FIGS. 71 and 72, the retainer 4234, 4235 does not require a threaded fastener. At least a portion of the retainer 4234, 4235 can be configured to flex, deform, or bend, allowing the retainer 4234, 4235 to be installed and removed quickly and easily. In some embodiments, each weight mount 4024A, 4024B can include at least one bevel 4028 configured to receive an angled abutment surface 4042 of the retainer 4234, 4235. In some embodiments, and as illustrated in FIG. 72, the weight mount 4024A, 4024B can include two bevels 4028. The retainer can include a flexible member 4950 configured to extend into a bevel 4028 in a default orientation to retain the retainer 4234, 4235 in the weight mount 4024A, 4024B and also retain the weight member 4022 in the weight mount 4024A, 4024B. The flexible member 4950 can be deflected by forcing it out of the bevel 4028, allowing the retainer 4234, 4235 to be removed from the weight mount 4024A, 4024B. In some embodiments, the flexible member 4950 can include a deflectable angled abutment surface 4043 configured to engage a bevel 4028 of the weight mount 4024A, 4024B. In some embodiments, the opposite end of the retainer 4234, 4235 can include a rigid angled abutment surface 4042 configured to engage an additional bevel 4028 of the weight mount 4024A, 4024B. When the flexible member 4950 is released, causing the moveable angled abutment surface 4043 to engage the bevel 4028 of the weight mount 4024A, 4024B, each angled abutment surface 4043, 4042 can engage their respective bevel 4028, forcing the retainer 4234, 4235 into the weight mount 4024A, 4024B, into the weight member 4022, and limiting movement of the weight member 4022. In some embodiments, the retainer 4234, 4235 can be manipulated with bare hands and not require tools to remove or install the retainer 4234, 4235 and weight members 4012 beneath the retainers 4234, 4235. The retainers 4234, 4235 can also include a window 4801, 4802 allowing a user to determine the location of the weight member 4022 or weight members without the need to remove the retainers 4234, 4235. In an alternative embodiment, one or more of the bevels 4028 could be replaced by undercuts and the angle abutment surfaces 4043, 4042 could be adapted to engage an undercut.

In another embodiment, shown in FIGS. 73-81, a weight member 5022 is coupled to a weight mount 5072. The weight mount can be incorporated into various portions of a golf club head which may include, for example, the sole, the crown, the skirt, etc. FIGS. 73-78 illustrate only a portion of the sole 5052 for the purpose of illustrating the mount 5072 and fastening feature 5060. The weight member 5022 is coupled to the base surface 5077 of the mount 5072 by a fastener 5058 that extends through the bore 5078 of the weight member 5022 and into a fastening feature 5060 of mount 5072. Fastener 5058 and fastening feature 5060 are constructed so that fastener 5058 is placed in a fully locked position with less than a full turn of rotation relative to mount 5072. Preferably, fastener 5058 is placed in a fully locked position with less than a half turn of rotation relative to mount 5072.

Figure 75:
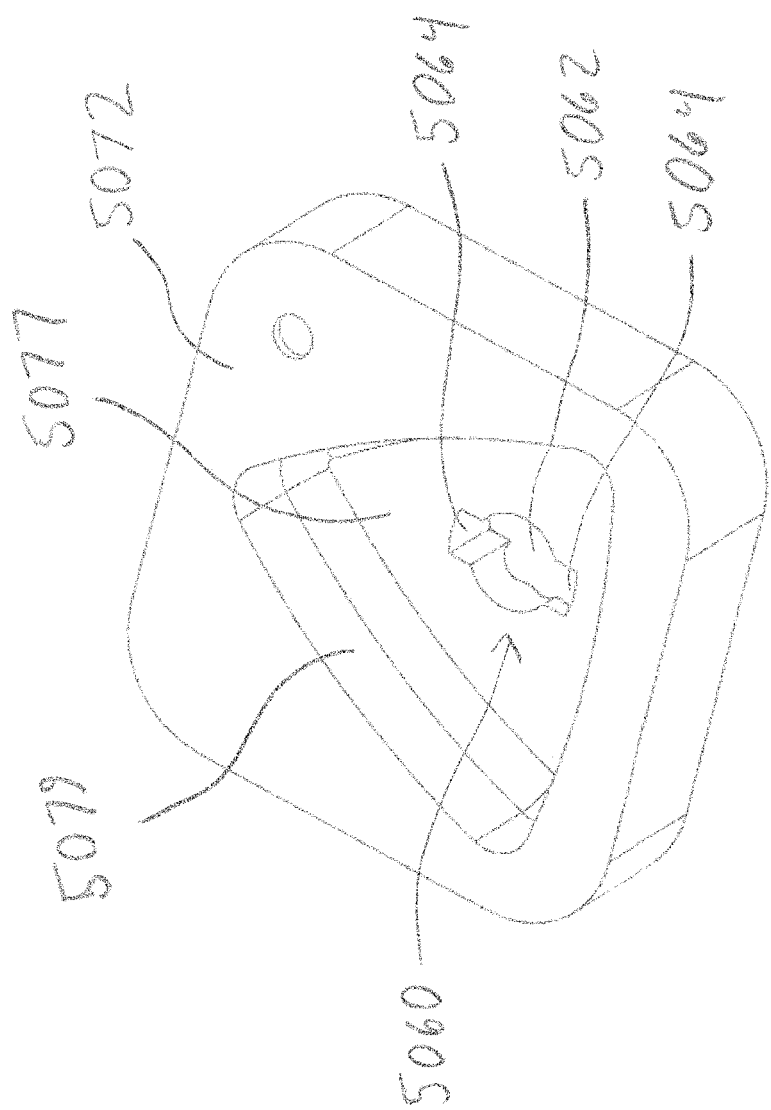
FIG. 75 is a perspective view of the weight mount of FIG. 73.
Figure 76:
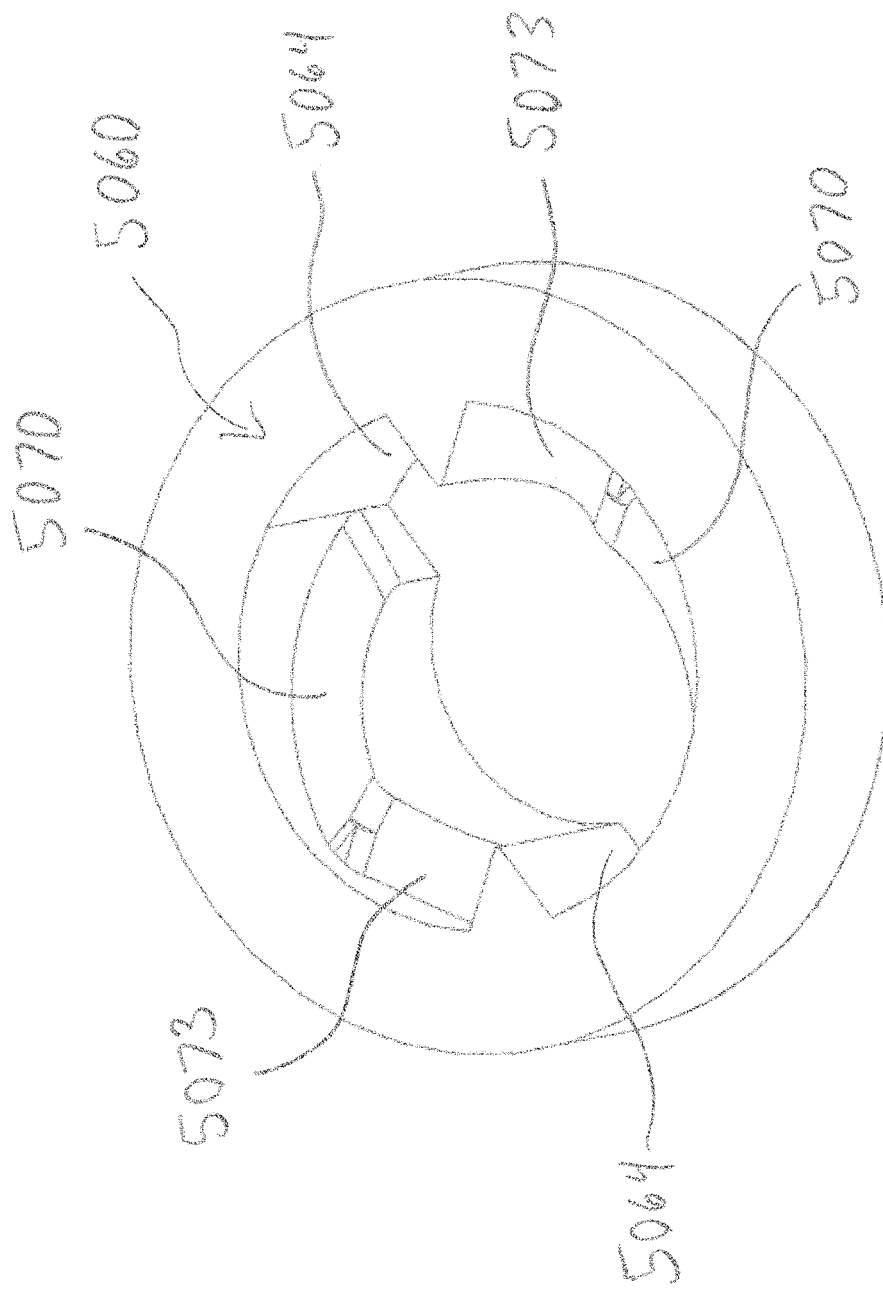
FIG. 76 is a perspective view of the underside of the fastening feature of the weight mount of FIG. 75.
Figure 77:
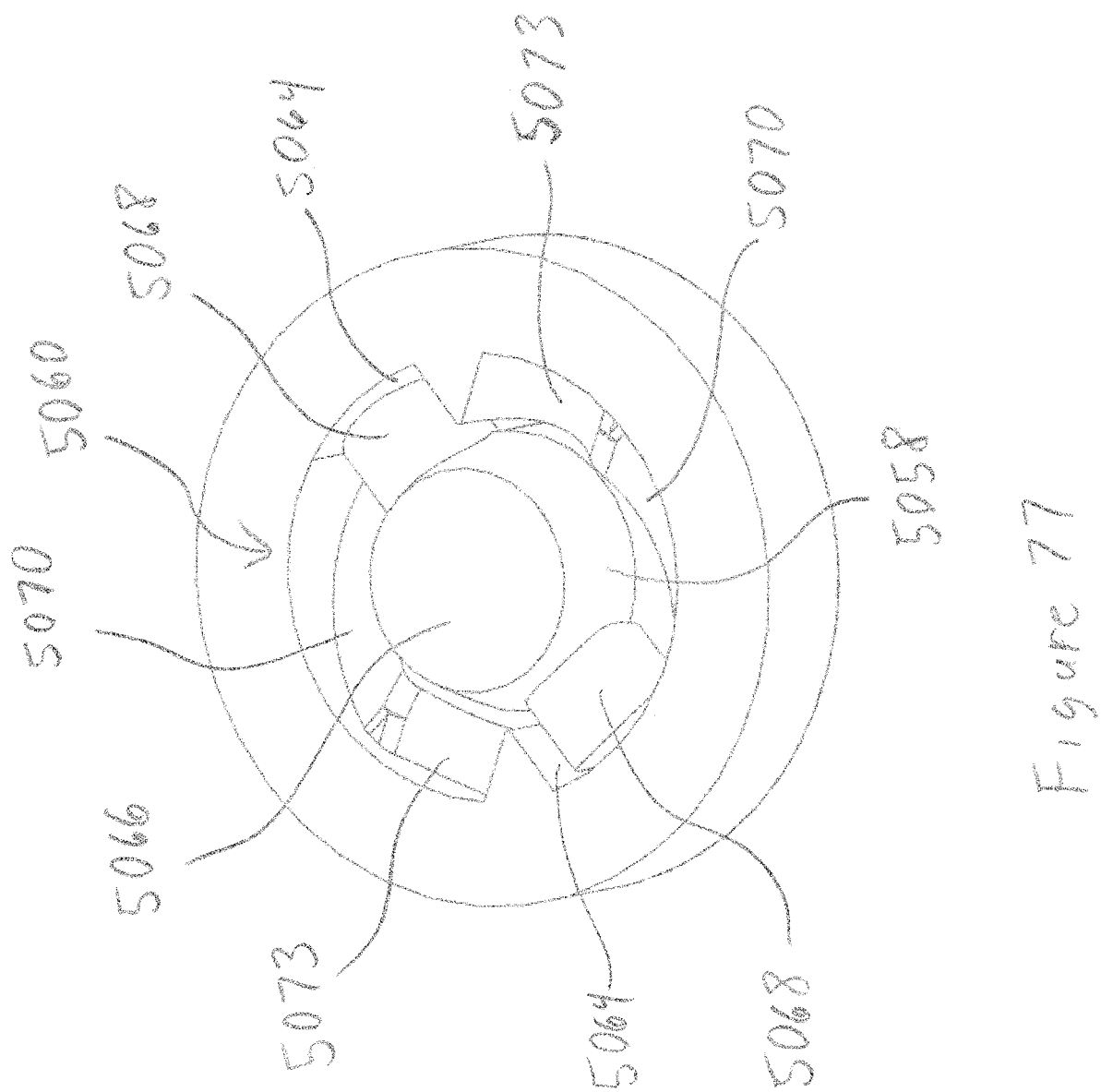
FIG. 77 is a perspective view of a fastener in an unlocked position in the fastening feature of FIG. 76.
Figure 78:
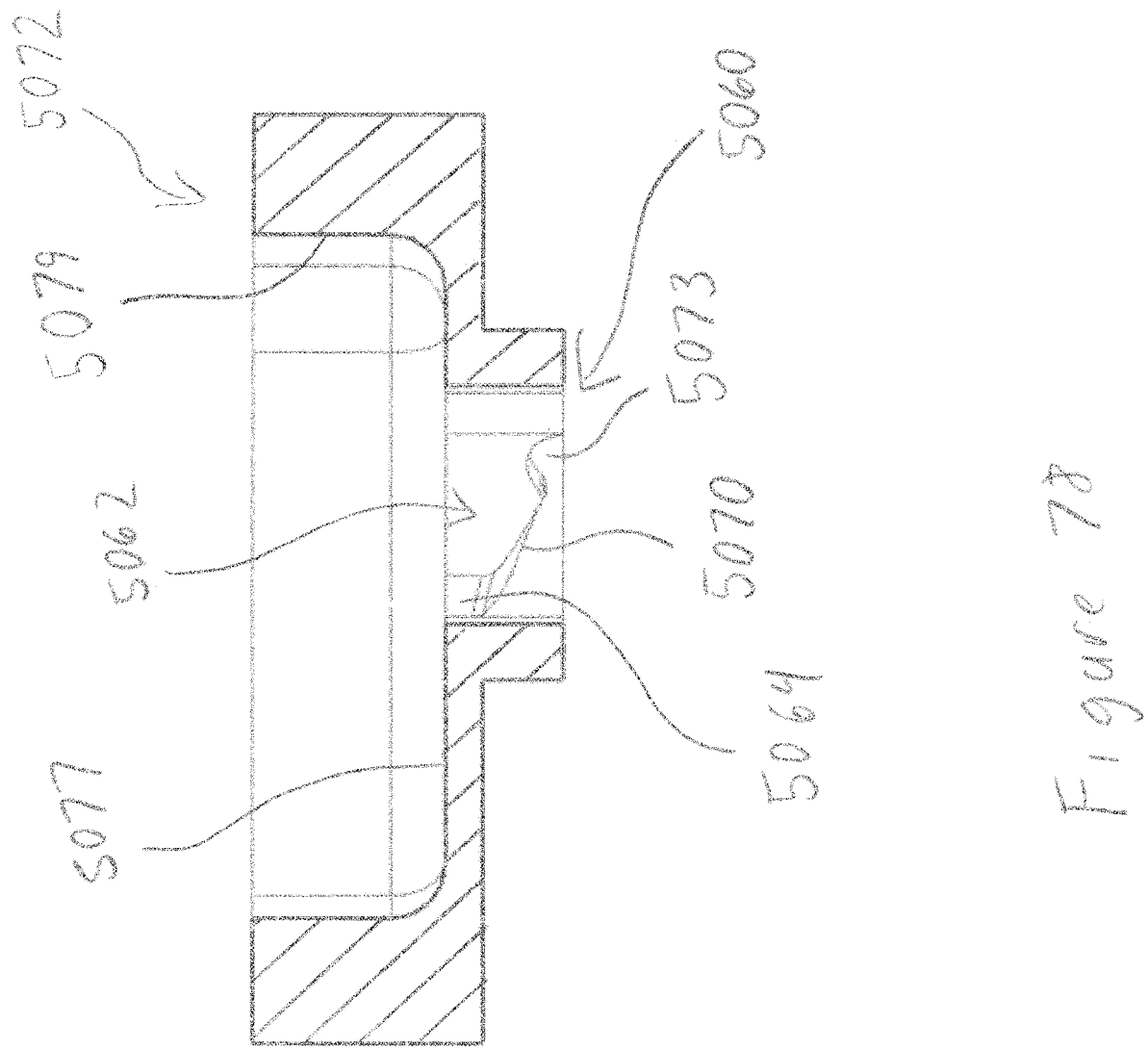
FIG. 78 is a cross-sectional view of the weight mount of FIG. 75.

FIGS. 76 and 77 illustrate a portion of the inner surface of the sole 5052 which is the reverse side of the sole 5052 as illustrated in FIG. 75 for the purpose of further discussing the fastening feature 5060. FIG. 78 is a cross section of mount 5072. Fastening feature 5060 includes a through-bore 5062 that is sized to receive the shank 5066 of the fastener 5058. The fastening feature 5060 also includes keyways 5064, adjacent the through-bore 5062, configured to receive the projections 5068 protruding from the shank 5066 of the fastener 5058. The fastener 5058 is aligned such that the projections 5068 are aligned with the keyways 5064 and then inserted. The fastener 5058 is inserted in a direction parallel to the longitudinal axis of the shank 5066 of the fastener 5058. After the fastener 5058 is fully inserted, the fastener 5058 is rotated so that the projections 5068 slide along the circumferential ramps 5070 and into the detents 5073. The fastener 5058 is rotated about its longitudinal axis. The detents 5073 are portions of the ramps 5070 that are recessed towards the support surface 5074 or the mount 5072.

Figure 79:
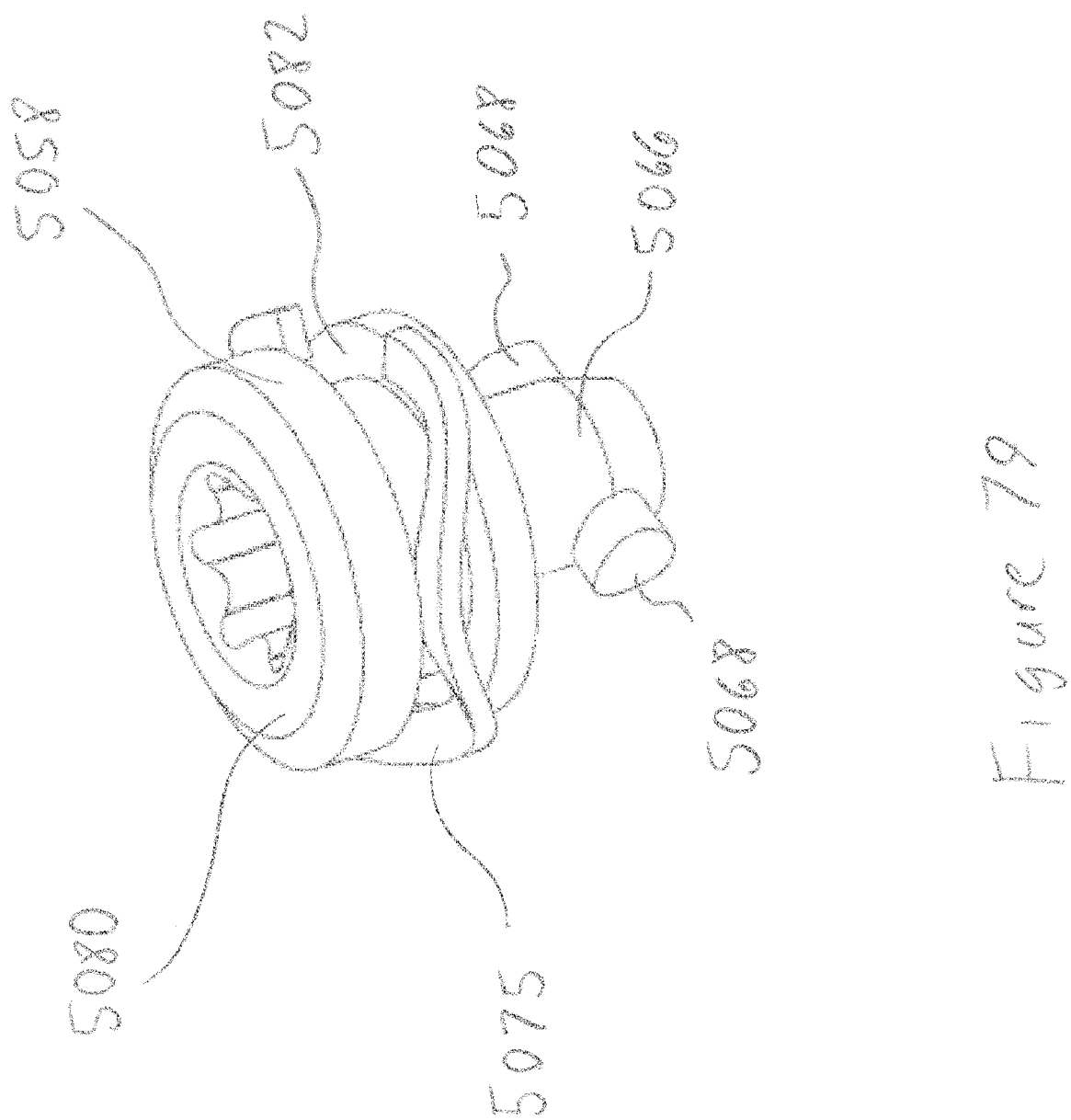
FIG. 79 is a perspective view of the fastener of FIG. 74 including one embodiment of a retainer.
Figure 80:
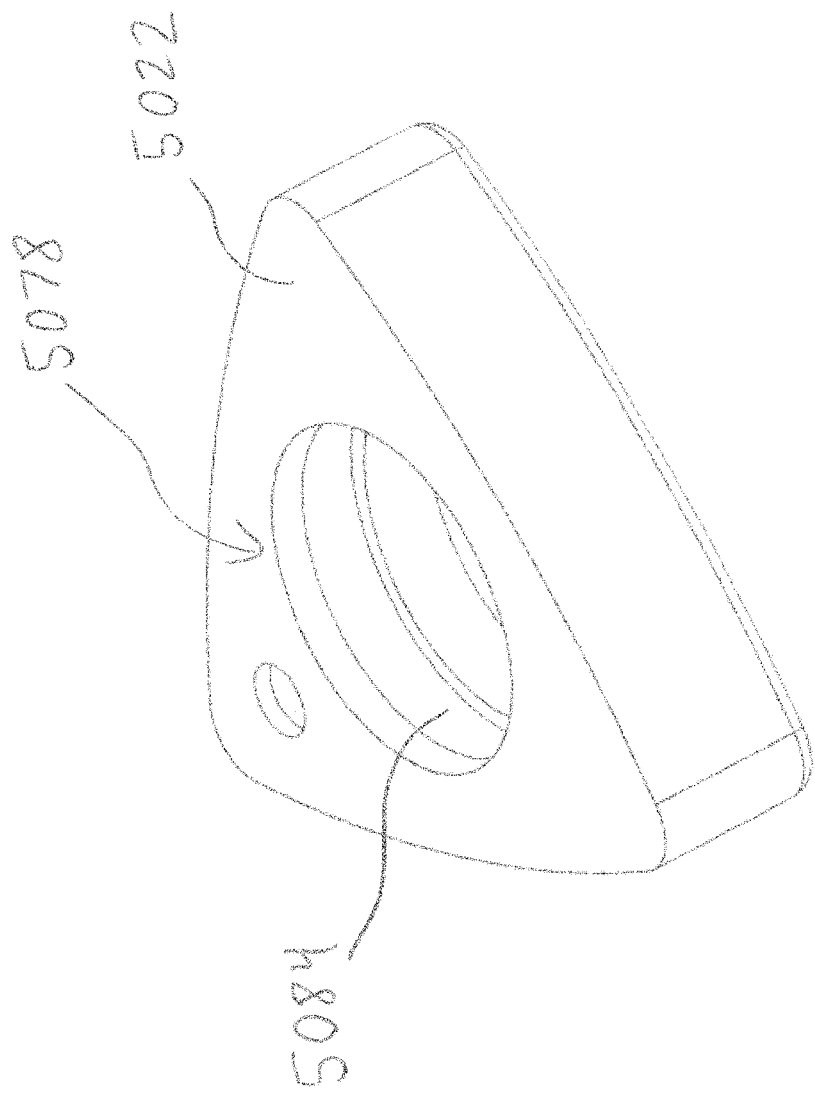
FIG. 80 is a perspective view of the weight member of FIG. 74.
Figure 81:
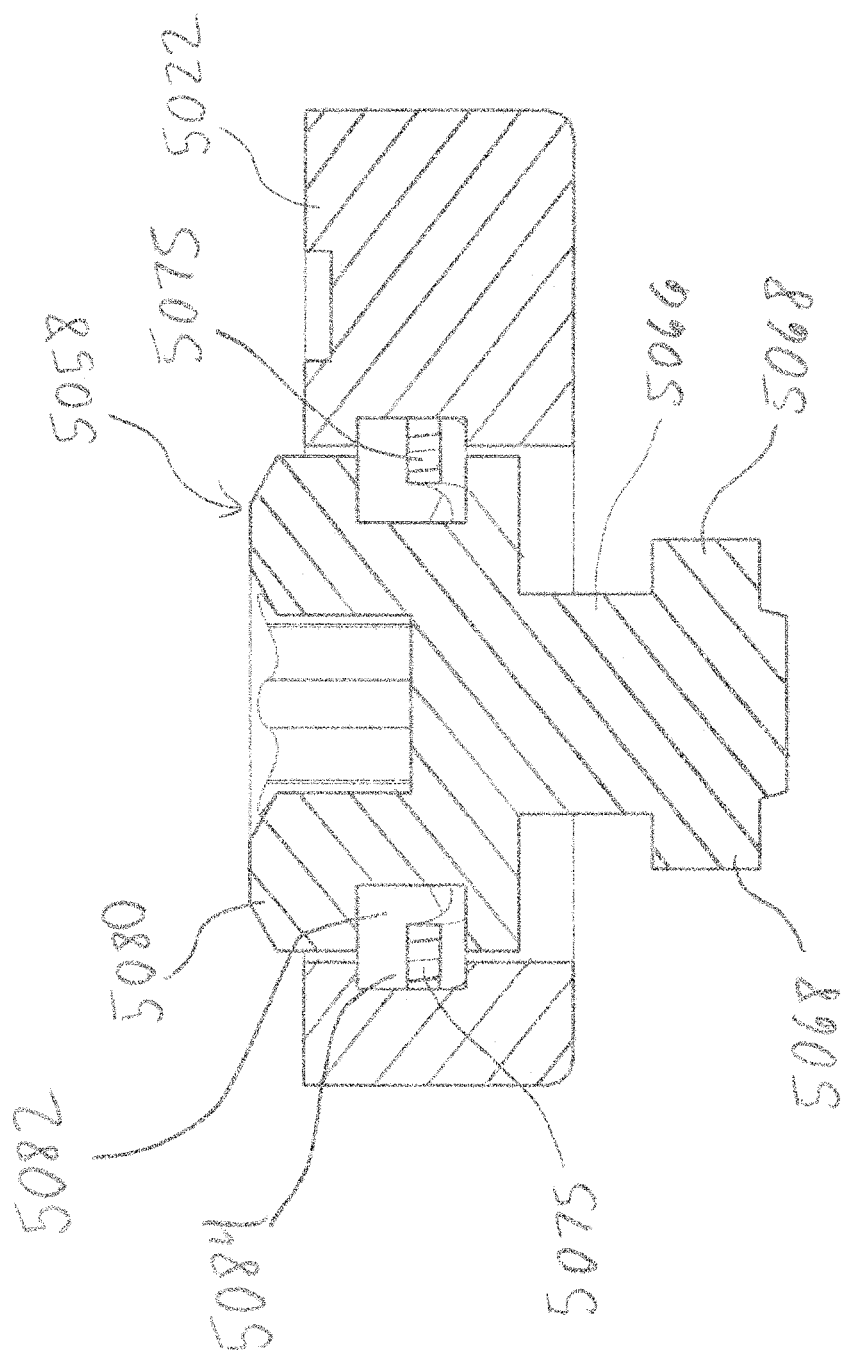
FIG. 81 is a cross-sectional view of the weight member, fastener, and retainer of FIG. 74.

As illustrated in FIGS. 79-81, the fastener 5058 is rotatably coupled to the weight member 5070 by a retainer 5075. The head 5080 of the fastener 5058 includes a circumferential channel 5082 to receive the retainer 5075. The bore 5078 of the weight member also includes a circumferential channel 5084 configured to receive the retainer 5075. In some embodiments, and as illustrated in FIGS. 79 and 81, the retainer 5075 can be compressible. In some embodiments, the retainer 5075 can compress as the fastener 5058 is rotatably coupled to the weight member 5070 and the projections 5068 are forced towards the base surface 5077 by the circumferential ramps 5070. The retainer 5075 can then lock the fastener 5058 in place by forcing the projections 5068 into the detents 5073. In some embodiments, the retainer 5075 can be a spring, and more preferably, as illustrated in FIG. 79, a wave washer. The retainer 5075 can also include a break in its circumference much like a retaining ring or snap ring, such that the retainer 5075 can be expanded and/or compressed for installation onto the fastener 5058 and the weight member 5070.

Figure 82:
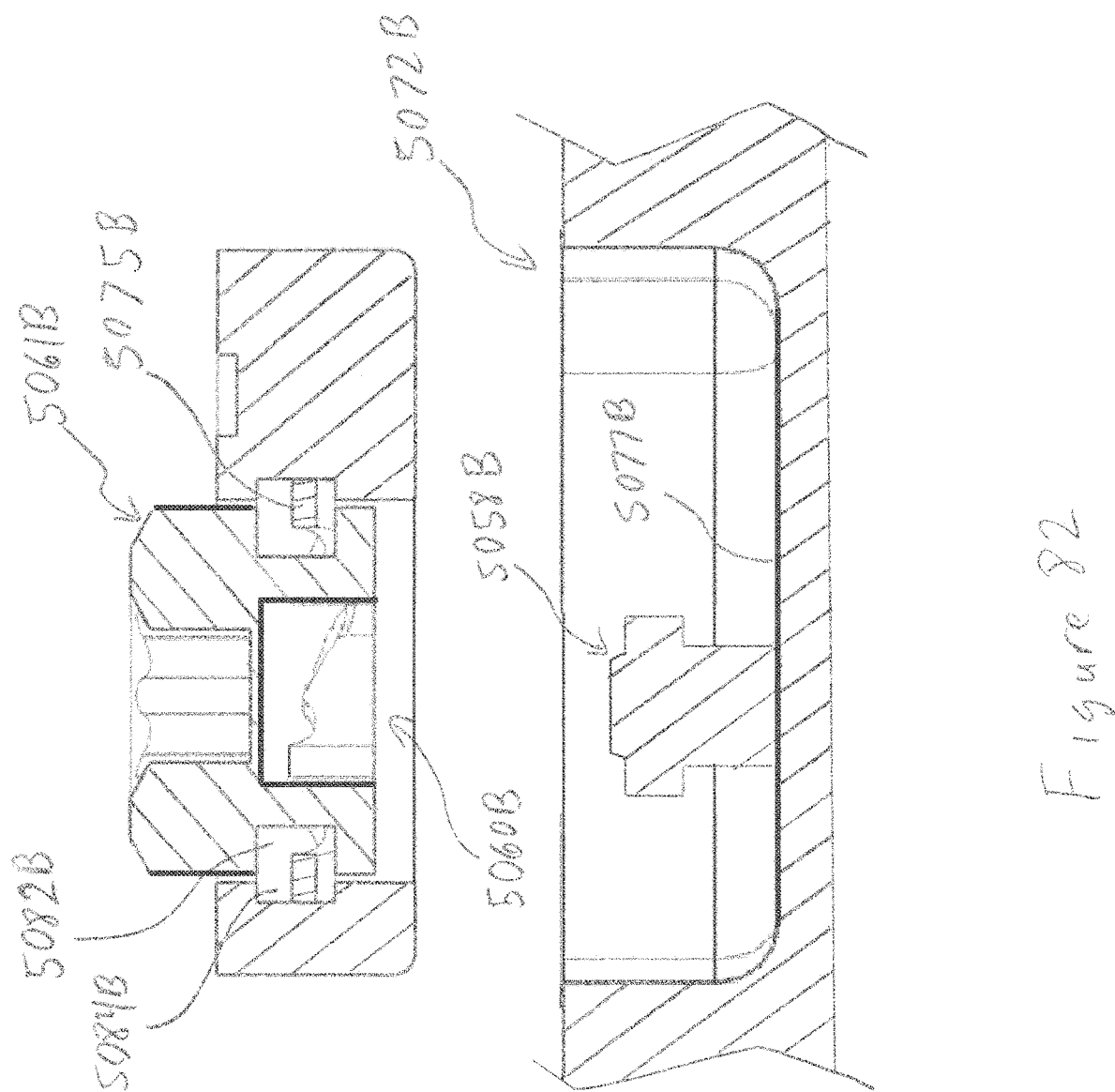
FIG. 82 is a cross-sectional view of one embodiment of a weight member, fastening nut, retainer, and weight mount.

FIG. 82 illustrates an additional embodiment of the weight member 5070B which essentially reverses the fastener 5058 and fastening feature 5060. As illustrated in FIG. 82, the fastener 5058B can be affixed to the base surface 5077B of the mount 5072B and the fastening feature 5060B can be incorporated into a fastening nut 5061B. The embodiment illustrated in FIG. 82 operates much the same as earlier embodiments, only the fastening feature 5060B is rotated relative to mount 5072B and the fastener 5058B remains affixed to the mount 5072B. In many ways, this embodiment functions similarly to that which is depicted in FIGS. 63-66, only that this particular weight member 5070B is placed in a fully locked position with less than a full turn of rotation of the fastening nut 5061B relative to mount 5072B, via the use of the fastener 5058B, fastening feature 5060B, and retainer 5075B. In this embodiment, the fastening nut 5061B incorporates a circumferential channel 5082B to receive the retainer 5075B.

Figure 83:
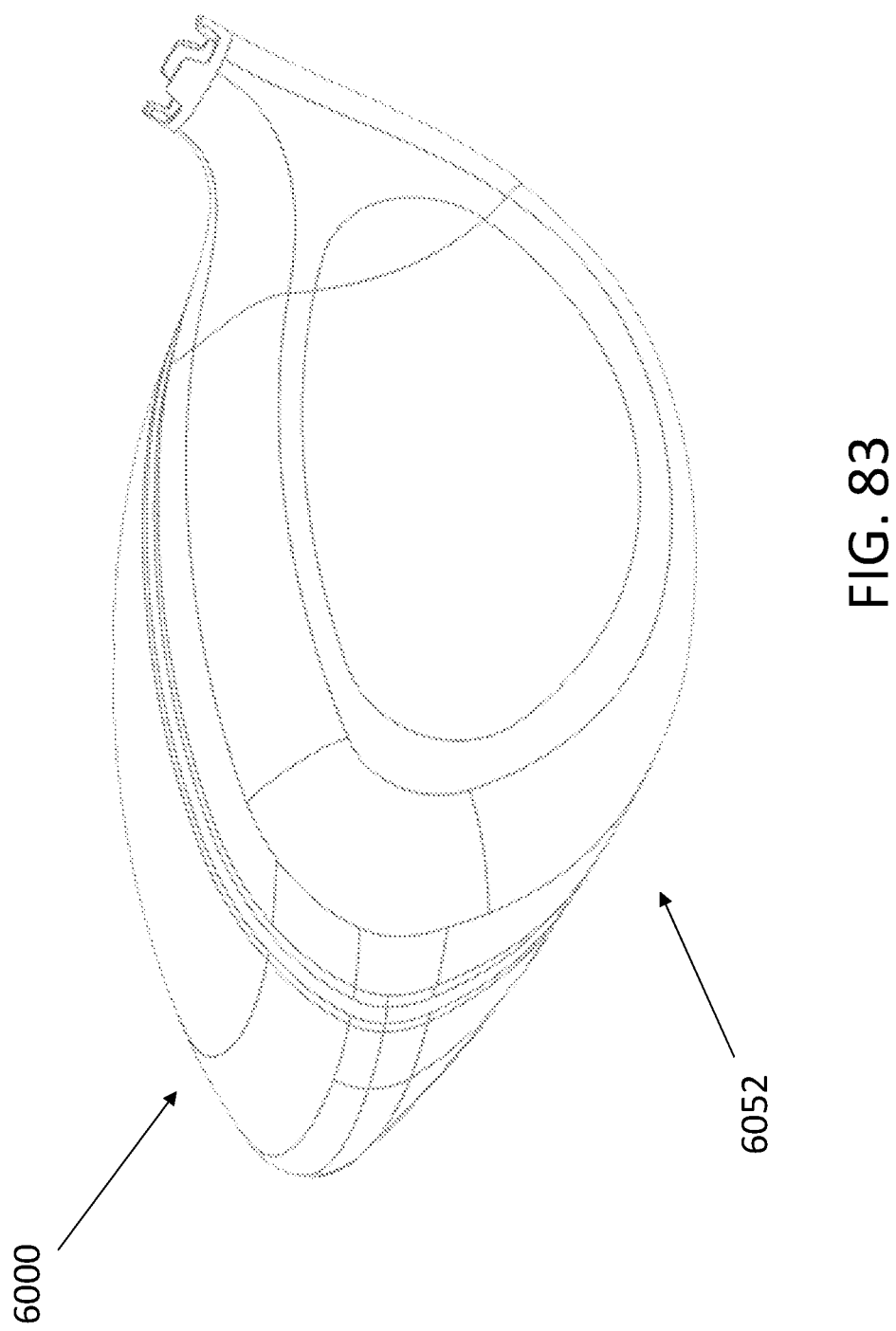
FIG. 83 illustrates a perspective view of an additional embodiment of a golf club head.
Figure 84:
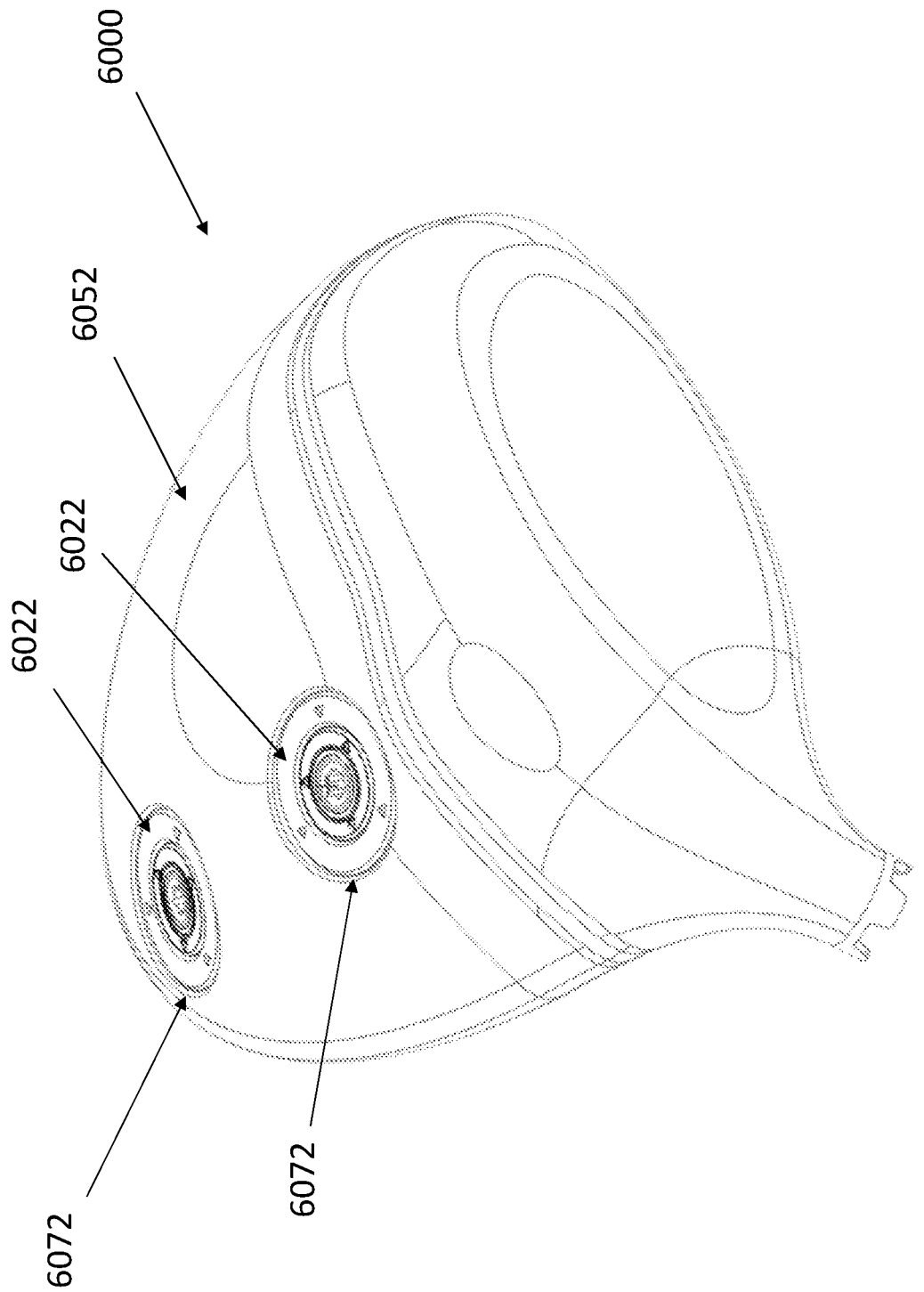
FIG. 84 illustrates a perspective view of an additional embodiment of weight members residing in weight mounts in the sole of the golf club head of FIG. 83.
Figure 85:
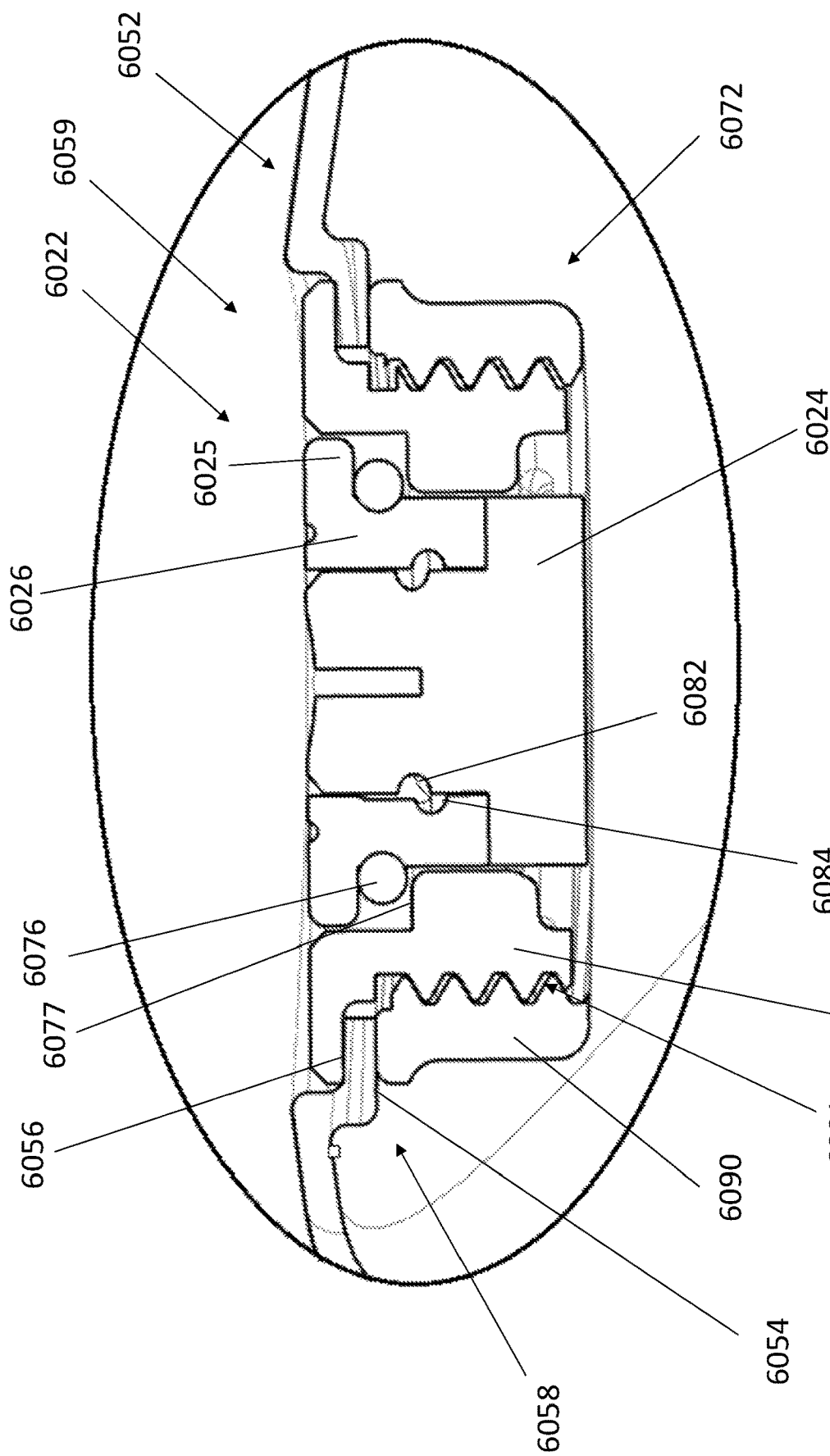
FIG. 85 illustrates a cross sectional view of a weight member and weight mount of FIG. 84.
Figure 86:
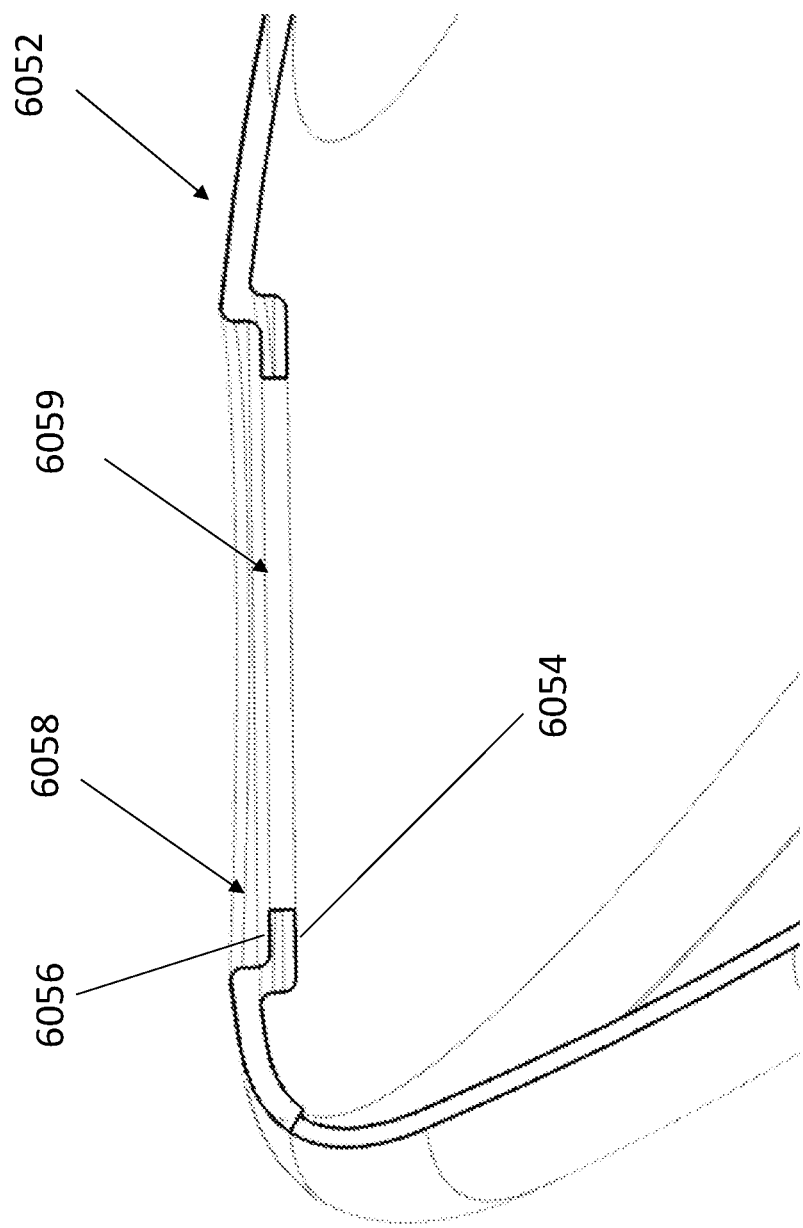
FIG. 86 illustrates a cross sectional view of the sole of the golf club head missing the weight member and weight mount.
Figure 88:
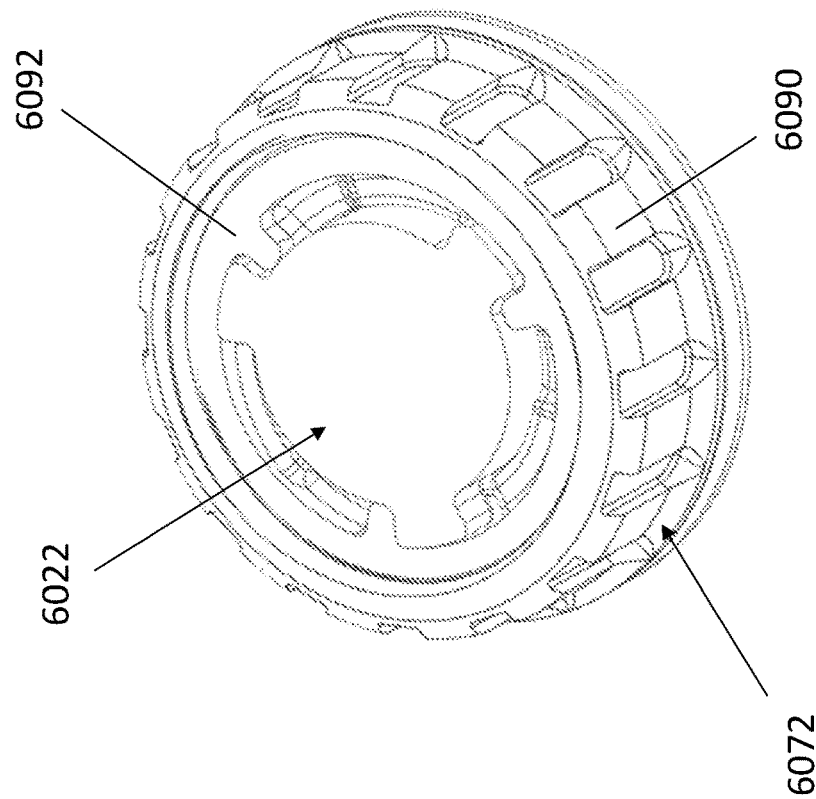
FIG. 88 illustrates an additional perspective view of the weight member and weight mount.
Figure 87:
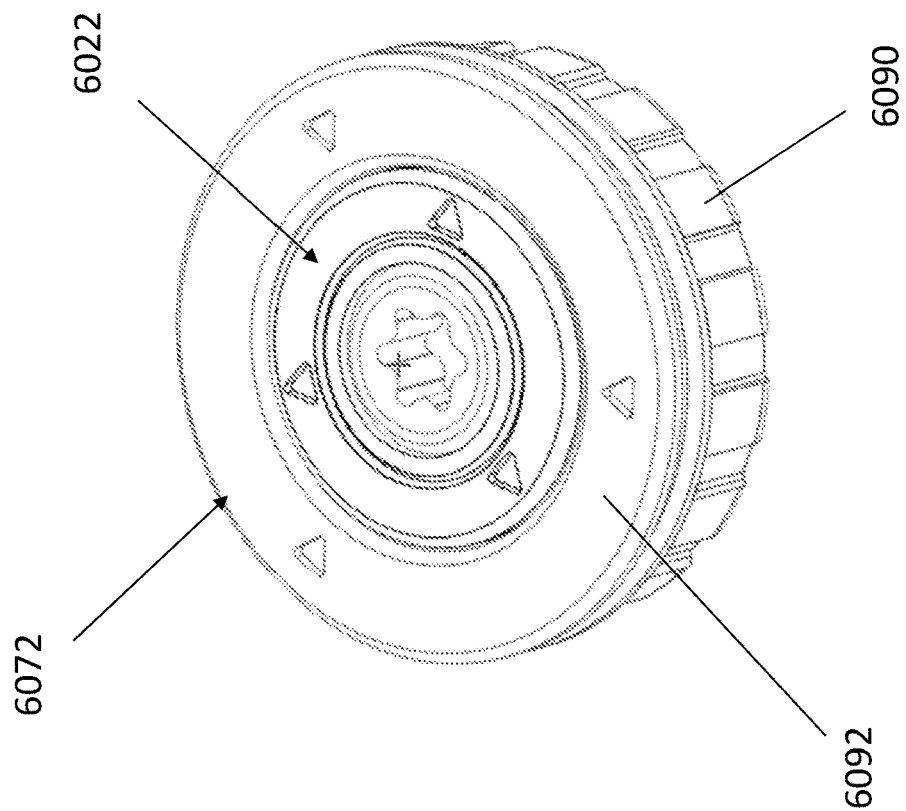
FIG. 87 illustrates a perspective view of the weight member and weight mount.
Figure 90:
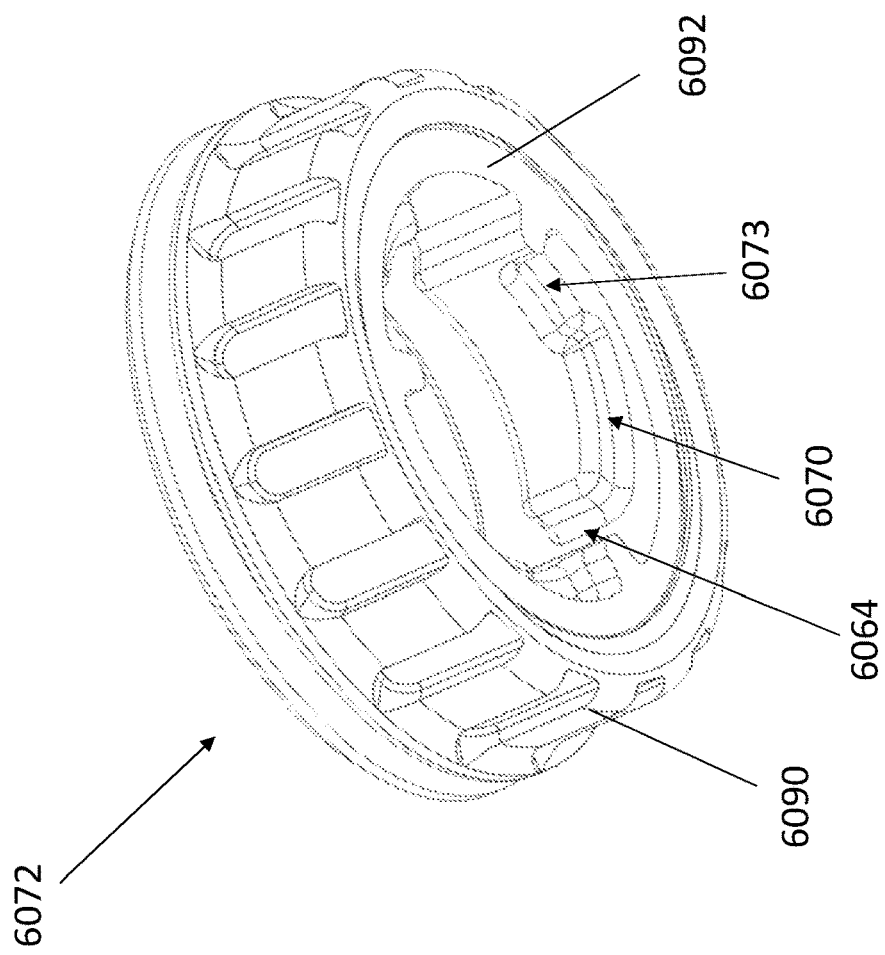
FIG. 90 illustrates an additional perspective view of the weight mount.
Figure 89:
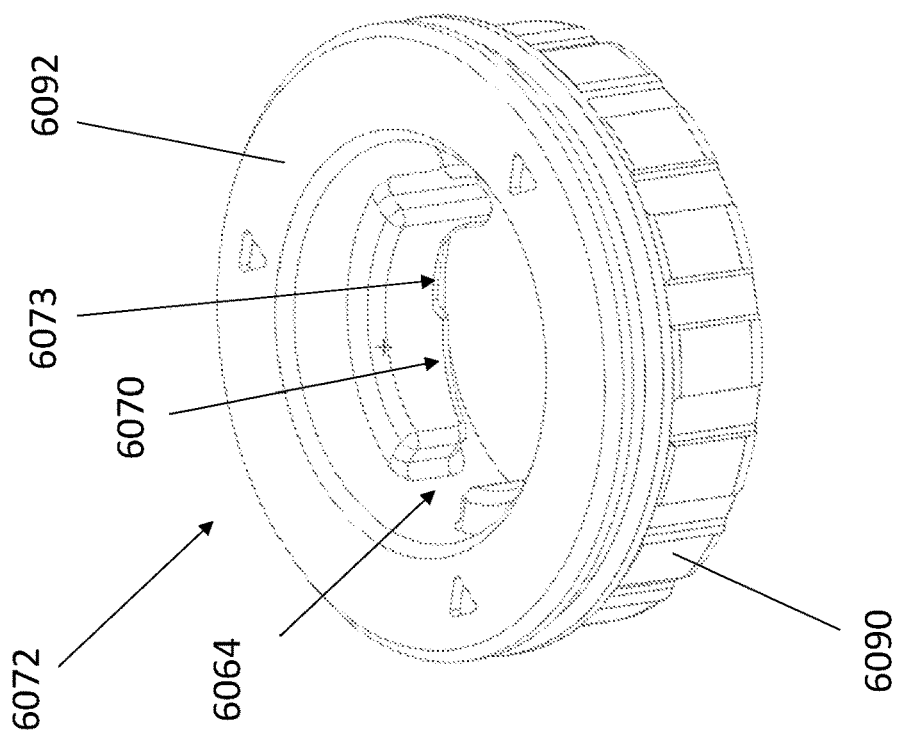
FIG. 89 illustrates a perspective view of the weight mount.
Figures 91, 92:
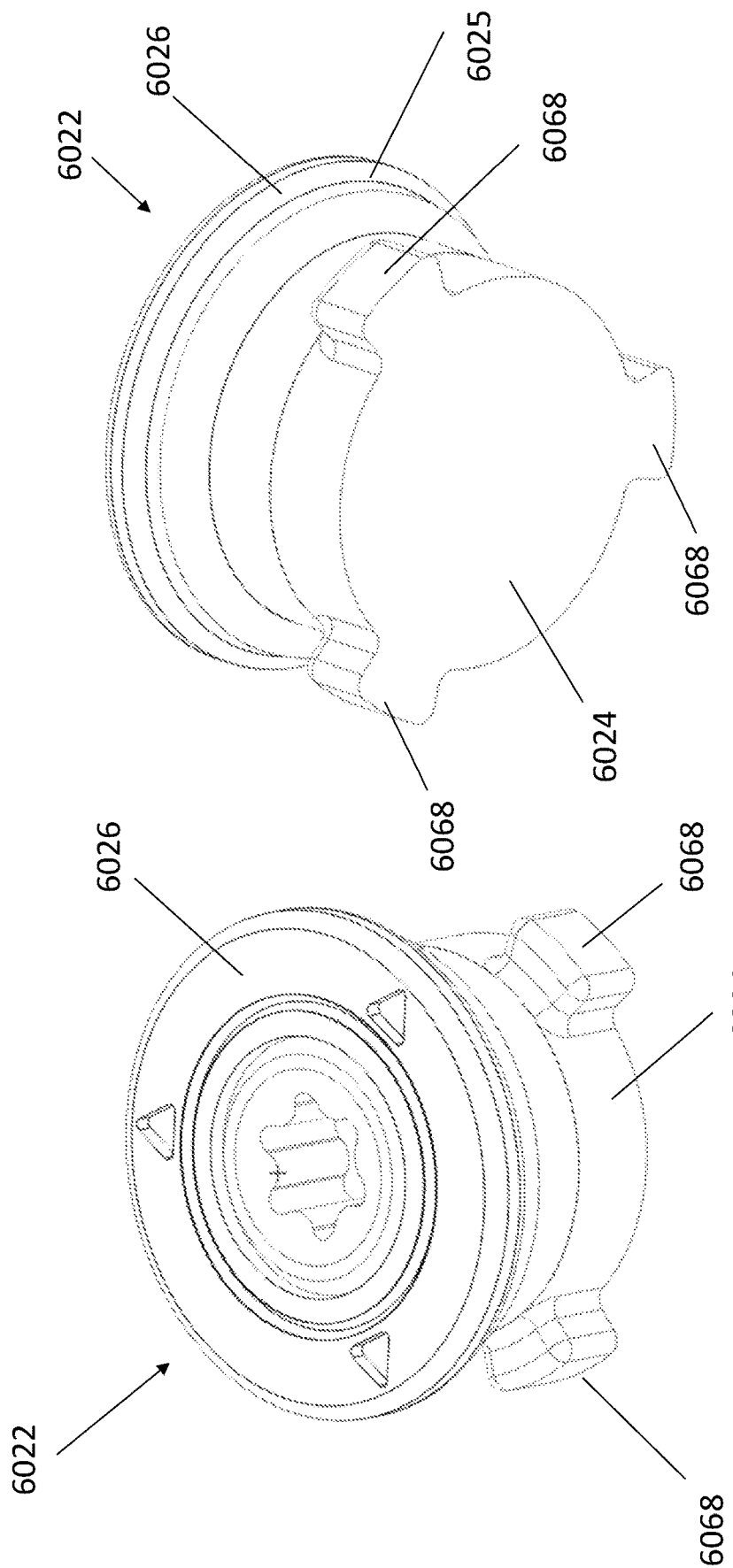
FIG. 91 illustrates a perspective view of the weight member.
FIG. 92 illustrates an additional perspective view of the weight member.
Figure 94:
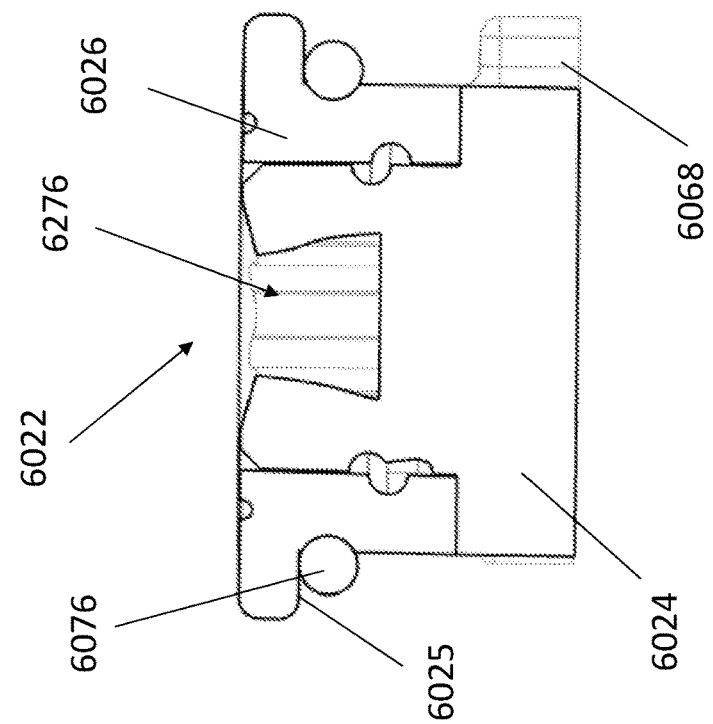
FIG. 94 illustrates a cross section of the weight member.
Figure 93:
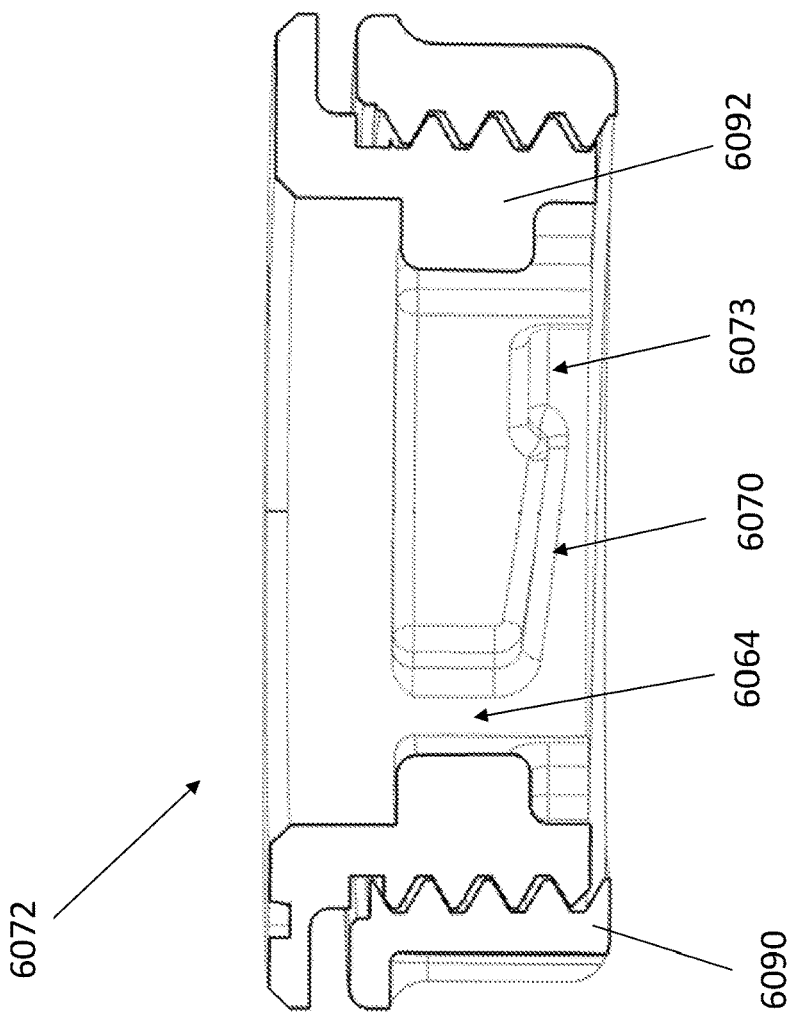
FIG. 93 illustrates a cross sectional view of the weight mount.

FIG. 83 illustrates a perspective view of an additional embodiment of a golf club head 6000. FIG. 84 illustrates a perspective view of an additional embodiment of weight members 6022 residing in weight mounts 6072 in the sole 6052 of the golf club head 600 of FIG. 83. FIG. 85 illustrates a cross sectional view of a weight member 6022 and weight mount 6072 of FIG. 84. FIG. 86 illustrates a cross sectional view of the sole 6052 of the golf club head 6000 missing the weight member and weight mount. FIG. 87 illustrates a perspective view of the weight member 6022 and weight mount 6072. FIG. 88 illustrates an additional perspective view of the weight member 6022 and weight mount 6072. FIG. 89 illustrates a perspective view of the weight mount 6072. FIG. 90 illustrates an additional perspective view of the weight mount 6072. FIG. 91 illustrates a perspective view of the weight member 6022. FIG. 92 illustrates an additional perspective view of the weight member 6022. FIG. 93 illustrates a cross sectional view of the weight mount 6072. FIG. 94 illustrates a cross section of the weight member 6022.

As illustrated in FIGS. 84-94, a weight member 6022 can be coupled to weight mount 6072 on the sole 6052 of a golf club head 6000. The weight mount 6072 can be incorporated into various portions of a golf club head which may include, for example, the sole, the crown, the skirt, etc. In the illustrated embodiment, the weight mount can be formed separately from and affixed to the golf club head 6000. Additional information regarding affixing a weight mount to a golf club head can be found in U.S. Patent Application Ser. No. 16/780,040, filed Feb. 3, 2020, hereby incorporated by reference in its entirety. A particularly relevant construction is found in FIGS. 34-37. Similarly, FIGS. 85-94 of the present application illustrates a weight mount 6072 having an inner member 6090 which engages an inner surface 6054 of the golf club head 6000 and an outer member 6092 which engages an outer surface 6056 of the golf club head 6000. The golf club head 6000 can include a recessed portion 6058 creating a shelf configured to receive the weight mount 6072 as illustrated in FIGS. 85 and 86. As illustrated, the inner member 6090 can engage the outer member 6092 along an interface 6091. In the illustrated embodiment, the interface 6091 comprises a threaded connection which allows the inner member 6090 to be rotated relative to the outer member 6092, compressing them towards one another and squeezing the sole of the golf club head in between. Additionally, as illustrated in FIGS. 85 and 86 the golf club head can include an aperture 6059 configured to receive the weight member 6022 as well as at least a portion of the weight mount 6072. This construction can be particularly advantageous when the portion of the golf club head 6000 the weight mount is affixed to is made from a composite material.

The weight member 6022 and weight mount 6072 are configured such that the weight member 6022 can be inserted into the weight mount 6072 and rotated relative to the weight mount 6072 less than 360 degrees into a fully locked position. More preferably, the weight member 6022 can be rotated relative the weight mount 6072 less than 180 degrees into a fully locked position. More preferably, the weight member 6022 can be rotated relative the weight mount 6072 less than 120 degrees into a fully locked position. More preferably, the weight member 6022 can be rotated relative the weight mount 6072 less than 90 degrees into a fully locked position. More preferably, the weight member 6022 can be rotated relative the weight mount 6072 less than 60 degrees into a fully locked position.

The weight member 6022 includes at least one projection 6068 extending outwards radially from its axis of rotation. In the illustrated embodiment, the weight member 6022 includes three projections 6068. The projections 6068 are configured to engage the weight mount 6072 and lock the weight member 6022 in place. The weight mount 6072 includes at least one keyway 6064 configured to receive the projection 6068 of the weight member 6022 as the weight member 6022 is installed into the weight mount 6072 in a direction parallel to the axis of rotation of the weight member 6022. Once the weight member 6022 is inserted far enough into the weight mount 6072 such that the projection 6068 passes through the keyway 6064 the weight member 6022 can be rotated in a first direction relative to the weight mount 6072 and the projection 6068 slides along the circumferential ramp 6070 forcing the weight member 6022 further into the weight mount 6072 along the axis of rotation and compressing the compressible member 6076 located between the weight member 6022 and the base surface 6077 of the weight mount 6072 until the projection 6068 reaches and engages the detent 6073, wherein the compressible member 6076 forces the weight member 6022 back out of the weight mount 6072 slightly, locking the weight member 6022 into the weight mount 6072. To unlock the weight member 6022, the weight member 6022 can be forced into the weight mount 6072 slightly for the projection 6068 to clear the detent 6073 and then the weight member 6022 can be rotated in a second direction causing the projection 6068 to slide along the circumferential ramp 6070 until it reaches the keyway 6064, at which point the weight member 6022 can slide along the axis of rotation out of the weight mount 6072. In one embodiment, the depth and geometry of the detent 6073 can be configured such that the weight member 6022 does not need to be forced relative to the axis of rotation to unlock the weight member 6022, but only simply rotated in the second direction with sufficient force that the projection 6068 climbs out of the detent 6073 onto the circumferential ramp 6070.

The compressible member 6076 can act and be structured similarly to the retainer 5075 described above. In an additional embodiment the compressible member 6076 can be elastomeric. In the illustrated embodiment, the compressible member 6076 is an O-ring.

In the illustrated embodiment, the weight mount 6072 includes three keyways 6064, circumferential ramps 6070, and detents 6073 to complement the three projections 6068 of the weight member. In other embodiments, there could be one, two, three, four, five, or more of each of these features.

The weight member can be formed of a single piece or can be formed from a plurality of pieces. As illustrated in FIGS. 85, 91, 92, and 94 the weight member 6022 can include a first portion 6024 and a second portion 6026. In the illustrated embodiment the tool engagement feature 6276 and projections 6068 are incorporated into the first portion 6024. The second portion 6026 surrounds the first portion 6024 and includes a flange 6025 configured to engage the compressible member 6076. In some embodiments, the first portion 6024 and second portion 6026 can be affixed to one another via an adhesive or via other means which may include, for example, mechanical locking, interference fit, welding, co-molding, fasteners, etc. The first portion 6024 can include a circumferential channel 6082 and the second portion 6026 can include a circumferential channel 6084, each of which configured to aid in the adhesion of the first portion 6024 to the second portion 6026 by retaining some adhesive. In other embodiments, the first portion 6024 could be configured to rotate relative to the second portion 6026 similar to other embodiments discussed above. In additional embodiments, the circumferential channels 6082, 6084 could house a retainer, as discussed above and as illustrated in FIG. 81.

In one embodiment, the sole 6052 of the golf club head 6000 can be formed of a first material having a first density, the first portion 6024 of the weight member 6022 can be made of a second material having a second density, and the second portion 6026 of the weight member 6022 can be made of a third material having a second density. In one embodiment, the third density is greater than the second density which is greater than the first density. In another embodiment, the second density is greater than the third density which is greater than the first density. In another embodiment, the third density is equal to the second density which is greater than the first density. In another embodiment the third density is greater than the first density which is greater than the second density. In another embodiment, the second density is greater than the first density which is greater than the third density. In one embodiment, the inner member 6090 of the weight mount is made of a fourth material having a fourth density and the outer member 6092 of the weight mount is made of a fifth material having a fifth density. In one embodiment, the fourth and fifth densities are less than the second and third densities. In one embodiment, the fourth and fifth densities are less than the first density.

Figure 96:
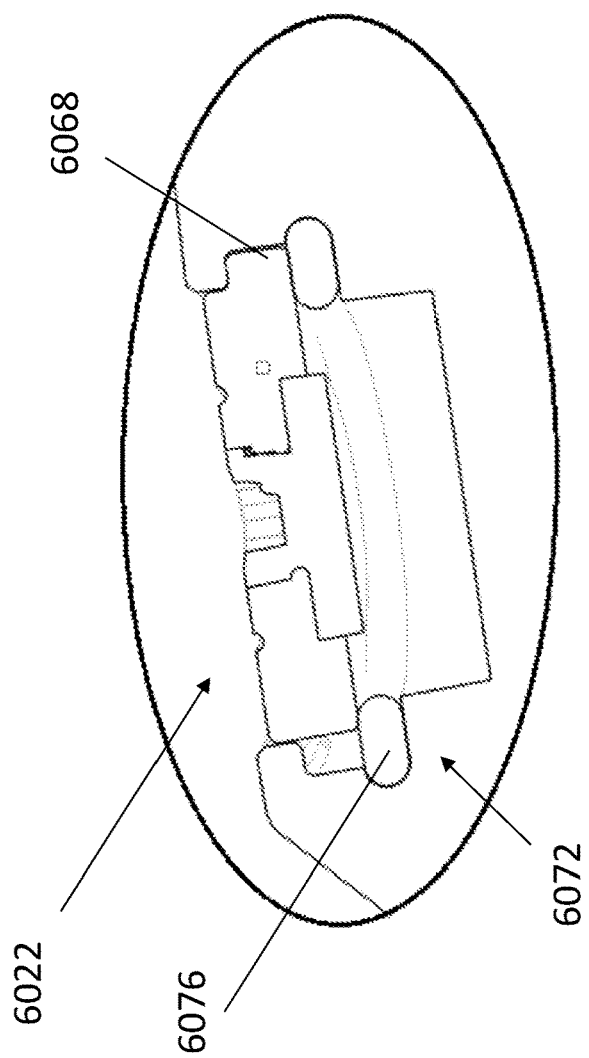
FIG. 96 illustrates a cross sectional view of the weight member and weight mount of FIG. 95.
Figure 95:
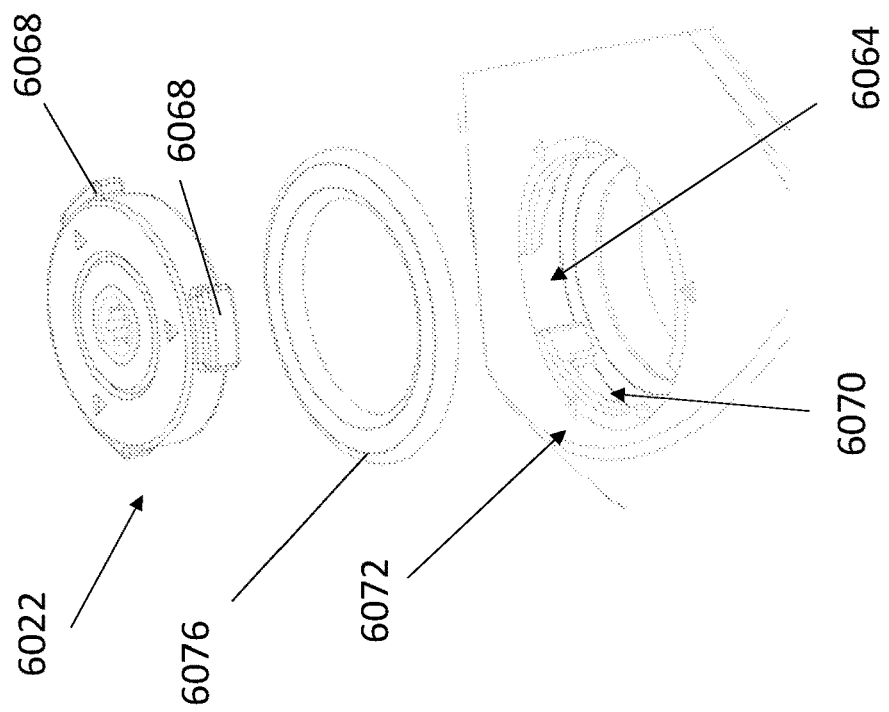
FIG. 95 illustrates an exploded perspective view of an alternative embodiment of a weight member and weight mount.

FIG. 95 illustrates an exploded perspective view of an alternative embodiment of a weight member 6022 and weight mount 6072. FIG. 96 illustrates a cross sectional view of the weight member 6022 and weight mount 6072 of FIG. 95. In one embodiment, as illustrated in FIGS. 95 and 96, the weight mount can be formed integrally with the golf club head.

In yet another alternative embodiment, the weight mount 6072 may be formed of a single piece and adhered to the golf club head (not illustrated).

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A golf club head, comprising:
   a hosel;
   a ball striking face;
   a sole extending aftward from a lower edge of said ball striking face;
   a crown extending aftward from an upper edge of said ball striking face;
   a skirt extending between said sole and said crown;
   a weight mount disposed on at least one of said sole, said crown, and said skirt;
   a weight member configured to reside in said weight mount;

a compressible member residing between said weight member and said weight mount;

wherein said weight member comprises a longitudinal axis about which said weight member is configured to rotate, said weight member comprising projections extending radially outwards from said longitudinal axis;

wherein said weight mount comprises circumferential ramps;

wherein rotation of said weight member about said longitudinal axis forces said projections along said circumferential ramps;

wherein said weight member goes from an unlocked position to a locked position in less than one full turn of said weight member relative to said weight mount;

wherein rotation of said weight member compresses said compressible member;

wherein said circumferential ramps comprise detents, wherein said projections are configured to reside in said detents when said weight member is in said locked position.

2. The golf club head of claim 1, wherein said weight member goes from an unlocked position to a locked position in less than half of one full turn of said weight member relative to said weight mount.

3. The golf club head of claim 1, wherein said compressible member comprises an elastomeric material.

4. The golf club head of claim 1, wherein said weight member is formed of a first portion configured to engage said circumferential ramps and a second portion configured to engage said compressible member, wherein said first portion is made of a first material having a first density and said second portion is made of a second material having a second density.

5. The golf club head of claim 4, wherein said first density is greater than said second density.

6. The golf club head of claim 5, wherein said first portion is affixed to said second portion.

7. The golf club head of claim 4, wherein said weight mount is made of a third material having a third density, wherein said third density is less than said first density.

8. A golf club head, comprising:
a hosel;
a ball striking face;
a sole extending aftward from a lower edge of said ball striking face;
a crown extending aftward from an upper edge of said ball striking face;
a skirt extending between said sole and said crown;
a weight mount disposed on at least one of said sole, said crown, and said skirt;
a weight member configured to reside in said weight mount;
a compressible member residing between said weight member and said weight mount;
wherein said weight mount comprises circumferential ramps;
wherein said weight member goes from an unlocked position to a locked position in less than one full turn of said weight member relative to said weight mount;
wherein rotation of said weight member compresses said compressible member;
wherein said weight member is formed of a first portion configured to engage said circumferential ramps and a second portion configured to engage said compressible member,
wherein said first portion is made of a first material having a first density and said second portion is made of a second material having a second density,
wherein said first density is different than said second density.

9. The golf club head of claim 8, wherein said weight member goes from an unlocked position to a locked position in less than half of one full turn of said weight member relative to said weight mount.

10. The golf club head of claim 8, wherein said compressible member comprises an elastomeric material.

11. The golf club head of claim 8, wherein said weight member comprises a longitudinal axis about which said weight member is configured to rotate, said weight member comprising projections extending radially outwards from said longitudinal axis.

12. The golf club head of claim 11, wherein rotation of said weight member about said longitudinal axis forces said projections along said circumferential ramps.

13. The golf club head of claim 12, wherein said circumferential ramps comprise detents, wherein said projections are configured to reside in said detents when said weight member is in said locked position.

14. The golf club head of claim 8, wherein said first portion is affixed to said second portion.

15. The golf club head of claim 8, wherein said weight mount is made of a third material having a third density, wherein said third density is less than said first density.

16. A golf club head, comprising:
a hosel;
a ball striking face;
a sole extending aftward from a lower edge of said ball striking face;
a crown extending aftward from an upper edge of said ball striking face;
a skirt extending between said sole and said crown;
a weight mount disposed on at least one of said sole, said crown, and said skirt;
a weight member configured to reside in said weight mount;
a compressible member residing between said weight member and said weight mount;
wherein said weight member comprises a longitudinal axis about which said weight member is configured to rotate, said weight member comprising projections extending radially outwards from said longitudinal axis;
wherein said weight mount comprises circumferential ramps;
wherein rotation of said weight member about said longitudinal axis forces said projections along said circumferential ramps;
wherein said weight member goes from an unlocked position to a locked position in less than one full turn of said weight member relative to said weight mount;
wherein rotation of said weight member compresses said compressible member;
wherein said circumferential ramps comprise detents, wherein said projections are configured to reside in said detents when said weight member is in said locked position wherein said weight mount comprises an outer member abutting an external surface of said golf club head and an inner member abutting an internal surface of said golf club head, wherein said outer member is affixed to said inner member.

17. The golf club head of claim 16, wherein said inner member is affixed to said outer member via a threaded interface.

18. The golf club head of claim 16, wherein said weight mount is affixed to said sole, wherein a density of said weight mount is less than a density of said sole which is less than a density of said weight member.

19. The golf club head of claim 16, wherein said weight member goes from an unlocked position to a locked position in less than half of one full turn of said weight member relative to said weight mount.

20. The golf club head of claim 16, wherein said compressible member comprises an elastomeric material.

* * * * *